US012624890B2

(12) United States Patent
Lee et al.

(10) Patent No.: US 12,624,890 B2
(45) **Date of Patent: \*May 12, 2026**

(54) HOME APPLIANCE AND METHOD OF MANUFACTURING THE SAME

(71) Applicant: SAMSUNG ELECTRONICS CO., LTD., Suwon-si (KR)

(72) Inventors: Kyunghwan Lee, Suwon-si (KR); Minkyung Lee, Suwon-si (KR); Youngdeog Koh, Suwon-si (KR); Kwangjoo Kim, Suwon-si (KR); Choongkeon Kim, Suwon-si (KR)

(73) Assignee: SAMSUNG ELECTRONICS CO., LTD., Suwon-si (KR)

( \* ) Notice: Subject to any disclaimer, the term of this patent is extended or adjusted under 35 U.S.C. 154(b) by 168 days.

This patent is subject to a terminal disclaimer.

(21) Appl. No.: 18/529,936

(22) Filed: Dec. 5, 2023

(65) Prior Publication Data

US 2024/0200853 A1      Jun. 20, 2024

Related U.S. Application Data

(63) Continuation of application No. PCT/KR2023/017352, filed on Nov. 2, 2023.

(30) Foreign Application Priority Data

Dec. 14, 2022      (KR) ........................ 10-2022-0175302
Mar. 2, 2023      (KR) ........................ 10-2023-0027896

(51) Int. Cl.
F25D 27/00      (2006.01)
F25D 23/02      (2006.01)
(Continued)

(52) U.S. Cl.
CPC ........... F25D 27/00 (2013.01); F25D 23/028 (2013.01); G02F 1/133512 (2013.01);
(Continued)

(58) Field of Classification Search
None
See application file for complete search history.

(56) References Cited

U.S. PATENT DOCUMENTS 6,621,541 B1 \*  9/2003  Choi ................. G02F 1/133555
                                                    349/114
7,777,938 B2 \*  8/2010  Lee ..................... G02F 1/16757
                                                    359/296

(Continued)

FOREIGN PATENT DOCUMENTS

JP          2012-168242 A      9/2012
JP          5697850 B2      4/2015
(Continued)

OTHER PUBLICATIONS

International Search Report dated Feb. 16, 2024, issued by the International Searching Authority in International Application No. PCT/KR2023/017352.

(Continued)

*Primary Examiner* — Fred Tzeng
(74) *Attorney, Agent, or Firm* — Sughrue Mion, PLLC

(57) ABSTRACT

A home appliance, includes: a main body; and a door configured to open and close the main body, the door including a door body and a door panel disposed on one side of the door body. The door panel includes: a light-transmissive panel disposed on the one side of the door body, the light-transmissive panel being configured to allow light to pass through; an electrophoretic film disposed between the light-transmissive panel and the door body; a protective plate disposed between the electrophoretic film and the door (Continued)

body, the protective plate being configured to protect the electrophoretic film; and a sealing member disposed along an edge portion of the light-transmissive panel extending outwardly from an edge of the electrophoretic film and an edge of the protective plate, the sealing member being configured to cover the edge of the electrophoretic film and the edge of the protective plate.

20 Claims, 25 Drawing Sheets

(51) Int. Cl.

| | |
|---|---|
| *G02F 1/1335* | (2006.01) |
| *G02F 1/1339* | (2006.01) |
| *G02F 1/1345* | (2006.01) |
| *G02F 1/167* | (2019.01) |
| *G02F 1/1677* | (2019.01) |
| *G02F 1/1685* | (2019.01) |
| *G09G 3/34* | (2006.01) |

(52) U.S. Cl.
CPC ........ *G02F 1/1339* (2013.01); *G02F 1/13452* (2013.01); *G02F 1/167* (2013.01); *G02F 1/1677* (2019.01); *G02F 1/1685* (2019.01); *G09G 3/344* (2013.01); *G02F 2201/503* (2013.01)

(56) References Cited

U.S. PATENT DOCUMENTS

| | | | | |
|---|---|---|---|---|
| 8,330,901 | B2 * | 12/2012 | Chen ................. | G02F 1/133555 |
| | | | | 349/114 |
| 8,361,356 | B2 | 1/2013 | Zang et al. | |
| 9,983,455 | B2 * | 5/2018 | Gupta ................. | G02B 6/0065 |

| | | | | |
|---|---|---|---|---|
| 10,416,523 | B2 | 9/2019 | Doi et al. | |
| 10,649,254 | B2 * | 5/2020 | Morii ................. | G02F 1/133308 |
| 11,520,179 | B2 | 12/2022 | Duthaler et al. | |
| 11,580,920 | B2 * | 2/2023 | Cheng ................. | G09G 3/3446 |
| 11,984,090 | B2 * | 5/2024 | Cheng ................. | G02F 1/167 |
| 12,230,227 | B2 * | 2/2025 | Lee ................. | G09G 3/344 |
| 2007/0177248 | A1 * | 8/2007 | Kanbayashi ........ | G02F 1/16756 |
| | | | | 359/296 |
| 2008/0024430 | A1 * | 1/2008 | Roh ................. | G02F 1/1679 |
| | | | | 345/107 |
| 2009/0161200 | A1 * | 6/2009 | Jang ................. | G02F 1/1677 |
| | | | | 345/107 |
| 2010/0195188 | A1 * | 8/2010 | Huang ................. | G02F 1/1677 |
| | | | | 359/296 |
| 2010/0214647 | A1 * | 8/2010 | Liu ................. | G02F 1/167 |
| | | | | 359/601 |
| 2014/0340738 | A1 | 11/2014 | Lecain et al. | |
| 2016/0349430 | A1 * | 12/2016 | Li ................. | G02F 1/167 |
| 2019/0196265 | A1 * | 6/2019 | Fujihara ............. | G02F 1/13338 |
| 2022/0026775 | A1 | 1/2022 | Kayal | |
| 2022/0199594 | A1 * | 6/2022 | Shin ................. | H10H 29/45 |
| 2023/0258388 | A1 | 8/2023 | Yu et al. | |

FOREIGN PATENT DOCUMENTS

| | | |
|---|---|---|
| JP | 2018-72500 A | 5/2018 |
| KR | 10-2004-0006017 A | 1/2004 |
| KR | 10-2011-0074242 A | 6/2011 |
| KR | 10-2017-0112129 A | 10/2017 |
| KR | 10-2018-0058951 A | 6/2018 |
| KR | 10-2022-0073626 A | 6/2022 |

OTHER PUBLICATIONS

Written Opinion dated Feb. 16, 2024, issued by the International Searching Authority in International Application No. PCT/KR2023/017352.

* cited by examiner

FIG. 9

```
        ┌─────────────┐
        │    START    │
        └──────┬──────┘
               │
               ▼
   ┌──────────────────────────┐
   │ RECEIVE COLOR MODE SIGNAL │──S11
   └───────────┬──────────────┘
               │
               ▼
   ┌──────────────────────────┐
   │     APPLY VOLTAGE FOR     │
   │ PREDETERMINED TIME BASED ON│──S12
   │  RECEIVED COLOR MODE SIGNAL│
   └───────────┬──────────────┘
               │
               ▼
        ┌─────────────┐
        │     END     │
        └─────────────┘
```

1100a
(1100)

1200a
(1200)

1500a
(1500)

Line1-1

R1

Line1-2

Line2-1

R2

Line2-2

2000

2200

2310

1100

1200

1500

2320

B

Z

Y

4

HOME APPLIANCE AND METHOD OF MANUFACTURING THE SAME

CROSS-REFERENCE TO RELATED APPLICATIONS

This application is a continuation application, claiming priority under § 365(c), of an International application No. PCT/KR2023/017352, filed on Nov. 2, 2023, which claims priority under 35 U. S. C. § 119 to Korean Patent Application No. 10-2022-0175302, filed on Dec. 14, 2022 and Korean Patent Application No. 10-2023-0027896, filed on Mar. 2, 2023, the disclosures of which are incorporated herein by reference in their entireties.

TECHNICAL FIELD

The disclosed embodiments relates to a home appliance and a method of manufacturing the same.

BACKGROUND

In general, home appliances are appliances that are primarily used in a user's home to assist in the user's household chores. For example, home appliances include refrigerators, air conditioners, air purifiers, vacuum cleaners, cooking appliances, dishwashers, clothes care appliances, washing machines, and the like.

Doors and other panels that form the exterior of a home appliance are typically the most visible parts of the home appliance to users. Accordingly, users may change the exterior design of a home appliance by replacing an exterior panel of the home appliance according to their preferences. However, to change the exterior design of the home appliance by replacing the exterior panel, the exterior panel must be separately prepared and reinstalled, resulting in a loss of cost or time.

SUMMARY

The disclosed embodiments are directed to providing a home appliance having an improved structure such that an exterior design may be changed without replacing an exterior panel, and a method of manufacturing the same.

Further, the disclosed embodiments are directed to providing a home appliance having an improved structure such that power consumption required in a process of changing and maintaining the color of an exterior panel may be reduced, and a method of manufacturing the same.

Further, the disclosed embodiments are directed to providing a home appliance having an improved structure to prevent damage to an electrophoretic display panel and to improve the durability or lifespan of a product, and a method of manufacturing the same.

Further, the disclosed embodiments are directed to providing a home appliance having an improved structure to improve appearance quality, and a method of manufacturing the same.

Further, the disclosed embodiments are directed to providing a home appliance having an improved structure to secure sealing accuracy in a manufacturing operation of an electrophoretic display panel, and a method of manufacturing the same.

Technical tasks to be achieved in this document is not limited to the technical tasks mentioned above, and other technical tasks not mentioned will be clearly understood by those skilled in the art from the description below.

A home appliance, may include a main body; and a door configured to open and close the main body, the door including a door body and a door panel disposed on one side of the door body. The door panel may include a light-transmissive panel disposed on the one side of the door body, the light-transmissive panel being configured to allow light to pass through; an electrophoretic film disposed between the light-transmissive panel and the door body; a protective plate disposed between the electrophoretic film and the door body, the protective plate being configured to protect the electrophoretic film; and a sealing member disposed along an edge portion of the light-transmissive panel extending outwardly from an edge of the electrophoretic film and an edge of the protective plate, the sealing member being configured to cover the edge of the electrophoretic film and the edge of the protective plate.

The sealing member may be configured to cover a rear surface of the edge portion of the light-transmissive panel facing the door body, and an end surface of the electrophoretic film, the end surface of the electrophoretic film facing outward from the edge of the electrophoretic film in a direction different from a direction in which the rear surface of the edge portion of the light-transmissive panel faces.

The edge of the electrophoretic film may extend outwards from the edge of the protective plate. The sealing member may be configured to cover a rear surface of the edge of the electrophoretic film facing the door body and an end surface of the protective plate, the end surface of the protective plate facing outward from the edge of the protective plate in a direction different from a direction in which the rear surface of the edge of the electrophoretic film faces.

The sealing member may include a first sealing member configured to cover an end surface of the electrophoretic film and a rear surface of the edge of the electrophoretic film facing the door body, the end surface of the electrophoretic film facing outward from the edge of the electrophoretic film in a direction different from a direction in which the rear surface of the edge of the electrophoretic film faces, and a second sealing member configured to cover an end surface of the protective plate a rear surface of the edge of the protective plate facing the door body, the end surface of the protective plate facing outward from the edge of the protective plate in a direction different from a direction in which the rear surface of the edge of the protective plate faces.

The second sealing member may be coupled to the first sealing member, the second sealing member being disposed between at least a portion of the first sealing member and the door body.

The home appliance may further include at least one processor configured to output a driving signal of the electrophoretic film. The electrophoretic film may include a first electrode layer electrically connected to the at least one processor and adjacent to the light-transmissive panel, and a second electrode layer disposed opposite to the first electrode layer and adjacent to the protective plate. The door panel may further include a connector electrically connecting the at least one processor and the electrophoretic film, the connector including a first terminal connected to the first electrode layer and a second terminal connected to the second electrode layer. The connector may be attached to the second electrode layer.

The protective plate may include a connector opening disposed between at least a portion of the connector and the door body, the connector opening being configured to expose the at least the portion of the connector.

The connector opening may extend from the edge of the protective plate toward an inside of the edge of the protective plate.

The electrophoretic film may further include an electrophoretic layer including a color cell configured to accommodate charged particles having colors, the electrophoretic layer being disposed between the first electrode layer and the second electrode layer. The first electrode layer may include a first terminal connecting portion provided on a rear surface of the first electrode layer facing the door body to connect to the first terminal. Each of the electrophoretic layer and the second electrode layer includes a stepped portion that steps inwardly from an edge of the first terminal connecting portion to allow the first terminal to connect to the first terminal connecting portion.

The door panel may further include a light blocking layer configured to block propagation of light and to cover a rear surface of the edge portion of the light-transmissive panel facing the door body.

The light blocking layer may be disposed between the light-transmissive panel and the sealing member.

A method of manufacturing a home appliance may include coupling a light-transmissive panel to one surface of an electrophoretic film such that an edge of the light-transmissive panel is positioned outwardly from an edge of the electrophoretic film, coupling a protective plate to an other surface of the electrophoretic film such that an edge of the protective plate is positioned inwardly from the edge of the electrophoretic film, and sealing an end surface of the electrophoretic film and an end surface of the protective plate by forming a sealing member on a first sealing area disposed along the edge of the electrophoretic film and a second sealing area disposed along the edge of the protective plate, the end surface of the electrophoretic film facing outward from the edge of the electrophoretic film in a direction different from a direction in which the other surface of the electrophoretic film faces, and the end surface of the protective plate facing outward from the edge of the protective plate in a direction different from the direction in which the other surface of the electrophoretic film faces.

The forming the sealing member on the first sealing area and the second sealing area may include forming a first sealing member on the first sealing area so as to seal an end surface of the electrophoretic film, the end surface of the protective plate defining the edge direction, and after forming the first sealing member, forming a second sealing member on the second sealing area so as to seal the end surface of the protective plate.

The method may further include determining the first sealing area by detecting a boundary between the light-transmissive panel and the electrophoretic film, and determining the second sealing area by detecting a boundary between the electrophoretic film and the protective plate.

The determining the first sealing area and the determining the second sealing area may include photographing rear surfaces of the light-transmissive panel, the electrophoretic film, and the protective plate; determining vertices at the edge of the electrophoretic film based on the photographed image; determining the first sealing area based on the vertices at the edge of the electrophoretic film; determining vertices at the edge of the protective plate based on the photographed image, and determining the second sealing area based on the vertices at the edge of the protective plate.

A home appliance may include an electrophoretic display (EPD) panel forming an exterior of the home appliance; and a base on which the EPD panel is mounted. The EPD panel may include a light-transmissive panel disposed on one side of the base, the light transmissive panel being configured to transmit light, an electrophoretic film disposed between the light-transmissive panel and the base, a protective plate disposed between the electrophoretic film and the base, the protective plate being configured to protect the electrophoretic film, and a sealing member. The electrophoretic film may include: a pair of electrode layers, and an electrophoretic layer comprising a color cell configured to flowably accommodate first charged particles having a first color, and second charged particles having a second color, the second color being different than the first color, the second charged particles having a charge different than that of the first charged particles, the electrophoretic layer being disposed between the pair of electrode layers. The sealing member may cover (i) an edge portion on a rear surface of the light-transmissive panel facing the base, (ii) a cut surface of the electrophoretic film, (iii) an edge portion of a rear surface of the electrophoretic film, and (iv) a cut surface of the protective plate, the cut surface of the electrophoretic film facing outward from an edge of the electrophoretic film in a direction different from a direction in which the rear surface of the light-transmissive panel faces, and the cut surface of the protective plate facing outward from an edge of the protective plate in a direction different from a direction in which the rear surface of the electrophoretic film.

The sealing member may include a first sealing member configured to cover the cut surface of the electrophoretic film, the edge portion of the rear surface of the light-transmissive panel, and the edge portion of the rear surface of the electrophoretic film, and a second sealing member configured to cover the cut surface of the protective plate.

The second sealing member may be coupled to the first sealing member, the second sealing member being disposed between at least a portion of the first sealing member and the base.

The door panel may further include a light blocking layer configured to block propagation of light and to cover the edge portion on the rear surface of the light-transmissive panel facing the base.

The light blocking layer may be disposed between the light-transmissive panel and the sealing member.

A home appliance may include an electrophoretic display (EPD) panel forming an exterior of the home appliance, and a base on which the EPD panel is mounted. The EPD panel may include a light-transmissive panel disposed on one side of the base and provided to transmit light, an electrophoretic film disposed between the light-transmissive panel and the base, a protective plate disposed between the electrophoretic film and the base and provided to protect the electrophoretic film, and a sealing member. The electrophoretic film may include a pair of electrode layers, and an electrophoretic layer including a color cell flowably accommodating first charged particles having a first color, and second charged particles having a second color different from the first color and a charge different from that of the first charged particles, and disposed between the pair of electrode layers. The sealing member may cover an edge portion on a rear surface of the light-transmissive panel facing the base, a cut surface of an edge direction of the electrophoretic film, an edge portion of a rear surface of the electrophoretic film, and a cut surface of an edge direction of the protective plate.

DESCRIPTION OF DRAWINGS

FIG. 9 is a flowchart illustrating an example of an operation of the electrophoretic display panel of the home appliance according to an embodiment of the disclosure.

DETAILED DESCRIPTION

Figure 1:
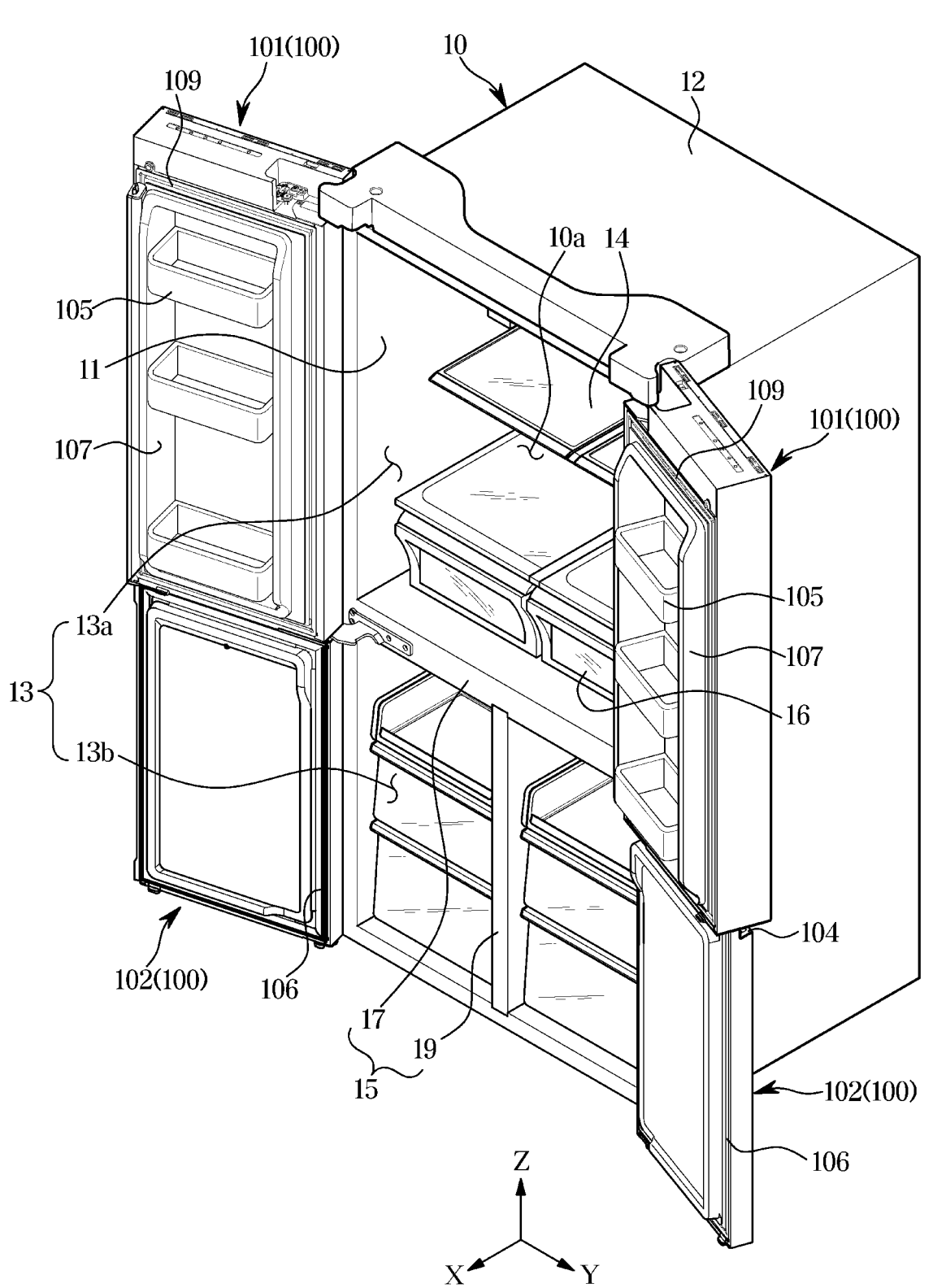
FIG. 1 is a perspective view illustrating a refrigerator as a type of home appliance according to an embodiment of the disclosure.

Various embodiments of the present document and terms used therein are not intended to limit the technical features described in this document to specific embodiments, and should be understood to include various modifications, equivalents, or substitutes of the corresponding embodiments.

In connection with the description of the drawings, similar reference numerals may be used for similar or related components.

The singular form of a noun corresponding to an item may include one or a plurality of the items unless clearly indicated otherwise in a related context.

In this document, phrases, such as "A or B", "at least one of A and B", "at least one of A or B," "A, B or C," "at least one of A, B and C," and "at least one of A, B, or C", may include any one or all possible combinations of items listed together in the corresponding phrase among the phrases.

As used herein, the term "and/or" includes any and all combinations of one or more of associated listed items.

Terms such as "1st", "2nd", "first" or "second" may be used simply to distinguish a component from other components, without limiting the component in other aspects (e.g., importance or order).

Further, as used herein, the terms "front", "rear", "top", "bottom", "side", "left", "right", "upper", "lower", and the like are defined with reference to the drawings, and are not intended to limit the shape and position of each component.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that when a certain component is referred to as being "connected to", "coupled to", "supported by" or "in contact with" another component, it can be directly or indirectly connected to, coupled to, supported by, or in contact with the other component. When a component is indirectly connected to, coupled to, supported by, or in contact with another component, it may be connected to, coupled to, supported by, or in contact with the other component through a third component.

It will also be understood that when a component is referred to as being "on" or "over" another component, it can be directly on the other component or intervening components may also be present.

A refrigerator may include a main body.

The "main body" may include an inner case, an outer case positioned outside the inner case, and an insulation provided between the inner case and the outer case.

The "inner case" may include a case, a plate, a panel, or a liner forming a storage room. The inner case may be formed as one body, or may be formed by assembling a plurality of plates together. The "outer case" may form an appearance of the main body, and be coupled to an outer side of the inner case such that the insulation is positioned between the inner case and the outer case.

The "insulation" may insulate inside of the storage room from outside of the storage room to maintain inside temperature of the storage room at appropriate temperature without being influenced by an external environment of the storage room. The insulation may include a foaming insulation. The foaming insulation may be molded by fixing the inner case and the outer case with jigs, etc. and then injecting and foaming urethane foam as a mixture of polyurethane and a foaming agent between the inner case and the outer case.

The insulation may include a vacuum insulation in addition to a foaming insulation, or may be configured only with a vacuum insulation instead of a forming insulation. The vacuum insulation may include a core material and a cladding material accommodating the core material and sealing the inside with vacuum or pressure close to vacuum. The vacuum insulation may further include an adsorbent for adsorbing a gas and water to stably maintain a vacuum state. However, the insulation is not limited to the above-mentioned foaming insulation or vacuum insulation, and may include various materials capable of being used for insulation.

The "storage room" may include a space defined by the inner case. The storage room may further include the inner case defining the space. The storage room may further include an inner case defining a space corresponding to a storage room. Various goods, such as food, medicine, cosmetics, etc., may be stored in the storage room, and the storage room may open at at least one side to put the goods in or take the goods out.

The refrigerator may include one or more storage rooms. In a case in which two or more storage rooms are formed in the refrigerator, the respective storage rooms may have different purposes of use, and may be maintained at different temperature. To this end, the storage rooms may be partitioned by a partition wall including an insulation.

The storage room may be maintained within an appropriate temperature range according to a purpose of use, and include a "refrigerating room", a "freezing room", and a "temperature conversion room" according to purposes of use and/or temperature ranges. The refrigerating room may be maintained at appropriate temperature to keep food refrigerating, and the freezing room may be maintained at appropriate temperature to keep food frozen. The "refrigerating" may be keeping food cold without freezing the food, and for example, the refrigerating room may be maintained within a range of 0 degrees Celsius to 7 degrees Celsius. The "freezing" may be freezing food or keeping food frozen, and for example, the freezing room may be maintained within a range of –20 degrees Celsius to –1 degrees Celsius. The temperature conversion room may be used as any one of a refrigerating room or a freezing room according to or regardless of a user's selection.

The storage room may also be called various other terms, such as "vegetable room", "freshness room", "cooling room", and "ice-making room", in addition to "refrigerating room", "freezing room", and "temperature conversion room", and the terms, such as "refrigerating room", "freezing room", "temperature conversion room", etc., as used below need to be understood to represent storage rooms having the corresponding purposes of use and the corresponding temperature ranges.

The refrigerator may include at least one door configured to open or close the open side of the storage room. The respective doors may be provided to open and close one or more storage rooms, or a single door may be provided to open and close a plurality of storage rooms. The door may be rotatably or slidably mounted on the front of the main body.

The "door" may seal the storage room in a closed state. The door may include an insulation, like the main body, to insulate the storage room in the closed state.

The door may include an outer door plate forming the front surface of the door, an inner door plate forming the rear surface of the door and facing the storage room, an upper cap, a lower cap, and a door insulation provided therein.

A gasket may be provided on the edge of the inner door plate to seal the storage room by coming into close contact with the front surface of the main body when the door is closed. The inner door plate may include a dyke that protrudes rearward to allow a door basket for storing items to be fitted.

The door may include a door body and a front panel that is detachably coupled to the front of the door body and forms the front surface of the door. The door body may include an outer door plate that forms the front surface of the door body, an inner door plate that forms the rear surface of the door body and faces the storage room, an upper cap, a lower cap, and a door insulator provided therein.

The refrigerator may be classified as French Door Type, Side-by-side Type, Bottom Mounted Freezer (BMF), Top Mounted Freezer (TMF), or One Door Refrigerator depending on the arrangement of the doors and the storage rooms.

The refrigerator may include a cool air supply device for supplying cool air to the storage room.

The "cool air supply device" may include a machine, an apparatus, an electronic device, and/or a combination system thereof, capable of generating cool air and guiding the cool air to cool the storage room.

The cool air supply device may generate cool air through a cooling cycle including compression, condensation, expansion, and evaporation processes of refrigerants. To this end, the cool air supply device may include a cooling cycle device having a compressor, a condenser, an expander, and an evaporator to drive the cooling cycle. The cool air supply device may include a semiconductor such as a thermoelectric element. The thermoelectric element may cool the storage room by heating and cooling actions through the Peltier effect.

The refrigerator may include a machine room where at least some components belonging to the cool air supply device are installed.

The "machine room" may be partitioned and insulated from the storage room to prevent heat generated from the components installed in the machine room from being transferred to the storage room. To dissipate heat from the components installed inside the machine room, the machine room may communicate with outside of the main body.

The refrigerator may include a dispenser provided on the door to provide water and/or ice. The dispenser may be provided on the door to allow access by the user without opening the door.

The refrigerator may include an ice-making device that produces ice. The ice-making device may include an ice-making tray that stores water, an ice-moving device that separates ice from the ice-making tray, and an ice-bucket that stores ice generated in the ice-making tray.

The refrigerator may include a controller for controlling the refrigerator.

The "controller" may include a memory for storing and/or memorizing data and/or programs for controlling the refrigerator, and a processor for outputting control signals for controlling the cool air supply device, etc. according to the programs and/or data memorized in the memory.

The memory may store or record various information, data, commands, programs, and the like necessary for operations of the refrigerator. The memory may store temporary data generated while generating control signals for controlling components included in the refrigerator. The memory may include at least one of volatile memory or non-volatile memory, or a combination thereof.

The processor may control the overall operation of the refrigerator. The processor may control the components of the refrigerator by executing programs stored in memory. The processor may include a separate neural processing unit (NPU) that performs an operation of an artificial intelligence (AI) model. In addition, the processor may include a central processing unit (CPU), a graphics processor (GPU), and the like. The processor may generate a control signal to control the operation of the cool air supply device. For example, the processor may receive temperature information of the storage room from a temperature sensor, and generate a cooling control signal for controlling an operation of the cool air supply device based on the temperature information of the storage room.

Furthermore, the processor may process a user input of a user interface and control an operation of the user interface according to the programs and/or data memorized/stored in the memory. The user interface may be provided using an input interface and an output interface. The processor may receive the user input from the user interface. In addition, the processor may transmit a display control signal and image data for displaying an image on the user interface to the user interface in response to the user input.

The processor and memory may be provided integrally or may be provided separately. The processor may include one or more processors. For example, the processor may include a main processor and at least one sub-processor. The memory may include one or more memories.

The refrigerator may include a processor and a memory for controlling all the components included in the refrigerator, and may include a plurality of processors and a plurality of memories for individually controlling the components of the refrigerator. For example, the refrigerator may include a processor and a memory for controlling the operation of the cool air supply device according to an output of the temperature sensor. In addition, the refrigerator may be separately equipped with a processor and a memory for controlling the operation of the user interface according to the user input.

A communication module may communicate with external devices, such as servers, mobile devices, and other home appliances via a nearby access point (AP). The AP may connect a local area network (LAN) to which a refrigerator or a user device is connected to a wide area network (WAN) to which a server is connected. The refrigerator or the user device may be connected to the server via the WAN.

The input interface may include keys, a touch screen, a microphone, and the like. The input interface may receive the user input and pass the received user input to the processor.

The output interface may include a display, a speaker, and the like. The output interface may output various notifications, messages, information, and the like generated by the processor.

On the other hand, the terms "front", "rear", etc. used in the following description are defined based on the drawings, and the shape and position of each component are not limited by these terms. For example, the term "front" below may refer to the front in an X direction based on the drawing. The term "rear" below may refer to the rear in the X direction based on the drawing. The terms "left" and "right" below may refer to the left and right sides respectively in a Y direction based on the drawing.

As used herein, the term "part, module, component, or block" may be implemented in software or hardware, and in some embodiments, a plurality of "parts, modules, components, or blocks" may be implemented as a single component, or a single "part, module, component, or block" may comprise a plurality of components.

Throughout the specification, when a part is said to be "connected" to another part, this may include not only direct connection but also indirect connection, and indirect connection includes connection via a wireless communication network.

Hereinafter, an embodiment will be described in detail with reference to the accompanying drawings.

A home appliance may have an electrophoretic display (EPD) panel attached to an outer surface of the home appliance to change an exterior design or color based on a user input or operating condition.

A home appliance may include a refrigerator, an air conditioner, an air purifier, a vacuum cleaner, a cooking appliance, a dishwasher, a clothes care machine, a washing machine, and the like. However, a type of home appliance is not limited to the above examples, and may be included without limitation as long as it is a device that may be installed in a user's home.

Hereinafter, with reference to FIG. 1 to FIG. 25, each type of home appliance, such as a refrigerator, a clothes care machine, a dishwasher, a cooking appliance, and a robot vacuum cleaner, will be described as examples, and the description of the above types of home appliances may be applied to other types of home appliances.

FIG. 1 is a perspective view illustrating a refrigerator as a type of home appliance according to an embodiment of the disclosure.

Referring to FIG. 1, a refrigerator 1 includes a main body 10, a storage compartment 13 formed by being vertically partitioned inside the main body 10, and a door 100 opening and closing the storage compartment 13, and a cold air supply device (not shown) for supplying cold air to the storage compartment 13.

The main body 10 may include an inner case 11 forming the storage compartment 13, an outer case 12 coupled to the outside of the inner case to form an exterior, and a body heat insulator (not shown) foamed between the inner case and the outer case to insulate the storage compartment 13 from the outside.

The cold air supply device may generate cold air using a refrigeration cycle of compression, condensation, expansion, and evaporation of a refrigerant.

The storage compartment 13 may be divided into a plurality of areas by partitions 15, and a plurality of shelves 14 and storage containers 16 may be provided within the storage compartment 13 to store food and the like.

The storage compartment 13 may be divided into a plurality of storage compartments 13a and 13b by the partition 15, and the partitions 15 may include a first partition 17 disposed in a horizontal direction to divide the interior of the storage compartment 13 in a vertical direction and a second partition 19 disposed in the vertical direction to divide the interior of the storage compartment 13 in the horizontal direction.

The partitions 15 having a T-shape by combining the first partition 17 and the second partition 19 may divide the storage compartment 13 into three spaces. The upper storage compartment 13a of the upper storage compartment 13a and the lower storage compartment 13b, which are divided by the first partition 17, may be used as a refrigerating compartment, and the lower storage compartment 13b may be used as a freezing compartment.

The lower storage compartment 13b may be entirely used as a freezing compartment, but one of the lower storage compartments 13b may be used as a freezing compartment and the other of the lower storage compartments 13b may be used as a refrigerating compartment. Alternatively, one of the lower storage compartments 13b may be used as a freezing compartment, and the other of the lower storage compartments 13b may be used as both a freezing compartment and a refrigerating compartment.

The division of the storage compartment 13 as described above is merely an example, and the storage compartment 13 may be divided in other ways than the examples described above.

The storage compartment 13 may be opened and closed by the door 100. The door 100 may include a pair of first doors (or upper doors 101) opening and closing the upper storage compartment 13a and a pair of second doors (or lower doors 102) opening and closing the lower storage compartment 13b.

The pair of first doors 101 and the pair of second doors 102 may open and close a body opening 10a of the opened main body 10. Handles may be provided on the first doors 101 and the second doors 102, and the user may use the handles provided on the first doors 101 and the second doors 102 to open the first doors 101 and the second doors 102.

A door shelf 105 for storing food may be provided on a rear surface of the first doors 101. The door shelf 105 may include a shelf support 107 extending vertically from the first doors 101 to support the door shelf 105 at both left and right sides of the door shelf 105. As shown in FIG. 1, the shelf support 107 may protrude rearward from the rear surface of the first doors 101 and extend vertically. The shelf support 107 may be detachably provided to the first doors 101 as a separate structure.

A first gasket 109 may be provided at an edge (or a border) of a rear surface of the first doors 101 to seal a gap with the main body 10 in a state where the first doors 101 are closed. The first gasket 109 may be installed in a loop shape along the edge on the rear surface of the first doors 101, and a first magnet (not shown) may be included therein.

The lower storage compartment 13b may be opened and closed by the second door 102 rotatably coupled to the main body 10. A lower door handle 104 may be formed to be recessed on an upper surface of the second door 102. Although not shown, the second door 102 may be provided in a sliding manner.

A second gasket 106 may be provided at an edge of a rear surface of the second doors 102 to seal a gap with the main body 10 in a state where the second doors 102 are closed. The second gasket 106 may be installed in a loop shape along the edge on the rear surface of the second doors 102, and a second magnet (not shown) may be included therein.

The configurations of the refrigerator 1 described above with reference to FIG. 1 are merely an example for explaining a refrigerator, which is a type of home appliance, and the disclosed embodiments are not limited thereto.

Figure 2:
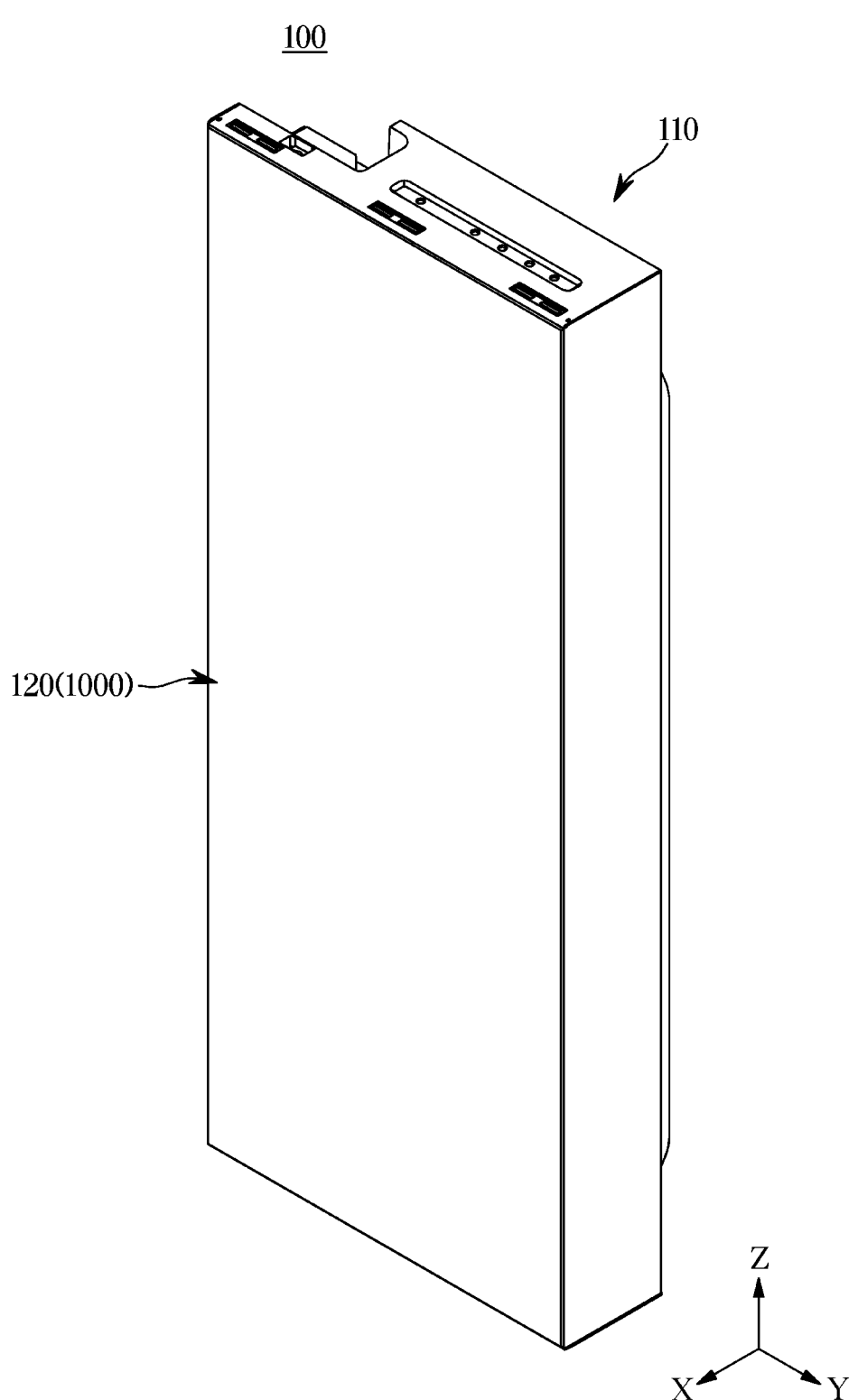
FIG. 2 is a perspective view illustrating a door of the home appliance according to an embodiment of the disclosure.
Figure 3:
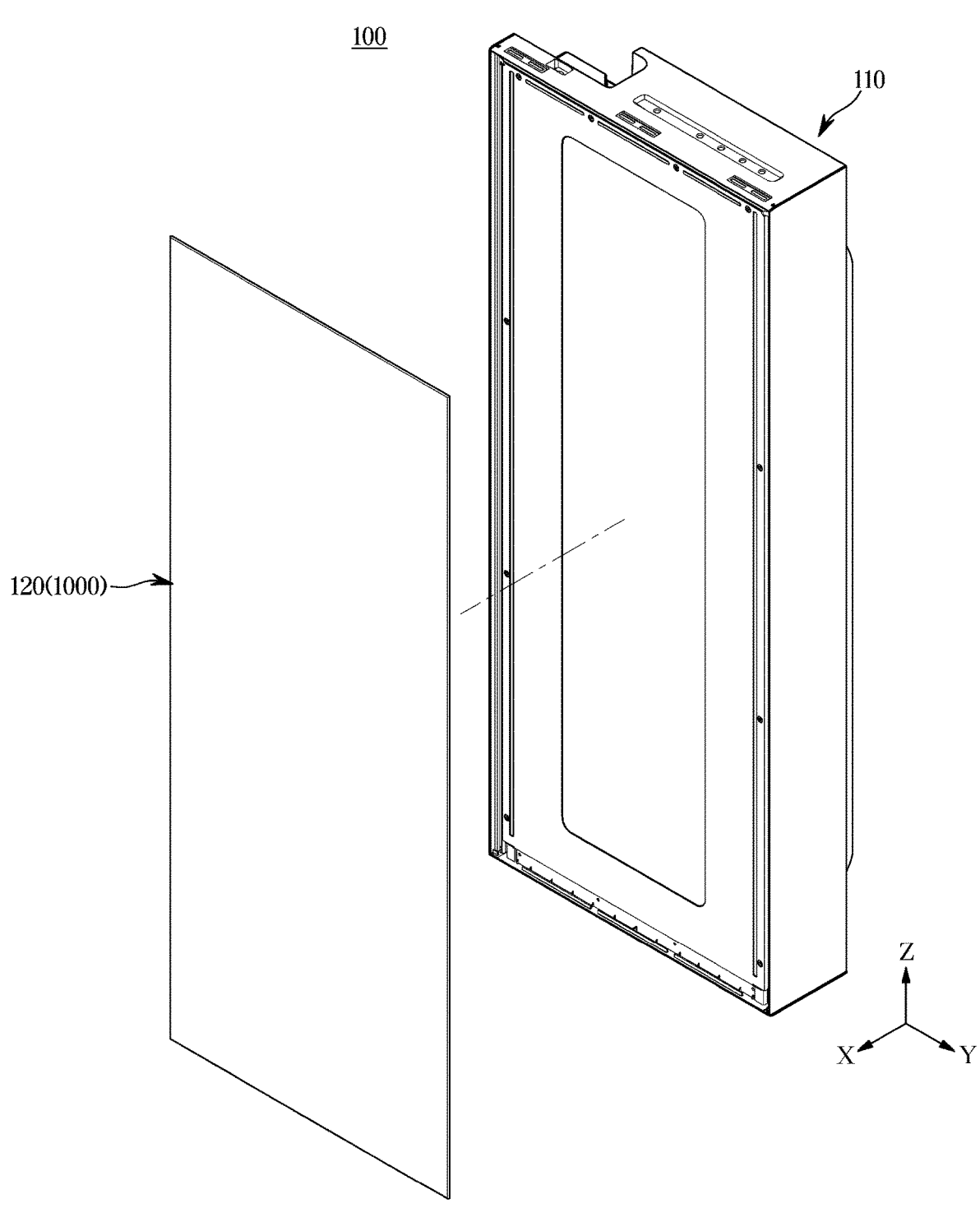
FIG. 3 is an exploded view in which some components of the door of the home appliance according to an embodiment of the disclosure are disassembled.

FIG. 2 is a perspective view illustrating the door of the home appliance according to an embodiment of the disclosure. FIG. 3 is an exploded view in which some components of the door of the home appliance according to an embodiment of the disclosure are disassembled.

In describing the door of the home appliance with reference to FIG. 2 and FIG. 3, one door 100 (e.g., a left door of the upper doors 101 shown in FIG. 1) will be described for ease of description, and detailed descriptions of the remaining doors 100 (e.g., a right door of the upper doors 101 and the lower doors 102 shown in FIG. 1) having corresponding features will be omitted.

Referring to FIG. 2 and FIG. 3, the door 100 of a home appliance 1 may include a door body 110 and a door panel 120. The door panel 120 may be coupled to the door body 110.

The door panel 120 may be disposed in front of the door body 110. The door panel 120 may be coupled to a front surface of the door body 110. The door panel 120 may form a front exterior of the door 100.

Here, the direction of each component of the door 100 is defined based on when the door 100 is in a position to close the storage compartment 13. For example, "a front of the door body 110" means a front of the home appliance (refrigerator) 100 in an X direction when the door 100 is in a position to close the storage compartment 13. Also, for example, "a front surface of the door 100" means one side of the door 100 that is visible to the user when the door 100 is in a position to close the storage compartment 13.

The door body 110 may be provided with various components, such as a sash, a door cap, a cover, and a case to form an exterior of the door 100 and to seal the storage compartment 13 within the main body 10 from the outside.

For example, the door panel 120 may be formed to have a substantially flat plate shape. Correspondingly, the front surface of the door body 110 to which the door panel 120 is coupled may have a substantially flat plate shape.

The door panel 120 may be coupled to the door body 110 by various known methods.

The door panel 120 may include an electrophoretic display (EPD) panel 1000. The door panel 120 including the electrophoretic display panel 1000 may display different designs or colors based on a user input. Alternatively, the door panel 120 including the electrophoretic display panel 1000 may display different designs or colors based on an operating condition of the refrigerator 1.

Therefore, the user may change the exterior of the refrigerator 1 to a desired design or color without physically replacing the door panel 120.

However, in contrast to the above description, the electrophoretic display panel of the home appliance is not necessarily adapted only to the door panel. For example, the electrophoretic display panel 1000 may be used as a panel included in the main body 10 of the home appliance 1, and in addition to the main body 10, the electrophoretic display panel 1000 may be applied to various parts forming the exterior of a home appliance and positioned to be visible to users.

In the following, for the sake of simplicity, the electrophoretic display panel 1000 is described with reference to an embodiment wherein the electrophoretic display panel 1000 is the door panel 120 included in the door 100 of the household appliance 1.

Hereinafter, the configuration and operation of the electrophoretic display panel 1000 will be described in detail.

Figure 4:
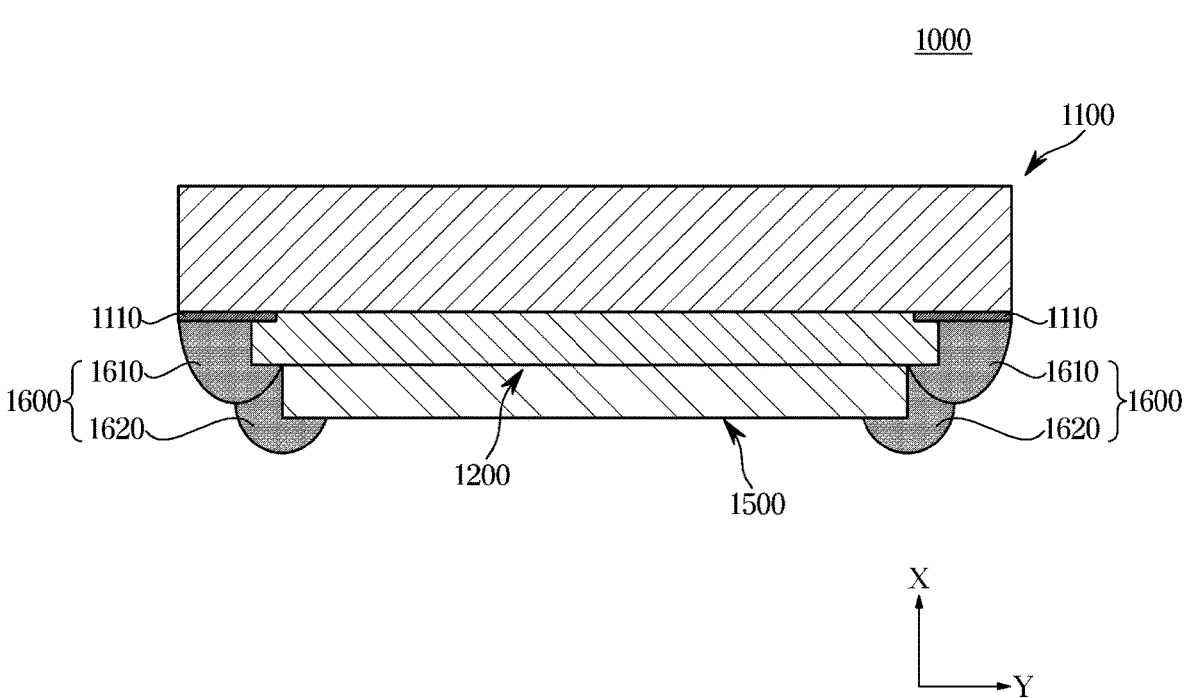
FIG. 4 is a view illustrating an electrophoretic display panel of the home appliance according to an embodiment of the disclosure.
Figure 5:
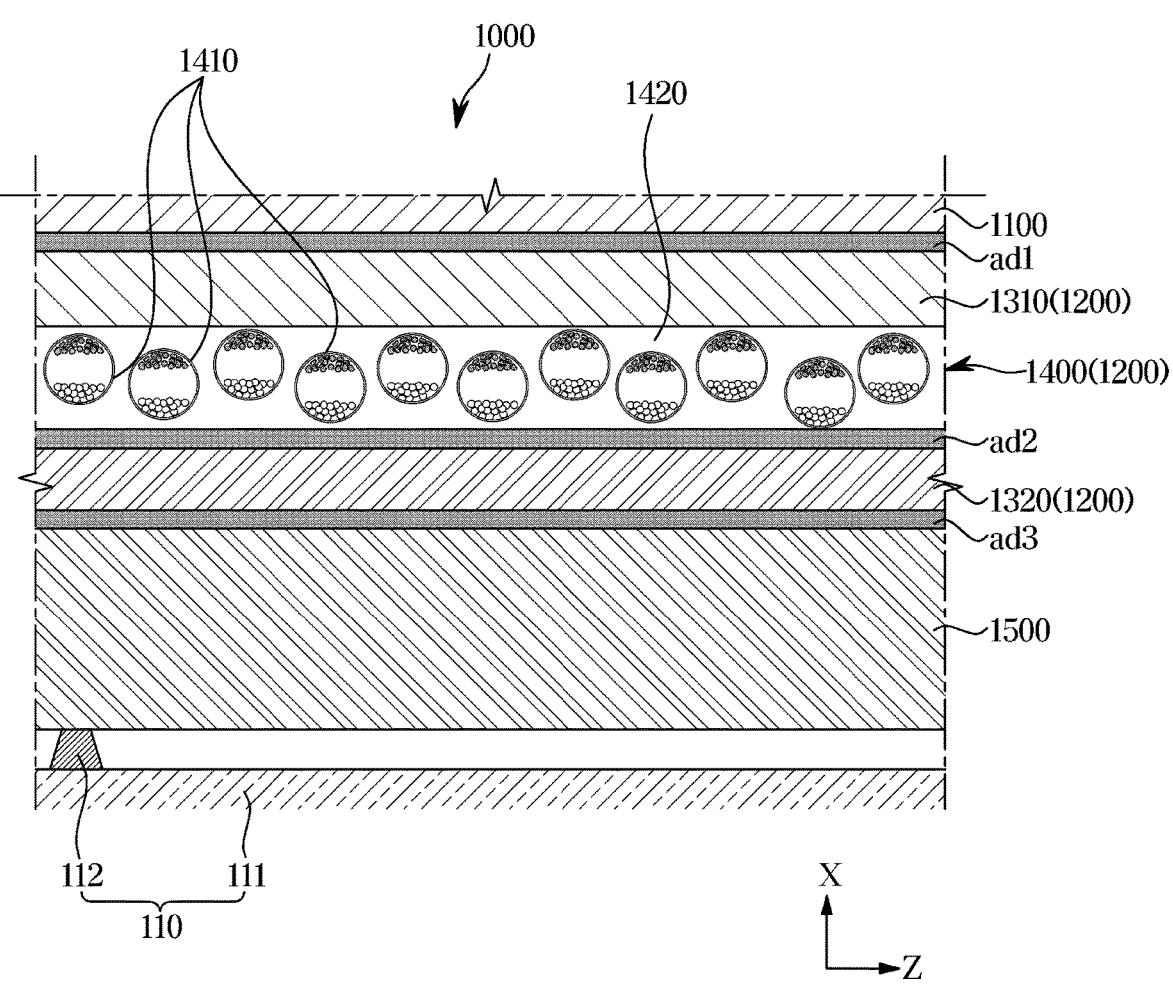
FIG. 5 is an enlarged cross-sectional view illustrating the electrophoretic display panel of the home appliance according to an embodiment of the disclosure.
Figure 6:
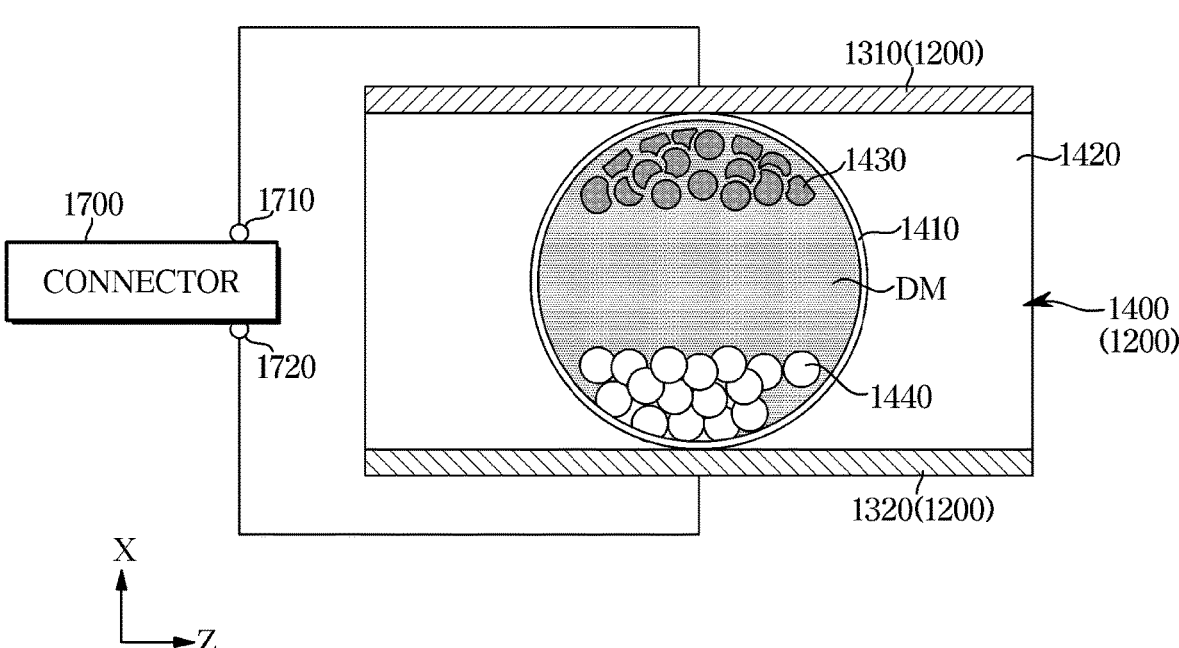
FIG. 6 is a view illustrating an appearance of the electrophoretic display panel of the home appliance according to an embodiment of the disclosure in a first color mode.
Figure 7:
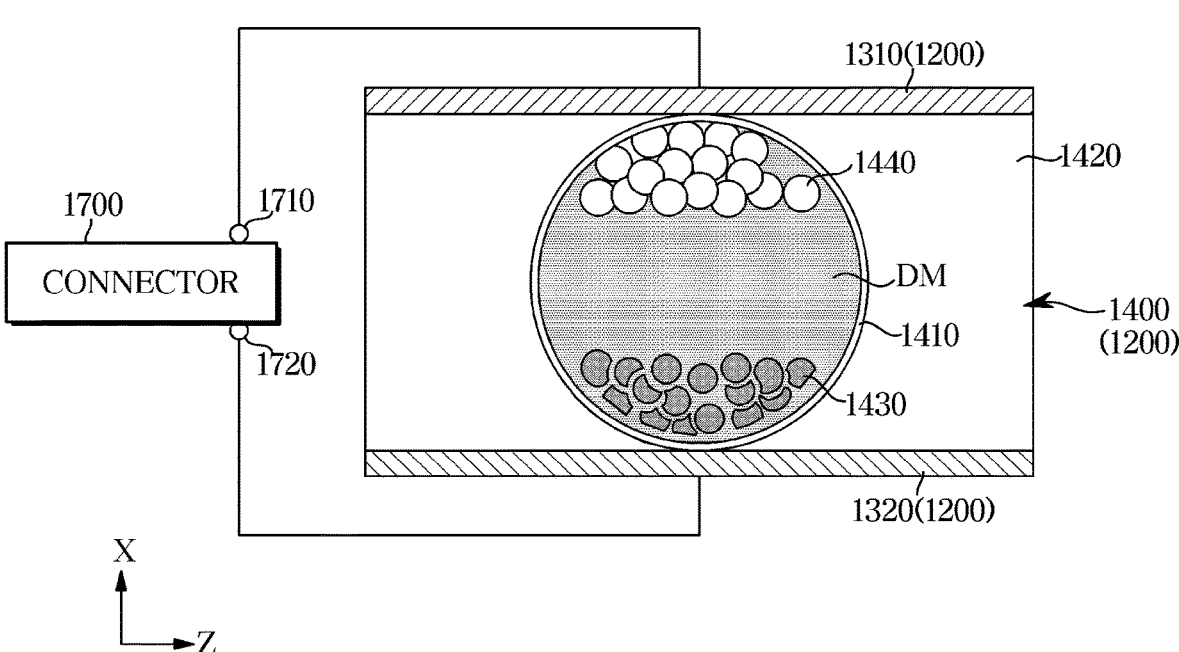
FIG. 7 is a view illustrating the appearance of the electrophoretic display panel of the home appliance according to an embodiment of the disclosure in a second color mode.

FIG. 4 is a view illustrating the electrophoretic display panel of the home appliance according to an embodiment of the disclosure. FIG. 5 is an enlarged cross-sectional view illustrating the electrophoretic display panel of the home appliance according to an embodiment of the disclosure. FIG. 6 is a view illustrating an appearance of the electrophoretic display panel of the home appliance according to an embodiment of the disclosure in a first color mode. FIG. 7 is a view illustrating the appearance of the electrophoretic display panel of the home appliance according to an embodiment of the disclosure in a second color mode.

Referring to FIG. 4 to FIG. 7, the home appliance 1 may include the electrophoretic display panel 1000.

For example, the electrophoretic display panel 1000 may be included in the door 100. The electrophoretic display panel 1000 may form a front exterior of the door 100. That is, the electrophoretic display panel 1000 may include the door panel 120. The electrophoretic display panel 1000 may be coupled to the door body 110. For example, the electrophoretic display panel 1000 may be detachably coupled to the door body 110, but is not limited thereto.

The door body 110 may include a base 111 and a coupling portion 112 to which the electrophoretic display panel 1000 is coupled. For example, the coupling portion 112 may be formed to protrude from the base 111. In particular, the coupling portion 112 may protrude from the base 111 toward the electrophoretic display panel 1000, that is, toward the front of the door 100 in the X direction.

The base 111 may face a protective plate 1500 of the electrophoretic display panel 1000, which will be described later. In other words, the base 111 may form at least a part of the front surface of the door body 110. The electrophoretic display panel 1000 may be mounted on the door body 110 after the protective plate 1500, described later, is coupled to the coupling portion 112.

In FIG. 5, the electrophoretic display panel 1000 is shown as being separated from the base 111 by a considerable distance, but this is for convenience of illustration and the disclosed embodiments are not limited to that shown in FIG. 5.

The electrophoretic display panel 1000 may include a light-transmissive panel 1100 designed to transmit light. The light-transmissive panel 1100 may form the exterior of the door 100. The light-transmissive panel 1100 may form the outer surface of the door 100 and the outer surface of the electrophoretic display panel 1000.

The light-transmissive panel 1100 may cover one side of the door body 110. More specifically, one side of the door body 110 refers to a front side of the door 100 in the X direction at a position where the door 100 closes the main body 10. In other words, the light-transmissive panel 1100 may form a front appearance of the door 100. The light-transmissive panel 1100 may be positioned outside the base 111.

However, although the light-transmissive panel 1100 forms the exterior of the door 100 as described above, the disclosed embodiments do not preclude a case where a different configuration is provided in the front of the plate. For example, in one embodiment, a component (e.g., a protective film, etc.) for protecting the light-transmissive panel 1100 may be provided on the front of the light-transmissive panel 1100 of the electrophoretic display panel 1000, which may be included in cases in which the light-transmissive panel 1100 forms the exterior of the door 100.

The light-transmissive panel 1100 may be configured to transmit light. In other words, the light-transmissive panel 1100 may include a transparent material. Accordingly, light incident from an external light source of the home appliance 1 may pass through the light-transmissive panel 1100. At least some of the light transmitted through the light-transmissive panel 1100 may be reflected by color cells 1410 of an electrophoretic layer 1400, which will be described later, and the light reflected by the color cells 1410 may pass through the light-transmissive panel 1100 again. That is, the colors appearing as the color cells 1410 of the electrophoretic layer 1400 described later operate may be visible to the user through the light-transmissive panel 1100.

The expression that the light-transmissive panel 1100 is designed to transmit light is not limited to a case where light incident on the light-transmissive panel 1100 from the inside or outside of the light-transmissive panel 1100 completely transmits the light-transmissive panel 1100. This may also include a case where at least a portion of the light incident on one surface of the light-transmissive panel 1100 is reflected, absorbed, refracted, or scattered by the light-transmissive panel 1100, but at least another portion is transmitted through the light-transmissive panel 1100 and emitted on the other surface of the light-transmissive panel 1100.

Furthermore, the above expression does not mean that the whole of the light-transmissive panel 1100 is capable of transmitting light, and a case in which only a portion of the light-transmissive panel 1100 is capable of transmitting light may also be included. Moreover, the color of the light-transmissive panel 1100 does not limit the disclosed embodiments.

For example, the light-transmissive panel 1100 may be configured to include a transparent (i.e., highly light transmissive) glass material. Alternatively, for example, the light-transmissive panel 1100 may include a transparent plastic material. In this case, the light-transmissive panel 1100 may be manufactured by injection molding using a transparent resin or by cutting and machining a plate made of the transparent resin, but is not limited thereto. The light-transmissive panel 1100 may include various materials with high light transmittance.

The light-transmissive panel 1100 may be formed to have an approximately flat plate shape. More specifically, the light-transmissive panel 1100 may be formed to have a plate shape with flat front and rear surfaces, but is not limited thereto. For example, at least one surface of the light-transmissive panel 1100 may have a curved shape. In particular, at least a portion of a front surface of the light-transmissive panel 1100 may have a curved shape.

The light-transmissive panel 1100 may be formed to have a shape substantially corresponding to one surface of the door 100 (particularly, the front surface of the door 100 in the X direction).

The electrophoretic display panel 1000 may include an electrophoretic film 1200. The electrophoretic film 1200 may be provided such that the color transmitted to the outside of the electrophoretic display panel 1000 changes according to the application of an electric field. At least a portion of the light that is incident from the outside of the electrophoretic display panel 1000 and transmitted through the light-transmissive panel 1100 may be reflected by the electrophoretic film 1200. The color of a front side of the X direction of the electrophoretic film 1200 may vary according to the electric field applied to the electrophoretic film 1200, and the light reflected by the electrophoretic film 1200 may pass through the light-transmissive panel 1100 again while having the color of the front side of the electrophoretic film 1200 in the X direction and then be transmitted to the outside of the electrophoretic display panel 1000.

The electrophoretic film 1200 may be disposed between the light-transmissive panel 1100 and the door body 110. The electrophoretic film 1200 may be disposed between the light-transmissive panel 1100 and the protective plate 1500 to be described later. The electrophoretic film 1200 may be attached to a rear surface of the light-transmissive panel 1100 facing the door body 110.

Hereinafter, a configuration of the electrophoretic film 1200 will be described in detail.

The electrophoretic film 1200 may include a pair of electrode layers 1310 and 1320. More specifically, the pair of electrode layers 1310 and 1320 may include a first electrode layer 1310 and a second electrode layer 1320 disposed to face the first electrode layer 1310. The first electrode layer 1310 and the second electrode layer 1320 may extend in parallel directions. The first electrode layer 1310 and the second electrode layer 1320 may be made of a conductive material.

The first electrode layer 1310 may be arranged between the light-transmissive panel 1100 and the door body 110. The first electrode layer 1310 may be arranged between the light-transmissive panel 1100 and the base 111. The first electrode layer 1310 may be disposed behind the light-transmissive panel 1100 and may be disposed in front of the door body 110.

For example, the first electrode layer 1310 may be attached to a rear surface of the light-transmissive panel 1100. More specifically, the first electrode layer 1310 may be attached to the rear surface of the light-transmissive panel 1100 by a first adhesive layer ad1. The first adhesive layer ad1 may include an optical adhesive material configured to transmit light, including acrylic, silicone, or urethane-based materials.

The first electrode layer 1310 may be configured to transmit light. The first electrode layer 1310 may be formed of a transparent electrode. For example, the first electrode layer 1310 may include a material, such as indium tin oxide (ITO) or indium zinc oxide (IZO), but is not limited thereto. For example, the first electrode layer 1310 may include various materials to allow light to be transmitted.

The first electrode layer 1310 may be formed to have a substantially flat plate shape.

For example, the first electrode layer 1310 may be arranged in such a way that a transparent conductive portion is formed on one surface of a transparent substrate which is light-transmissive. Here, the transparent substrate may include a glass material, polymethyl methacrylate (PMMA), polycarbonate (PC), polydimethylsiloxane, and the like. The first electrode layer may be formed on the transparent substrate by various methods, such as chemical vapor deposition (CVD), plasma enhanced CVD (PECVD), low pressure CVD (LPCVD), physical vapor deposition (PVD), sputtering, atomic layer deposition (ALD), and the like.

The second electrode layer 1320 may be arranged between the first electrode layer 1310 and the door body 110. The second electrode layer 1320 may be arranged between the first electrode layer 1310 and the base 111.

The second electrode layer 1320 may be disposed behind the first electrode layer 1310 and may be disposed in front of the door body 110.

The second electrode layer 1320 may be formed to have a substantially flat plate shape. The second electrode layer 1320 may be formed to have a size substantially corresponding to that of the first electrode layer 1310.

The second electrode layer 1320 may include a light-blocking material. Because the second electrode layer 1320 is designed to block light, a portion of the light incident on the electrophoretic layer 1400 after being transmitted through the light-transmissive panel 1100 may be absorbed or reflected by the second electrode layer 1320 even though the portion of the light is transmitted through the electrophoretic layer 1400.

The second electrode layer 1320 may include an aluminum deposition film material, but is not limited thereto. For example, the second electrode layer 1320 may include various conductive materials.

For example, the second electrode layer 1320 may be attached to a rear surface of the electrophoretic layer 1400 to be described later. More specifically, the second electrode layer 1320 may be attached to the rear surface of the electrophoretic layer 1400 by a second adhesive layer ad2. For example, the second adhesive layer ad2 may include a conductive adhesive, such as a hot melt adhesive.

The electrophoretic film 1200 may be electrically connected to a processor 51 (see FIG. 8) of the home appliance 1. The processor 51 may output a driving signal of the electrophoretic film 1200. An electric field may be applied between the first electrode layer 1310 and the second electrode layer 1320 of the electrophoretic film 1200 based on the driving signal output from the processor 51.

The electrophoretic film 1200 may be connected to the processor 51 through a connector 1700. Each of the first electrode layer 1310 and the second electrode layer 1320 may be attached to the connector 1700 by an adhesive member (not shown). The first electrode layer 1310 and the second electrode layer 1320 of the electrophoretic film 1200 may receive a driving signal from the processor 51 through the connector 1700, and based on the driving signal, apply an electric field to the color cells 1410 of the electrophoretic layer 1400. To this end, the first electrode layer 1310 and the second electrode layer 1320 may include a thin film transistor (TFT).

As shown in FIG. 6 and FIG. 7, the first electrode layer 1310 and the second electrode layer 1320 may be electrically connected to the connector 1700.

For example, the first electrode layer 1310 may be electrically connected to a first terminal 1710 of the connector 1700, and the second electrode layer 1320 may be electrically connected to a second terminal 1720 of the connector 1700. The first terminal 1710 and the second terminal 1720 may be configured to provide potentials opposite to each other.

A potential difference may or may not be generated between the first electrode layer 1310 and the second electrode layer 1320 according to the driving signal of the processor 51.

The electrophoretic film 1200 may include the electrophoretic layer 1400. The electrophoretic layer 1400 may be arranged between the first electrode layer 1310 and the second electrode layer 1320.

The electrophoretic layer 1400 may include the color cell 1410. The color cell 1410 may be provided to give a color to the light incident on the electrophoretic layer 1400 and provide the color to the user. The color cell 1410 may be provided to switch a color mode of the electrophoretic display panel 1000 provided to the user based on the potential difference between the first electrode 1320 and the second electrode 1320.

A plurality of color cells 1410 may be arranged in the electrophoretic layer 1400.

The color cells 1410 may flowably accommodate first charged particles 1430 having a first color, and second charged particles 1440 having a second color different from the first color. The second charged particles 1440 may have a charge different from that of the first charged particles 1430. A plurality of first charged particles 1430 and a plurality of second charged particles 1440 may be accommodated in one color cell 1410.

The first charged particles 1430 and the second charged particles 1440 may be composed of conductive pigment particles.

For example, each of the first charged particles 1430 and the second charged particles 1440 may have a size of about 1 micrometer.

Each of the first color and the second color may include different colors, such as colored, black, and white.

The color cells 1410 may impart a color to light incident on the color cells 1410, such as the light transmitted through the light-transmissive panel 1100 and the first electrode layer 1310. The color imparted to the light may correspond to the inherent color of the charged particles that are disposed on the outer side (i.e., charged particles disposed adjacent to the first electrode layer 1310, charged particles disposed adjacent to the front in the X direction) among the first charged particles 1430 and the second charged particles 1440. When the light transmitted through the light-transmissive panel 1100 and the first electrode layer 1310 is white light, the light reflected from the color cells 1410 may have the same color as or at least a similar color to the inherent color of the charged particles disposed on the outer side among the first charged particles 1430 and the second charged particles 1440.

Each of the color cells 1410 may be formed in a capsule shape in which a space is formed therein. For example, a border of the color cell 1410 may be made of a plastic material (e.g., urethane material).

For example, the color cell 1410 may be formed to have a substantially spherical shape, but the shape is not limited thereto.

The color cell 1410 may include a dispersion medium (DM) accommodated in the color cell 1410. The inner space of the color cell 1410 may be filled with the DM. The DM may be provided to allow light to be transmitted. In other words, the DM may include a material having high light transmittance.

The charged particles 1430 and 1440 may be mixed with the DM and accommodated in the color cell 1410, and may be flowably provided within the color cell 1410 by the DM. For example, the charged particles 1430 and 1440 may be dispersed and accommodated in a colloidal suspension state within the color cell 1410.

When an electric field is not applied to the inside of the color cell 1410, the charged particles 1430 and 1440 may be dispersed in the DM. When an electric field is applied to the inside of the color cell 1410, the charged particles 1430 and 1440 dispersed in the DM may flow along a direction of the electric force applied by the electric field.

The DM may be in an aqueous or gaseous state. To avoid settling of the charged particles CP due to gravity, the specific gravity of the DM and the specific gravity of the CP may be set to be substantially the same. For example, the DM may contain various types of materials, such as water, alcoholic solvents (e.g., methanol, ethanol, isopropanol, butanol, octanol, methylcellulose, etc.), various esters (e.g., ethyl acetate, butyl acetate, etc.), ketones (e.g., acetone, methylethylketone, methylisobutylgethone, etc.), aliphatic hydrogen oxides (e.g., pentane, hexane, octane, etc.), alicyclic hydrocarbons (e.g., cyclohexane, methylcyclohexane, etc.), aromatic hydrocarbons (e.g., benzene with long-chain alkyl groups, such as benzene, toluene, xylene, hexylbenzene, heptylbenzene, octylbenzene, nonylbenzene, decylbenzene, undecylbenzene, dodecylbenzene, tridecylbenzene, tetradecylbenzene, etc.), halogenated hydrocarbons (e.g., methylene chloride, chloroform, carbon tetrachloride, 1,2-dichloroethane, etc.), carbonates, or various other oils, alone or in mixtures with surfactants, etc. Here, the DM is not limited to the above examples, and may contain various types of materials having the properties of allowing light to transmit through and of allowing the charged particles 1430 and 1440 to flow in a mixed state in the DM.

The electrophoretic layer 1400 may include a light transmitting portion 1420 provided to allow light to be transmitted. The light transmitting portion 1420 may be applied to the first electrode layer 1310.

The plurality of color cells 1410 may be disposed within the light transmitting portion 1420. For example, the plurality of color cells 1410 may be distributed to have a substantially uniform density within the light transmitting portion 1420.

The light transmitting portion 1420 may include a material having high light transmittance. For example, the light transmitting portion 1420 may include a transparent plastic material. For example, the light transmitting portion 1420 may include a plastic material cured by heat.

The light transmitting portion 1420 may have a refractive index substantially equal to or substantially similar to that of the DM, but is not limited thereto.

To manufacture the electrophoretic film 1200, the plurality of color cells 1410 accommodating the charged particles 1430 and 1440 and the DM are first distributed substantially uniformly over the raw material of the light transmitting portion 1420 prior to curing and then an operation of applying a mixture, in which the plurality of color cells 1410 and the raw material of the light transmitting portion 1420 prior to curing are mixed to the first electrode layer 1310 may be performed. Here, the operation of applying the mixture, in which the plurality of color cells 1410 and the raw material of the light transmitting portion 1420 prior to curing are mixed, to the first electrode layer 1310 may be performed by, for example, a roll coating process.

Then, when an operation of curing the raw material of the light transmitting portion 1420 applied to the first electrode layer 1310 by heat treatment is performed, the electrophoretic layer 1400 may be manufactured.

The method of manufacturing the electrophoretic film 1200 described above is merely an example of a method of manufacturing an electrophoretic film included in an electrophoretic display panel of a home appliance, and the disclosed embodiments are not limited thereto.

An electric field may be applied between the first electrode layer 1310 and the second electrode layer 1320 according to the potential difference generated between the first electrode layer 1310 and the second electrode layer 1320. When the electric field is applied between the first electrode layer 1310 and the second electrode layer 1320, the first charged particles 1430 and the second charged particles 1440 may be subjected to an electric force directed toward either one of the first electrode layer 1310 or the second electrode layer 1320. The type of charge held by the charged particles 1430 and 1440 and the potential difference formed between the first electrode layer 1310 and the second electrode layer 1320 may be varied depending on a direction in which the charged particles 1430 and 1440 are set to flow.

For example, as shown in FIG. 6, when the electrophoretic display panel 1000 operates in a first color mode, the potential difference that causes the first charged particles 1430 to flow toward the first electrode layer 1310 may be generated between the first electrode layer 1310 and the second electrode layer 1320. Simultaneously, the potential difference that causes the second charged particles 1440 to flow toward the second electrode layer 1320 may be generated between the first electrode layer 1310 and the second electrode layer 1320.

Accordingly, in the first color mode, the electrophoretic display panel 1000 may provide a first color appearance to the user.

For example, as shown in FIG. 7, when the electrophoretic display panel 1000 operates in a second color mode, the potential difference that causes the second charged particles 1440 to flow toward the first electrode layer 1310 may be generated between the first electrode layer 1310 and the second electrode layer 1320. At the same time, the potential difference that causes the first charged particles 1430 to flow toward the first electrode layer 1310 may be generated between the first electrode layer 1310 and the second electrode layer 1320.

Accordingly, in the second color mode, the electrophoretic display panel 1000 may provide a second color appearance to the user.

In FIG. 6 and FIG. 7, it is assumed that each of the plurality of color cells 1410 provided on the electrophoretic display panel 1000 equally accommodates the charged particles 1430 and 1440 having two types of colors, but is not limited thereto. For example, each color cell 1410 may accommodate the charged particles 1430 and 1440 having different types of color combinations, and thus different exterior designs may be provided by color combinations of these color cells 1410.

With the above configurations, the home appliance 1 includes the electrophoretic display panel 1000, and thus the exterior design of the home appliance 1 may be changed without replacing the exterior panel.

In addition, the electrophoretic display panel 1000 may provide high resolution color, such as paper and ink.

Furthermore, in the electrophoretic display panel 1000, the first charged particles 1430 and the second charged particles 1440 having different charges in the color cells 1410 are in a bistable state, and thus the power consumption required in a process of maintaining after changing the color mode may be reduced.

To maintain the bistability of the first charged particles 1430 and the second charged particles 1440 in the color cells 1410, design factors, such as the size and charge value of each charged particle may be appropriately set. For example, a total amount of charge of the first charged particles 1430 and a total amount of charge of the second charged particles 1440 in one color cell 1410 may be set to be substantially equal to or substantially similar to each other.

Furthermore, the flexibility of the electrophoretic display panel 1000 may allow it to be adapted for use with home appliances (not shown) configured in a curved shape and to achieve high visibility without restricting the viewing angle.

On the other hand, components of the electrophoretic display panel 1000 described above may be damaged by a load generated when the electrophoretic display panel 1000 is coupled to the door body 110.

For example, the coupling portion 112 to which the electrophoretic display panel 1000 is coupled may have a shape protruding from the base 111, and an area where the electrophoretic display panel 1000 comes into contact with the coupling portion 112 may be a very local area compared to the entire area of the electrophoretic display panel 1000. Accordingly, a load transmitted from the coupling portion 112 may be concentrated on a portion of the electrophoretic display panel 1000 that comes into contact with the coupling portion 112, and thus a risk of damage to components in the corresponding area may be increased.

This is particularly problematic as the color cells 1410 of the electrophoretic layer 1400 may have poor durability due to material properties.

To solve this problem, the electrophoretic display panel 1000 may further include the protective plate 1500. The protective plate 1500 may be provided to distribute a load applied to the electrophoretic display panel 1000 and to increase the rigidity of the electrophoretic display panel 1000. The protective plate 1500 may be provided to protect any component of the electrophoretic display panel 1000. In particular, the protective plate 1500 may be provided to protect the electrophoretic film 1200.

The protective plate 1500 may be disposed between the electrophoretic film 1200 and the door body 110. The protective plate 1500 may be disposed between the electrophoretic film 1200 and the base 111. The protective plate 1500 may be attached to a rear surface of the electrophoretic film 1200 facing the door body 110.

More specifically, the protective plate 1500 may be disposed between the second electrode layer 1320 and the door body 110. The protective plate 1500 may be disposed between the second electrode layer 1320 and the base 111. The protective plate 1500 may be attached to a rear surface of the second electrode layer 1320 facing the door body 110.

The protective plate 1500 may be disposed behind the electrophoretic film 1200 and may be disposed in front of the door body 110.

For example, the protective plate 1500 may be attached to the rear surface of the second electrode layer 1320 by a third adhesive layer ad3. The ad3 may include an optical adhesive material configured to be light transmissive, including materials, such as an acrylic, silicone, or urethane-based material, but is not limited thereto. For example, the ad3 may include a variety of adhesive materials although it is not light transmissive.

The protective plate 1500 may include a material with high rigidity. For example, the protective plate 1500 may include a metal material, such as electro galvanized iron (EGI). Alternatively, for example, the protective plate 1500 may include various materials, such as stainless steel, aluminum, plastic, and polymer film.

With the above configurations, the protective plate 1500 may distribute a load transmitted from the coupling portion 112 to the electrophoretic display panel 1000. The protective plate 1500 may prevent the electrophoretic display panel 1000 from being damaged, and improve the durability or life of a product. In addition, the protective plate 1500 may improve adhesion between the electrophoretic layer 1400 and the electrodes 1310 and 1320.

The home appliance 1 may include a sealing member 1600 provided along an edge of the electrophoretic display panel 1000. The sealing member 1600 may cover at least a portion of the edge of the electrophoretic display panel 1000.

More specifically, the sealing member 1600 may cover an edge of the electrophoretic film 1200. In addition, the sealing member 1600 may cover an edge of the protective plate 1500.

The sealing member 1600 may be provided along an edge of the light-transmissive panel 1100 extending outwardly from the edge of the electrophoretic film 1200 and the edge of the protective plate 1500.

The sealing member 1600 may include a first sealing member 1610 provided to cover an end surface of the electrophoretic film 1200 along an edge direction (Y-Z direction) and a second sealing member 1620 provided to cover an end surface of the protective plate 1500 along the edge direction (Y-Z direction).

The first sealing member 1610 may be provided along the edge of the electrophoretic film 1200 extending outwardly from the edge of the protective plate 1500. The second sealing member 1620 may be provided along the edge of the protective plate 1500.

The sealing member 1600 will be described in more detail later.

FIGS. 4 and 5 are views illustrating the electrophoretic display panel 1000 of the home appliance 1 for ease of explanation. Accordingly, the thickness ratio in the X direction in which each layer of the electrophoretic display panel 1000 is stacked and formed is not limited as shown in FIGS. 4 and 5.

Figure 8:
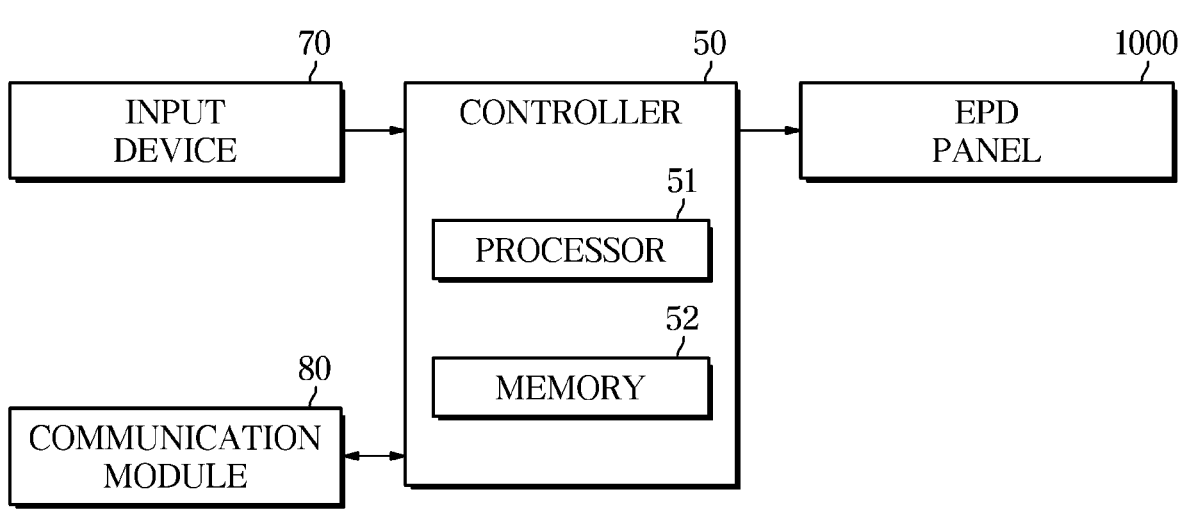
FIG. 8 is a block diagram illustrating some configurations of the home appliance according to an embodiment of the disclosure.

FIG. 8 is a block diagram illustrating some configurations of the home appliance according to an embodiment of the disclosure.

Referring to FIG. 8, the home appliance 1 may include an input device 70. The input device 70 may receive a user input. The input device 70 may include a plurality of input buttons. Different input buttons of the input device 70 may obtain different user inputs. For example, the input device 70 may receive a command from a user for a type of color mode. More specifically, the input device 70 may receive a design change command or a color change command from the user. In addition, the input device 70 may receive an input regarding an operating mode or an operating temperature of the home appliance 1.

The input device 70 may receive the user input and output an electrical signal (voltage or current) corresponding to the user input to the processor 51. The processor 51 may receive the user input based on an output signal of the input device 70.

The input device 70 may include various types of input devices, such as a tact switch, a push switch, a slide switch, a toggle switch, a micro switch, a touch switch, or the like.

The home appliance 1 may include a communication module 80 that communicates with an external electronic device. For example, the communication module 80 may include a wireless communication module for communicating with an external electronic device.

The communication module 80 may communicate with an external electronic device to allow the external electronic device to receive a command for the type of color mode input from the user. In other words, the communication module 80 communicates with the external electronic device to allow the external electronic device to receive a design change command or color change command input from the user.

The external electronic device that communicates with the communication module 80 may include, for example, an external user terminal device (e.g., smart phone, etc.). In addition, the communication module 80 may communicate with an external server.

For example, the communication module 80 may include a transceiver configured to transmit a signal to an external electronic device and receive a signal from the external electronic device.

The home appliance 1 may include a controller 50 that controls various components of the home appliance 1.

The controller 50 includes a processor 51 that generates control signals associated with an operation of the home appliance 1 and a memory 52 that stores programs, applications, instructions, and/or data for the operation of the home appliance 1. The processor 51 and the memory 52 may be implemented as separate semiconductor devices or as a single semiconductor device.

In addition, the controller 50 may include a plurality of processors or a plurality of memories. The controller 50 may be located at different locations within the home appliance 1. For example, the controller 50 may be included in a printed circuit board (PCB) provided in an electrical unit (not shown) of the home appliance 1.

The processor 51 may include an arithmetic circuit, a memory circuit, and a control circuit. The processor 51 may include one chip or a plurality of chips. In addition, the processor 51 may include one core or a plurality of cores.

The processor 51 may be electrically connected to the memory 52. The processor 51 may be electrically connected to the input device 70. The processor 51 may be electrically connected to the communication module 80. The processor 51 may be electrically connected to the electrophoretic display panel 1000. In particular, the processor 51 may be electrically connected to the pair of electrode layers 1310 and 1320 via the connector 1700.

The processor 51 may process data and/or signals by using a program provided from the memory 52 and transmit control signals to each component of the home appliance 1 based on the processing result. For example, the processor 51 may process a signal received for the color mode and control the electrophoretic display panel 1000 based on the processed signal. More specifically, the processor 51 may process the user input received through the input device 70 of the home appliance 1 or the user input received through the communication module 80 from an external electronic device. The processor 51 may output control signals for controlling each component of the home appliance 1, such as the electrophoretic display panel 1000 and the like, based on the electrical signal corresponding to the received color mode.

Each component of the home appliance 1, such as the electrophoretic display panel 1000 and the like may be operated on the basis of control signals from the processor 51.

The memory 52 may store various programs and data required for control and may temporarily store temporary data generated during control.

The memory 52 may include a volatile memory, such as static random access memory (S-RAM) and dynamic random access memory (D-RAM), and a non-volatile memory, such as read only memory (ROM) and erasable programmable read only memory (EPROM). The memory 52 may include one memory element or may include a plurality of memory elements.

Hereinafter, controlling an operation of the electrophoretic display panel 1000 by the processor 51 of the home appliance 1 will be described in more detail with reference to FIGS. 9 and 10.

Figure 9:
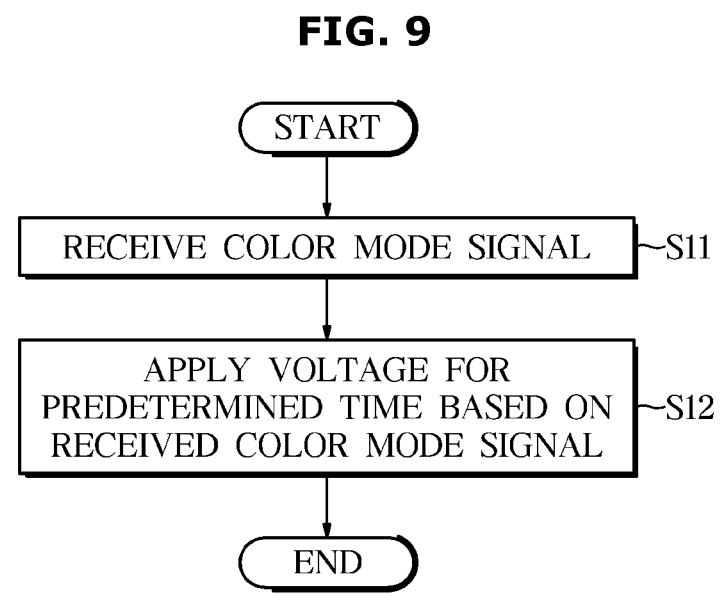

FIG. 9 is a flowchart illustrating an example of an operation of the electrophoretic display panel of the home appliance according to an embodiment of the disclosure.

Referring to FIG. 9, a method of controlling the electrophoretic display panel 1000 of the home appliance 1 may include receiving an electrical signal corresponding to a color mode (S11). More specifically, the processor 51 may receive an electrical signal corresponding to the first color mode or an electrical signal corresponding to the second color mode. For example, the input device 70 may obtain the user input for the color mode selected by the user from among the first color mode and the second color mode, and the processor 51 may receive the electrical signal corresponding to the first color mode or the electrical signal corresponding to the second color mode from the input device 70. Alternatively, the communication module 80 may communicate with the external electronic device to allow the external input device to receive the user input obtained for the color mode selected by the user from among the first color mode and the second color mode, and the processor 51 may receive the electrical signal corresponding to the first color mode or the electrical signal corresponding to the second color mode from the communication module 80.

Then, the method of controlling the electrophoretic display panel 1000 of the home appliance 1 may include applying a voltage between the first electrode layer 1310 and the second electrode layer 1320 based on the electrical signal corresponding to the received color mode (S12). More specifically, the processor 51 may control the electrophoretic display panel 1000 to apply a voltage between the first electrode layer 1310 and the second electrode layer 1320 based on the electrical signal corresponding to the received color mode.

For example, the processor 51 may control the electrophoretic display panel 1000 to allow the first charged particles 1430 to flow toward the first electrode layer 1310 in response to the electrical signal corresponding to the first color mode being received. In other words, the processor 51 may control the pair of electrode layers 1310 and 1320 of the electrophoretic film 1200 to allow the first charged particles 1430 to flow in a direction adjacent to the light-transmissive panel 1100 and to allow the second charged particles 1440 to flow in a direction adjacent to the base 111 in response to the electrical signal corresponding to the first color mode being received.

At this time, an electric field may be generated between the first electrode layer 1310 and the second electrode layer 1320 to allow the first charged particles 1430 to flow toward the first electrode layer 1310 and the second charged particles 1440 to flow toward the second electrode layer 1320. More specifically, a charge opposite to that of the first charged particles 1430 may be charged on the first electrode layer 1310, and a charge opposite to that of the second charged particles 1440 may be charged on the second electrode layer 1320.

Conversely, for example, the processor 51 may control the electrophoretic film 1200 to allow the second charged particles 1440 to flow toward the first electrode layer 1310 in response to the electrical signal corresponding to the second color mode being received. In other words, the processor 51 may control the pair of electrode layers 1310 and 1320 of the electrophoretic film 1200 to allow the second charged particles 1440 to flow in a direction adjacent to the light-transmissive panel 1100 and the first charged particles 1430 to flow in a direction adjacent to the base 111 in response to the electrical signal corresponding to the second color mode being received.

At this time, an electric field may be generated between the first electrode layer 1310 and the second electrode layer 1320 to allow the second charged particles 1440 to flow toward the first electrode layer 1310 and the first charged particles 1430 to flow toward the second electrode layer 1320. More specifically, a charge opposite to that of the second charged particles 1440 may be charged on the first electrode layer 1310, and a charge opposite to that of the first charged particles 1430 may be charged on the second electrode layer 1320.

More specifically, the operation of applying the voltage between the first electrode layer 1310 and the second electrode layer 1320 based on the electrical signal corresponding to the received color mode (S12) may be performed to apply the voltage only for a predetermined time. In other words, upon receipt of the electrical signal corresponding to the first color mode or the second color mode, the processor 51 may control the electrophoretic film 1200 to allow the voltage to be applied between the first electrode layer 1310 and the second electrode layer 1320 for a predetermined time and to prevent the voltage from being applied after the predetermined time has elapsed.

Here, the predetermined time may be set experimentally or empirically, and data for the predetermined time may be stored in the memory 52.

Therefore, power consumption required to maintain the changed color mode after changing the color mode of the electrophoretic display panel 1000 may be reduced.

Figure 10:
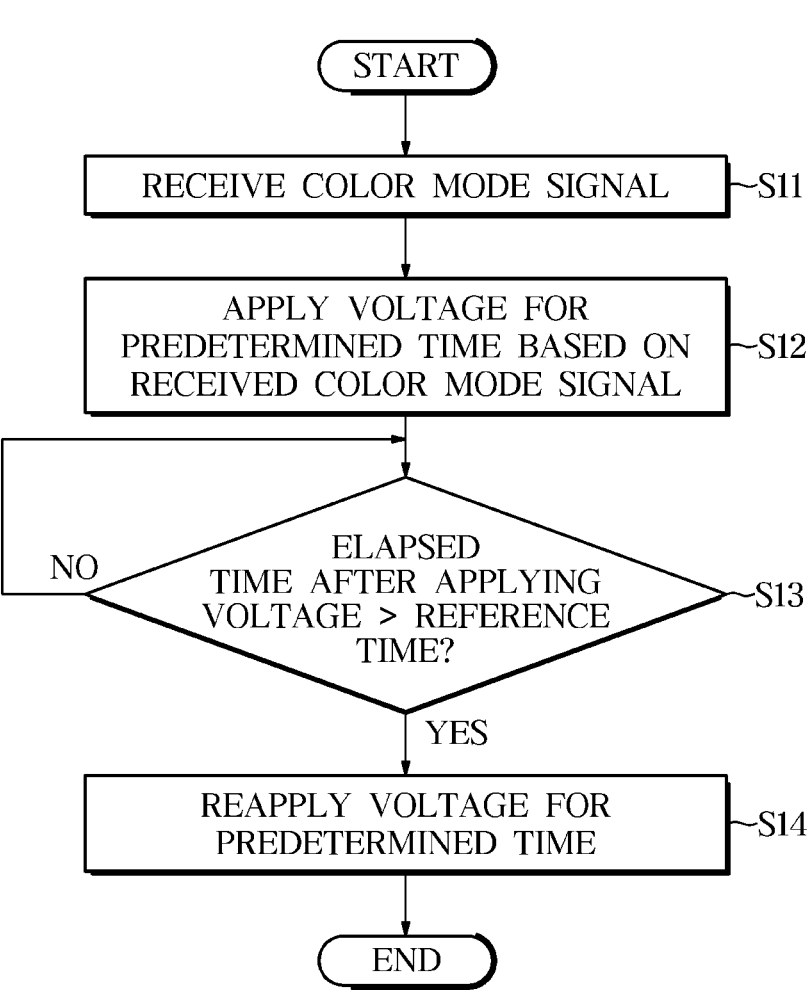
FIG. 10 is a flowchart illustrating an example of an operation of the electrophoretic display panel of the home appliance according to an embodiment of the disclosure.

FIG. 10 is a flowchart illustrating an example of an operation of the electrophoretic display panel of the home appliance according to an embodiment of the disclosure.

Referring to FIG. 10, the method of controlling an operation of the electrophoretic display panel 1000 of the home appliance 1 includes determining whether a time elapsed after applying the voltage between the first electrode layer 1310 and the second electrode layer 1320 for a predetermined time exceeds a reference time based on the signal corresponding to the received color mode (S13).

Even though the charged particles 1430 and 1440 are rearranged within the color cell 1410 by applying the voltage between the first electrode layer 1310 and the second electrode layer 1320 only for the predetermined time based on the signal corresponding to the received color mode, the arrangement of the charged particles 1430 and 1440 may be maintained due to bistability as described above. Nonetheless, when a state in which no voltage is applied between the first electrode layer 1310 and the second electrode layer 1320 exceeds the reference time, the arrangement of the charged particles 1430 and 1440 within the color cell 1410 may not be properly maintained. This may affect the color mode provided by the electrophoretic display panel 1000.

Accordingly, a method of controlling the operation of the electrophoretic display panel 1000 of the home appliance 1 includes, upon determining that the time elapsed after applying the voltage between the first electrode layer 1310 and the second electrode layer 1320 exceeds the reference time (Yes in S13), reapplying the voltage for a predetermined time (S14). In other words, the processor 51 may control the electrophoretic film 1200 to reapply the voltage between the first electrode layer 1310 and the second electrode layer 1320 for a predetermined time based on the time elapsed after the applying of the voltage between the first electrode layer 1310 and the second electrode layer 1320 exceeding the reference time.

Although not explicitly shown in FIG. 10, the above operations (S13 and S14) may be repeatedly performed when a signal for color mode change is not received.

The reference time may be set experimentally or empirically, and data for the reference time may be stored in the memory 52.

As such, the method of controlling the operation of the electrophoretic display 1000 described above with reference to FIGS. 9 and 10 is an example of a method of changing and maintaining a color mode of an electrophoretic display panel of a home appliance, and the disclosed embodiments are not limited thereto.

Figure 11:
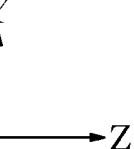
FIG. 11 is an enlarged view illustrating a rear surface of some components of the electrophoretic display panel of the home appliance according to an embodiment of the disclosure.
Figure 12:
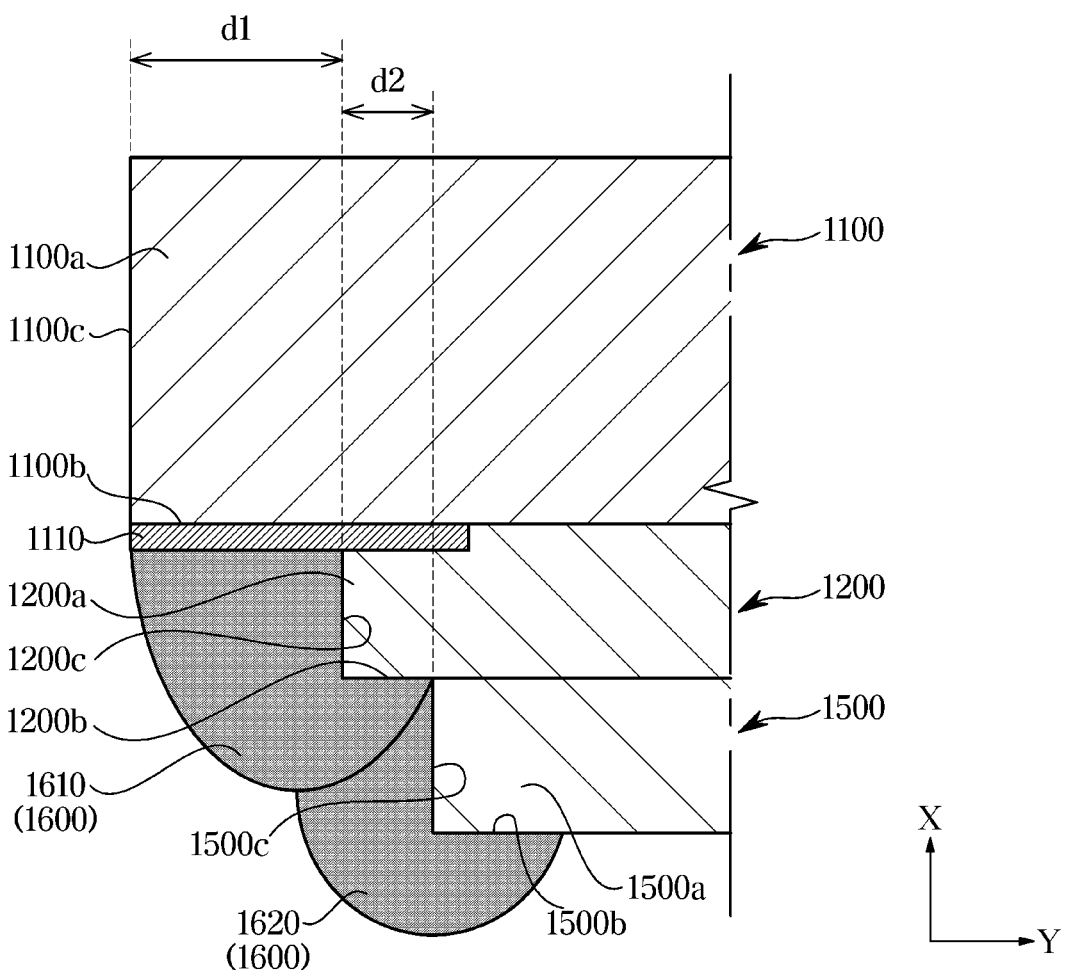
FIG. 12 is an enlarged cross-sectional view illustrating a portion of the electrophoretic display panel of the home appliance according to an embodiment of the disclosure.

FIG. 11 is an enlarged view illustrating a rear surface of some components of the electrophoretic display panel of the home appliance according to an embodiment of the disclosure. FIG. 12 is an enlarged cross-sectional view illustrating a portion of the electrophoretic display panel of the home appliance according to an embodiment of the disclosure.

Although FIG. 11 is an enlarged view of only a portion of the electrophoretic display panel 1000 for ease of illustration, the following description with reference to FIG. 11 below may also be adapted correspondingly to other portions of the electrophoretic display panel 1000.

FIG. 12 is an enlarged view of only a portion of an edge of the electrophoretic display panel 1000 for ease of illustration, but the following description with reference to FIG. 12 below may also be adapted correspondingly to other portions of the edge of the electrophoretic display panel 1000.

Referring to FIGS. 11 and 12, the electrophoretic display panel 1000 of the home appliance 1 may include the sealing member 1600 provided to cover the edges of the electrophoretic film 1200 and the protective plate 1500. The sealing member 1600 may be provided along each edge of the light-transmissive panel 1100, the electrophoretic film 1200, and the protective plate 1500.

The sealing member 1600 may seal an end surface 1200c, that is, a cut surface of the electrophoretic film 1200 along the edge direction thereof, thereby preventing moisture, foreign substances, etc. from entering the electrophoretic film 1200. The sealing member 1600 may seal an end surface 1500c, that is, a cut surface of the protective plate 1500 along the edge direction thereof, thereby preventing corrosion of the cut surface of the protective plate 1500 exposed to the outside air. The sealing member 1600 may seal a gap between each layer of the electrophoretic display panel 1000, such as the light-transmissive panel 1100, the first electrode layer 1310, the second electrode layer 1320, the electrophoretic layer 1400, and the protective plate 1500, thereby preventing moisture, foreign substances, etc. from entering the electrophoretic display panel 1000.

As such, the sealing member 1600 may prevent damage to the electrophoretic display panel 1000 and improve the durability or life of the product.

For example, the sealing member 1600 may include various types of polymer materials, such as urethane materials.

As shown in FIGS. 11 and 12, the light-transmissive panel 1100 and the electrophoretic film 1200 may be disposed to allow a step to be formed between the respective edges. An edge portion 1100a of the light-transmissive panel 1100 may extend outwardly from an edge portion 1200a of the electrophoretic film 1200. The "edge" of the light-transmissive panel 1100 and the electrophoretic film 1200 referred to herein may mean an edge disposed in a direction perpendicular to the thickness direction in which each layer of the electrophoretic display panel 1000 is stacked. In other words, the "edge" of the light-transmissive panel 1100 and the electrophoretic film 1200 referred to herein may mean an edge disposed parallel to the Y-Z plane based on the drawings.

As shown in FIGS. 11 and 12, the electrophoretic film 1200 and the protective plate 1500 may be disposed to allow a step to be formed between the respective edges. The edge portion 1200a of the electrophoretic film 1200 may extend outwardly from an edge portion 1500a of the protective plate 1500. The "edge" of the electrophoretic film 1200 and the protective plate 1500 referred to herein may mean an edge disposed in a direction perpendicular to the thickness direction in which each layer of the electrophoretic display panel 1000 is stacked. In other words, the "edge" of the electrophoretic film 1200 and the protective plate 1500 referred to herein may mean the edge disposed parallel to the Y-Z plane based on the drawings.

The edge portion 1100a of the light-transmissive panel 1100 extends further outward in the Y direction than the edge portion 1200a of the electrophoretic film 1200, and at the same time may extend further outward in the Z direction. In addition, the edge portion 1200a of the electrophoretic film 1200 may extend further outward in the Y direction than the edge portion 1500a of the protective plate 1500, and at the same time may extend further outward in the Z direction.

The edge portion 1100a of the light-transmissive panel 1100 may include a rear surface 1100b facing the door body 110 and an end surface 1100c of the edge direction. The rear surface 1100b of the edge portion 1100a of the light-transmissive panel 1100 may refer to an edge portion, not covered by the electrophoretic film 1200, of the rear surface of the light-transmissive panel 1100 facing the door body 110. The end surface 1100c of the edge direction of the light-transmissive panel 1100 may form an outer edge surface of the light-transmissive panel 1100 formed along the edge direction (Y direction, Z direction, or one direction parallel to the Y-Z plane) of the light-transmissive panel 1100. The end surface 1100c of the edge direction of the light-transmissive panel 1100 may be orthogonal to the direction (Y direction, Z direction, or one direction parallel to the Y-Z plane) orthogonal to the direction (i.e., X direction) in which each layer of the electrophoretic display panel 1000 is stacked and the light-transmissive panel 1100 and the electrophoretic film 1200 come into contact. The end surface 1100c of the edge direction of the light transmission panel 1100 may be formed as a surface perpendicular to the rear surface 1100b of the edge portion 1100a. The end surface 1100c of the edge direction of the light-transmissive panel 1100 may be configured as the cut surface of the light-transmissive panel 1100.

The edge portion 1200a of the electrophoretic film 1200 may include a rear surface 1200b facing the door body 110 and an end surface 1200c of the edge direction. The rear surface 1200b of the edge portion 1200a of the electrophoretic film 1200 may refer to an edge portion, not covered by the protective plate 1500, of the rear surface of the electrophoretic film 1200 facing the door body 110. The end surface 1200c of the edge direction of the electrophoretic film 1200 may form an outer edge surface of the electrophoretic film 1200 formed along the edge direction (Y direction, Z direction, or one direction parallel to the Y-Z plane) of the electrophoretic film 1200. The end surface 1200c of the edge direction of the electrophoretic film 1200 may be orthogonal to the direction (Y direction, Z direction, or one direction parallel to the Y-Z plane) orthogonal to the direction (i.e., X direction) in which each layer of the electrophoretic display panel 1000 is stacked and the light-transmissive panel 1100, the electrophoretic film 1200, and the protective plate 1500 come into contact. The end surface 1200c of the edge direction of the electrophoretic film 1200 may be formed as a surface perpendicular to the rear surface 1200b of the edge portion 1200a. The end surface 1200c of the edge direction of the electrophoretic film 1200 may be configured as the cut surface of the electrophoretic film 1200. In other words, the end surface 1200c of the edge direction of the electrophoretic film 1200 may include the cut surfaces of the edge direction of each of the first electrode layer 1310, the second electrode layer 1320, and the electrophoretic layer 1400.

The edge portion 1500*a* of the protective plate 1500 may include a rear surface 1500*b* facing the door body 110 and an end surface 1500*c* of the edge direction. The rear surface 1500*b* of the edge portion 1500*a* of the protective plate 1500 may refer to an edge portion, covered by the second sealing member 1620 to be described later, of the rear surface of the protective plate 1500 facing the door body 110. The end surface 1500*c* of the edge direction of the protective plate 1500 may form an outer edge surface of the protective plate 1500 formed along the edge direction (Y direction, Z direction, or one direction parallel to the Y-Z plane) of the protective plate 1500. The end surface 1500*c* of the edge direction of the protective plate 1500 may be orthogonal to the direction (Y direction, Z direction, or one direction parallel to the Y-Z plane) orthogonal to the direction (i.e., X direction) in which each layer of the electrophoretic display panel 1000 is stacked and at the same time the electrophoretic film 1200 and the protective plate 1500 come into contact. The end surface 1500*c* of the edge direction of the protective plate 1500 may be formed as a surface perpendicular to the rear surface 1500*b* of the edge portion 1500*a*. The end surface 1500*c* of the edge direction of the protective plate 1500 may be configured as the cut surface of the protective plate 1500.

The end surface 1100*c* of the edge direction of the light-transmissive panel 1100 and the end surface 1200*c* of the edge direction of the electrophoretic film 1200 may have a step difference of d1. As shown in FIG. 12, a portion of the end surface 1100*c* of the edge direction of the light-transmissive panel 1100 perpendicular to the Y direction, may extend outwardly in the Y direction by d1 than a portion of the end surface 1200*c* of the edge direction of the electrophoretic film 1200 perpendicular to the Y direction. Although not shown in FIG. 12, a portion of the end surface 1100*c* of the edge direction of the light-transmissive panel 1100 perpendicular to the Z direction may likewise extend outwardly in the Z direction by d1 than a portion of the end surface 1200*c* of the edge direction of the electrophoretic film 1200 perpendicular to the Z direction.

The rear surface 1100*b* of the edge portion 1100*a* of the light-transmissive panel 1100 may have a width equal to d1 in the Y direction or the Z direction.

The end surface 1200*c* of the edge direction of the electrophoretic film 1200 and the end surface 1500*c* of the edge direction of the protective plate 1500 may have a step difference of d2. As shown in FIG. 12, a portion of the end surface 1200*c* of the edge direction of the electrophoretic film 1200 perpendicular to the Y direction may extend outwardly in the Y direction by d2 than a portion of the end surface 1500*c* of the edge direction of the protective plate 1500 perpendicular to the Y direction. Although not shown in FIG. 12, a portion of the end surface 1200*c* of the edge direction of the electrophoretic film 1200 perpendicular to the Z direction may likewise extend outward in the Z direction by d2 than a portion of the end surface 1500*c* of the edge direction of the protective plate 1500 perpendicular to the Z direction.

The rear surface 1200*b* of the edge portion 1200*a* of the electrophoretic film 1200 may have a width equal to d2 in the Y direction or the Z direction.

The edge portion 1100*a* of the light-transmissive panel 1100 may extend outwardly from the edge portion 1500*a* of the protective plate 1500.

The sealing member 1600 may be provided along the edge portion 1100*a* of the light-transmissive panel 1100 extending outwardly from the edge portion 1200*a* of the electrophoretic film 1200 and the edge portion 1500*a* of the protective plate 1500.

The sealing member 1600 may cover the edge portion 1200*a* of the electrophoretic film 1200. The sealing member 1600 may cover the end surface 1200*c* of the edge direction of the electrophoretic film 1200. In other words, the sealing member 1600 may cover the cut surface of the electrophoretic film 1200 in the edge direction.

In addition, the sealing member 1600 may cover the rear surface 1100*b* of the edge portion 1100*a* of the light-transmissive panel 1100 facing the door body 110. In addition, the sealing member 1600 may cover the rear surface 1200*b* of the edge portion 1200*a* of the electrophoretic film 1200 facing the door body 110.

More specifically, the sealing member 1600 may include the first sealing member 1610 provided to cover the end surface 1200*c* of the edge direction of the electrophoretic film 1200. The first sealing member 1610 may be provided along the edge portion 1200*a* of the electrophoretic film 1200. In addition, the first sealing member 1610 may be provided along the edge portion 1100*a* of the light-transmissive panel 1100. The first sealing member 1610 may be located outwardly from the edge portion 1500*a* of the protective plate 1500.

The first sealing member 1610 may cover an edge part (i.e., the rear surface 1200*b* of the edge portion 1200*a* of the electrophoretic film 1200) of the rear surface of the electrophoretic film 1200 facing the door body 110. The first sealing member 1610 may cover an edge part (i.e., the rear surface 1100*b* of the edge portion 1100*a* of the light-transmissive panel 1100) of the rear surface of the light-transmissive panel 1100 facing the door body 110.

The first sealing member 1610 may cover each of the first electrode layer 1310, the second electrode layer 1320, and the electrophoretic layer 1400 in the Y direction and the Z direction, which are the edge directions. In other words, the first sealing member 1610 may cover the side surfaces in the Y direction and the side surfaces in the Z direction of each of the first electrode layer 1310, the second electrode layer 1320 and the electrophoretic layer 1400. In addition, the first sealing member 1610 may cover the edge portion 1100*a* of the light-transmissive panel 1100 and the edge portion 1200*a* of the electrophoretic film 1200 from the rear in the X direction (in a direction adjacent to the door body 110).

The first sealing member 1610 may be coupled to the rear surface 1100*b* of the edge portion 1100*a* of the light-transmitting plate 1100, the end surface 1200*c* of the edge direction of the electrophoretic film 1200, and the rear surface 1200*b* of the edge portion 1200*a* of the electrophoretic film 1200.

With these configurations, the first sealing member 1610 may seal the cut surface of the electrophoretic film 1200, and may improve the durability and life of the electrophoretic film 1200.

The sealing member 1600 may cover the edge portion 1500*a* of the protective plate 1500. The sealing member 1600 may cover the end surface 1500*c* of the edge direction of the protective plate 1500. In other words, the sealing member 1600 may cover the cut surface of the protective plate 1500 in the edge direction.

In addition, the sealing member 1600 may cover the rear surface 1500*b* of the edge portion 1500*a* of the protective plate 1500 facing the door body 110. In addition, the sealing member 1600 may cover the rear surface 1200*b* of the edge portion 1200*a* of the electrophoretic film 1200 facing the door body 110.

More specifically, the sealing member 1600 may include the second sealing member 1620 provided to cover the end surface 1500c of the edge direction of the protective plate 1500. The second sealing member 1620 may be provided along the edge portion 1500a of the protective plate 1500. In addition, the second sealing member 1620 may be located at a position corresponding to the edge portion 1200a of the electrophoretic film 1200.

The second sealing member 1620 may cover an edge part (i.e., the rear surface 1500b of the edge portion 1500a of the protective plate 1500) of the rear surface of the protective plate 1500 facing the door body 110. The second sealing member 1620 may cover at least a portion of the first sealing member 1610.

The second sealing member 1620 may cover the protective plate 1500 in the Y-direction and the Z-direction, which are the edge directions. In other words, the second sealing member 1620 may cover the side surfaces in the Y direction and the side surfaces in the Z direction of the protective plate 1500. In addition, the second sealing member 1620 may cover the edge portion 1500a of the protective plate 1500 from the rear in the X direction (in a direction adjacent to the door body 110). In addition, the second sealing member 1620 may cover the first sealing member 1610 from the rear in the X direction.

The second sealing member 1620 may be coupled to the end surface 1500c of the edge direction of the protective plate 1500 and the rear surface 1500b of the edge portion 1500a of the protective plate 1500.

The second sealing member 1620 may be provided between at least a portion of the first sealing member 1610 and the door body 110. The second sealing member 1620 may be coupled to the first sealing member 1610. The first sealing member 1610 and the second sealing member 1620 may be coupled to together to form the single sealing member 1600, but are not limited thereto. The first sealing member 1610 and the second sealing member 1620 may be formed separately.

With these configurations, the second sealing member 1620 may seal the cut surface of the protective plate 1500 and may improve the durability and life of the protective plate 1500.

As shown in FIG. 12, when the first sealing member 1610 and the second sealing member 1620 are provided separately, the first sealing member 1610 and the second sealing member 1620 are more precisely formed and arranged. Each component of the electrophoretic display panel 1000 may be sealed more effectively by the first sealing member 1610 and the second sealing member 1620.

The sealing member 1600 may not cover the end surface 1100c of the light-transmissive panel 1100 in the edge direction.

The primary function of the sealing member 1600 is to seal the cut surface of the electrophoretic film 1200 or the cut surface of the protective plate 1500 to prevent moisture or foreign substances from entering, or and to prevent moisture or foreign substances from entering between the light-transmissive panel 1100, the electrophoretic film 1200, and the protective plate 1500. Accordingly, when forming the first sealing member 1610, it is necessary to form the first sealing member 1610 on the rear surface 1100b of the edge portion 1100a of the light-transmissive panel 1100, but it may not be necessary to form the first sealing member 1610 on the end surface 1100c of the edge direction of the light-transmissive panel 1100. Rather, it may be more desirable not to form the sealing member 1600 on the end surface

1100c of the edge direction of the light-transmissive panel 1100 in terms of reducing manufacturing cost and improving appearance.

The electrophoretic display panel 1000 may further include a light blocking layer 1110 provided to block the propagation of light. The light blocking layer 1110 may be provided along the edge portion 1100a of the light-transmissive panel 1100. The light blocking layer 1110 may block light from propagating through the edge portion 1100a of the light-transmissive panel 1100.

The light blocking layer 1110 may include a material having a high light absorptivity or a high light reflectance so as to effectively block the propagation of light.

The light blocking layer 1110 may cover the rear surface 1100b of the edge portion 1100a of the light-transmissive panel 1100 facing the door body 110, but is not limited thereto. The light blocking layer 1110 may further extend inwardly of the edge to cover the edge portion of the rear surface of the light-transmissive panel 1100, and to cover a portion where the edge portion 1200a of the electrophoretic film 1200 is located from the edge portion of the rear surface of the light-transmissive panel 1100.

The light blocking layer 1110 may be disposed between the light-transmissive panel 1100 and the sealing member 1600. More specifically, the light blocking layer 1110 may be disposed between the edge portion 1100a of the light-transmissive panel 1100 and the first sealing member 1610.

A portion of the first sealing member 1610 may be disposed on the rear surface 1100b of the edge portion 1100a of the light-transmissive panel 1100. Accordingly, when the light blocking layer 1110 is not provided on the light-transmissive panel 1100, the portion of the first sealing member 1610 may be visible from the front of the door 100 through the edge portion 1100a of the light transmitting panel 1100. In particular, there is a problem that in a process of forming the first sealing member 1610, air bubbles are generated therein, which further deteriorates the quality of the external appearance.

The light blocking layer 1110 may block the propagation of light through the edge portion 1100a of the light-transmissive panel 1100 to prevent the portion of the first sealing member 1610 disposed on the rear surface 1100b of the edge portion 1100a of the light-transmissive panel 1100 from being visible, and improve the appearance quality of the product. In addition, the light blocking layer 1110 may further improve the appearance quality by preventing steps between each layer of the electrophoretic display panel 1000 from being clearly visible.

For example, the light blocking layer 1110 may be formed through a silk screen printing process. More specifically, the light blocking layer 1110 is formed by applying a color ink (e.g., black) having a high light absorptivity to the rear surface 1100b of the edge portion 1100a of the light-transmissive panel 1100 and then drying the color ink, but is not limited thereto. The light blocking layer 1110 may be formed by various methods.

For example, the thickness of the light-transmissive panel 1100 in the X direction may be approximately 3.2 mm. The thickness of the electrophoretic film 1200 in the X direction may be approximately 0.4 mm. The thickness of the protective plate 1500 in the X direction may be approximately 0.4 mm. The step d1 between the light-transmissive panel 1100 and the electrophoretic film 1200 in the Y direction or the Z direction may be formed to be approximately 1.0 mm or more to 2.0 mm or less, and preferably approximately 1.35 mm. The step d2 of the electrophoretic film 1200 and the protective plate 1500 in the Y direction or the Z direction may be formed to be approximately 0.2 mm or more to 2.0 mm or less, and preferably approximately 0.55 mm.

The width of the sealing member 1600 in the Y direction or the Z direction may be formed to be approximately 1.0 mm or more to 5.0 mm or less. In addition, the thickness of the sealing member 1600 in the X direction may be formed to be approximately 0.5 mm or more to 2.0 mm or less.

Preferably, the width of the first sealing member 1610 in the Y direction or the Z direction may be formed to be approximately 1.5 mm or more to 2.0 mm or less, and the thickness thereof in the X direction may be formed to be approximately 0.5 mm or more to 2.0 mm or less. In addition, preferably, the width of the second sealing member 1620 in the Y direction or the Z direction may be formed to be approximately 2.5 mm or more to 3.0 mm or less, and the thickness thereof in the X direction may be formed to be approximately 0.5 mm or more to 2.0 mm or less.

For example, the width of the light blocking layer 1110 in the Y direction or the Z direction may be approximately 1.0 mm or more to 2.0 mm or less. The thickness of the light blocking layer 1110 in the X direction may be approximately 0.005 mm.

Areas where the sealing member 1600 is formed on the light-transmissive panel 1100, the electrophoretic film 1200, and the protective plate 1500 may be defined as sealing areas R1 and R2.

Referring to FIG. 11, the first sealing member 1610 may be provided in the first sealing area R1. The first sealing area R1 may be provided along the edge of the electrophoretic film 1200.

More specifically, a portion of the first sealing area R1 may be provided on the edge portion 1100*a* of the light-transmissive panel 1100, and an opposite portion of the first sealing area R1 may be provided on the edge portion 1200*a* of the electrophoretic film 1200.

For example, the first sealing area R1 may be determined as an area formed between a first outer boundary line 1-1 and a first inner boundary line 1-2 shown in FIG. 11.

The first outer boundary line 1-1 may be positioned on the edge portion 1100*a* of the light-transmissive panel 1100. The first outer boundary line 1-1 may be positioned parallel to the edge portion 1100*a* of the light-transmissive panel 1100. The first outer boundary line 1-1 may be positioned between the end surface 1100*c* of the edge direction of the light-transmissive panel 1100 and the end surface 1200*c* of the edge direction of the electrophoretic film 1200. Alternatively, the first outer boundary line 1-1 may be positioned substantially parallel to the end surface 1100*c* of the edge direction of the light-transmissive panel 1100 in the X direction (see the first sealing member 1610 in FIG. 12).

The first inner boundary line 1-2 may be positioned on the edge portion 1200*a* of the electrophoretic film 1200. The first inner boundary line 1-2 may be positioned between the end surface 1200*c* of the edge direction of the electrophoretic film 1200 and the end surface 1500*c* of the edge direction of the protective plate 1500. Alternatively, the first inner boundary line 1-2 may be positioned substantially parallel to the end surface 1500*c* of the edge direction of the protective plate 1500 in the X direction (see the first sealing member 1610 in FIG. 12).

In addition, the second sealing member 1620 may be provided in the second sealing area R2. The second sealing area R2 may be provided along the edge of the protective plate 1500.

More specifically, a portion of the second sealing area R2 may be provided on the edge portion 1200*a* of the electrophoretic film 1200, and an opposite portion of the second sealing area R2 may be provided on the edge portion 1500*a* of the protective plate 1500.

For example, the second sealing area R2 may be determined as an area formed between a second outer boundary line 2-1 and a second inner boundary line 2-2 shown in FIG. 11.

The second outer boundary line 2-1 may be positioned on the edge portion 1200*a* of the electrophoretic film 1200. The second outer boundary line 2-1 may be positioned parallel to the edge portion 1200*a* of the electrophoretic film 1200. The second outer boundary line 2-1 may be positioned between the end surface 1200*c* of the edge direction of the electrophoretic film 1200 and the end surface 1500*c* of the edge direction of the protective plate 1500. Alternatively, the second outer boundary line 2-1 may be positioned substantially parallel to the end surface 1200*c* of the edge direction of the electrophoretic film 1200 in the X direction. Alternatively, the second outer boundary line 2-1 may be positioned on the edge portion 1100*a* of the light-transmissive panel 1100 (see the second sealing member 1620 of FIG. 12).

The second inner boundary line 2-2 may be positioned on the edge portion 1500*a* of the protective plate 1500. The second inner boundary line 2-2 may be positioned inwardly from the edge than the end surface 1500*c* of the edge direction of the protective plate 1500.

For example, the first sealing area R1 and the second sealing area R2 may partially overlap each other. Accordingly, the first sealing member 1610 and the second sealing member 1620 may contact each other, and the first sealing member 1610 and the second sealing member 1620 may be coupled to each other. For this reason, when the first sealing member 1610 is first formed in the first sealing area R1 and then the second sealing member 1620 is formed in the second sealing area R2, the second sealing member 1620 may cover at least a portion of the first sealing member 1610 from the rear.

The light blocking layer 1110 may be formed to cover at least the first sealing area R1. In other words, at least a portion of the light blocking layer 1110 may be formed at a position corresponding to the first sealing area R1. In addition, at least a portion of the light blocking layer 1110 may be formed in a position corresponding to at least a portion of the second sealing area R2.

Details of a method for determining the first sealing area R1 and the second sealing area R2 will be described later.

The widths of the first sealing area R1 and the second sealing area R2, or the relative ratios with respect to the light-transmissive panel 1100, the electrophoretic film 1200, the protective plate 1500, and the like, are not limited to those shown in FIG. 11. Positions of the boundary lines 1-1, 1-2, 2-1, and 2-2 of the sealing areas R1 and R2 are not limited to those shown in FIG. 11. The positions and widths of the first sealing area R1 and the second sealing area R2 may vary depending on the boundary lines 1-1, 1-2, 2-1, and 2-2.

In addition, the thickness ratios in the X direction of each component of the electrophoretic display panel 1000, such as the light-transmissive panel 1100, the electrophoretic film 1200, the protective plate 1500, the first sealing member 1610, and the second sealing member 1620, are not limited to those shown in FIG. 12. Similarly, the width ratios in the Y direction of each component of the electrophoretic display panel 1000, such as the light-transmissive panel 1100, the electrophoretic film 1200, the protective plate 1500, the first sealing member 1610, and the second sealing member 1620, are not limited to those shown in FIG. 12.

In addition, the steps d1 and d2 between the edges of the light-transmissive panel 1100, the electrophoretic film 1200, and the protective plate 1500 are not limited to those shown in FIGS. 11 and 12.

Figure 13:
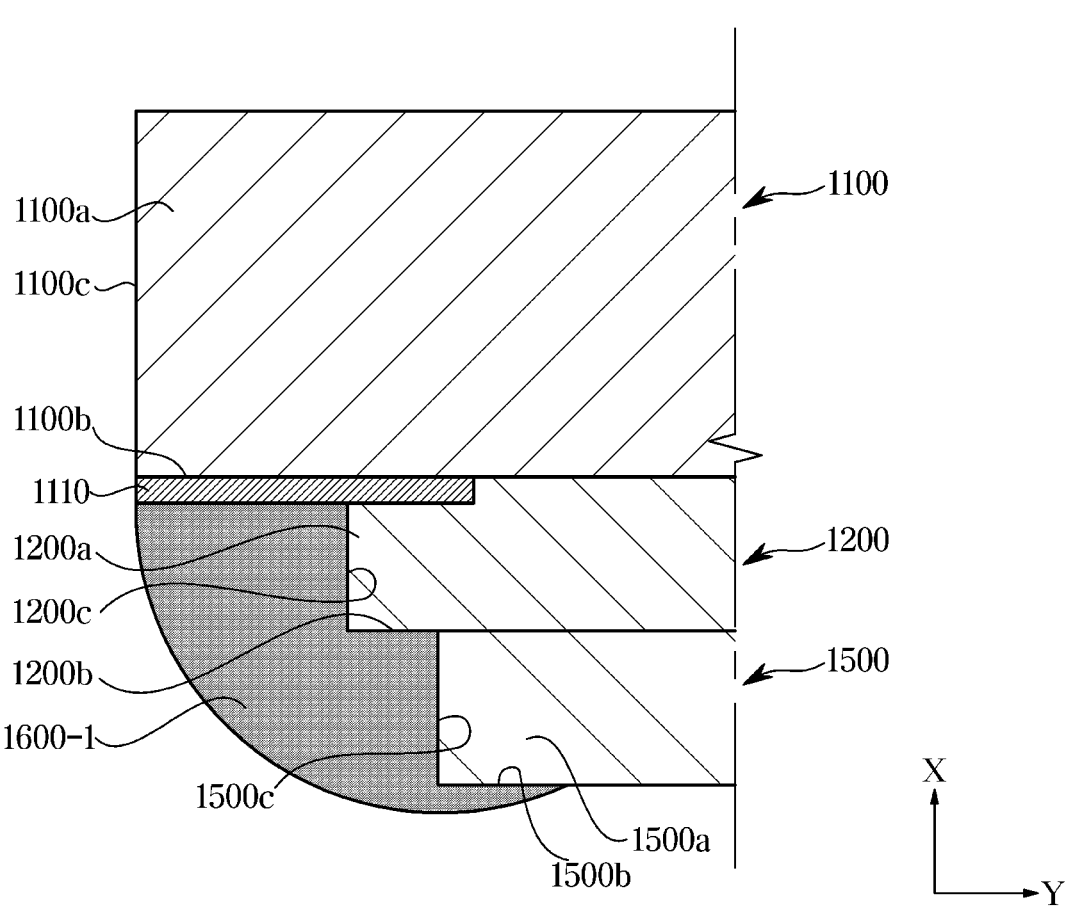
FIG. 13 is an enlarged cross-sectional view illustrating a portion of the electrophoretic display panel of the home appliance according to an embodiment of the disclosure.

FIG. 13 is an enlarged cross-sectional view illustrating a portion of the electrophoretic display panel of the home appliance according to an embodiment of the disclosure.

Referring to FIG. 13, the electrophoretic display panel 1000 of the home appliance 1 may include a sealing member 1600-1 formed integrally instead of the first and second sealing members 1610 and 1620 formed separately from each other as shown in FIG. 12.

The sealing member 1600-1 may be provided along the edge portion 1100a of the light-transmissive panel 1100. The sealing member 1600-1 may cover the edge portion 1200a of the electrophoretic film 1200 and the edge portion 1500a of the protective plate 1500.

More specifically, the sealing member 1600-1 may be integrally formed to cover all of the rear surface 1100b of the edge portion 1100a of the light-transmissive panel 1100, the end surface 1200c of the edge direction of the electrophoretic film 1200, the rear surface 1200b of the edge portion 1200a of the electrophoretic film 1200, the end surface 1500c of the edge direction of the protective plate 1500, and the rear surface 1500b of the edge portion 1500a of the protective plate 1500.

The sealing member 1600-1 may cover the first electrode layer 1310, the second electrode layer 1320, the electrophoretic layer 1400, and the protective plate 1500 in the Y direction and the Z direction, which are the edge directions, respectively. In other words, the sealing member 1600-1 may cover the side surfaces in the Y direction and the side surfaces in the Z direction of each of the first electrode layer 1310, the second electrode layer 1320, the electrophoretic layer 1400, and the protective plate 1500.

In addition, the sealing member 1600-1 may cover the edge portion 1100a of the light-transmissive panel 1100, the edge portion 1200a of the electrophoretic film 1200, and the edge portion 1500a of the protective plate 1500 from the rear in the X direction (in a direction adjacent to the door body 110).

The sealing member 1600-1 may be coupled to all of the rear surface 1100b of the edge portion 1100a of the light-transmissive panel 1100, the end surface 1200c of the edge direction of the electrophoretic film 1200, the rear surface 1200b of the edge portion 1200a of the electrophoretic film 1200, the end surface 1500c of the edge direction of the protective plate 1500, and the rear surface 1500b of the edge portion 1500a of the protective plate 1500.

The sealing member 1600-1 may be formed in the first sealing area R1 and the second sealing area R2. The sealing member 1600-1 may be formed simultaneously in each of the first sealing area R1 and the second sealing area R2.

For example, preferably, the width of the sealing member 1600-1 in the Y direction or the Z direction may be formed to be approximately 2.0 mm or more to 4.0 mm or less, and the thickness thereof in the X direction may be formed to be approximately 0.5 mm or more to 2.0 mm or less.

The configurations and functions of the sealing member 1600-1 are the same as those of the sealing member 1600 described in FIGS. 11 and 12, and thus a detailed description thereof will be omitted.

Figure 14:
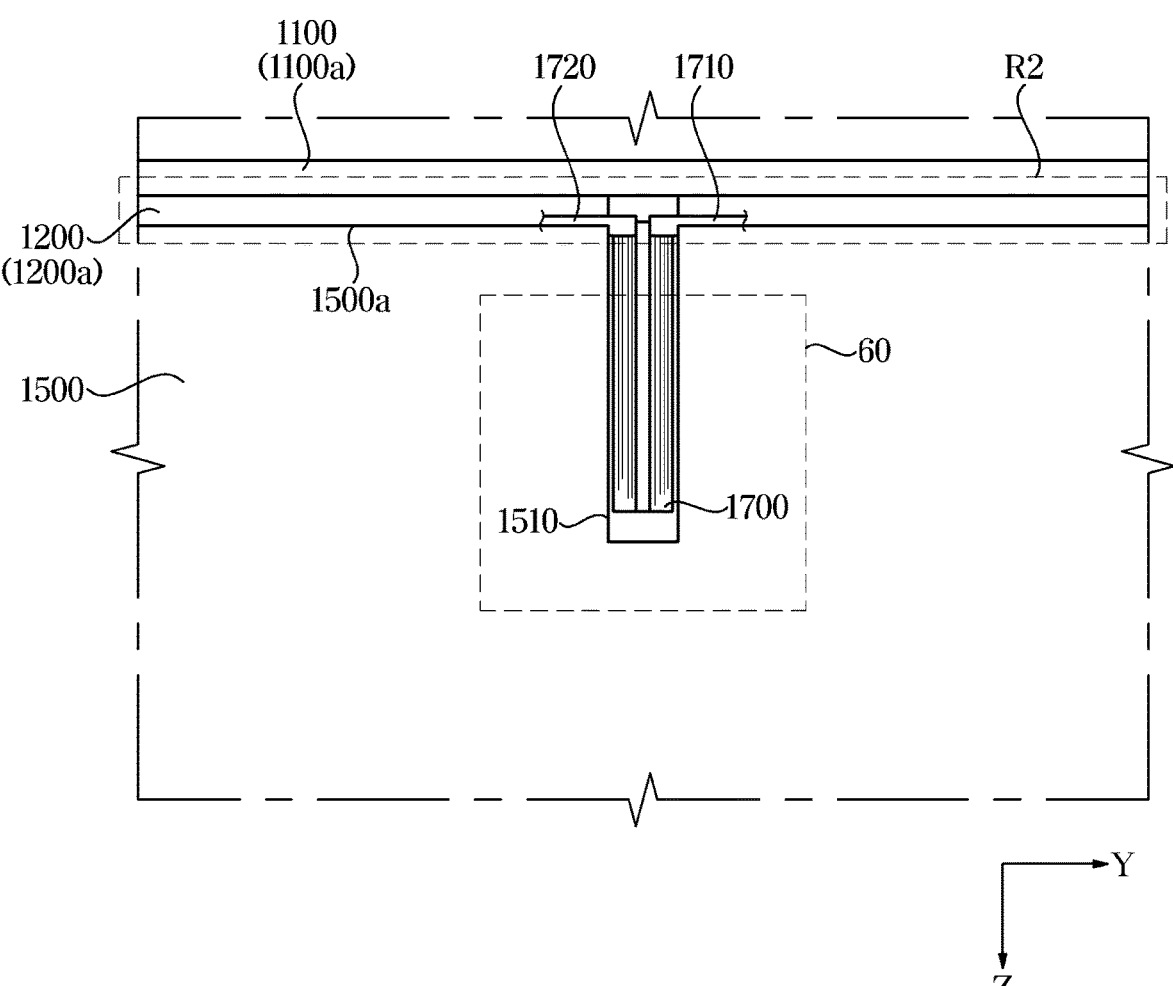
FIG. 14 is an enlarged view illustrating a portion of a rear surface of the electrophoretic display panel of the home appliance according to an embodiment of the disclosure.
Figure 15:
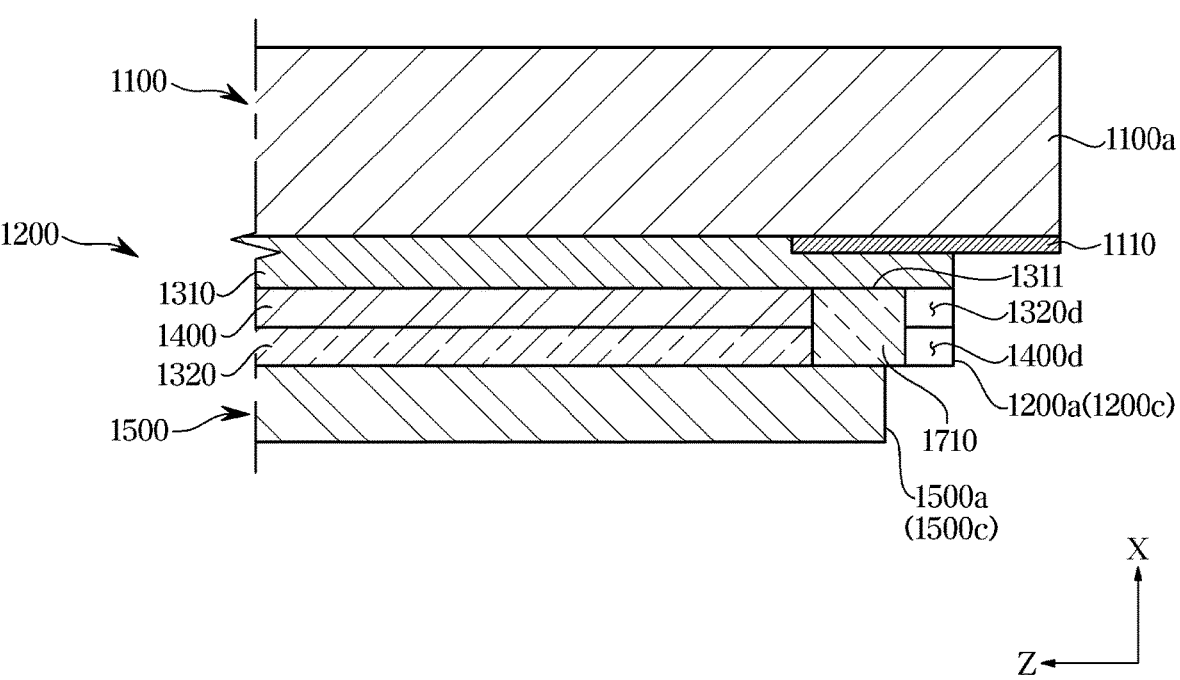
FIG. 15 is an enlarged cross-sectional view illustrating a configuration except for a sealing member in the electrophoretic display panel of the home appliance according to an embodiment of the disclosure.

FIG. 14 is an enlarged view illustrating a portion of the rear surface of the electrophoretic display panel of the home appliance according to an embodiment of the disclosure. FIG. 15 is an enlarged cross-sectional view illustrating a configuration except for the sealing member in the electrophoretic display panel of the home appliance according to an embodiment of the disclosure.

Referring to FIGS. 14 and 15, the electrophoretic display panel 1000 of the home appliance 1 may include the connector 1700 provided to transmit a driving signal to the electrophoretic film 1200.

As described above, the processor 51 may output a driving signal for outputting an electrical signal for driving the electrophoretic film 1200 (the first color mode or the second color mode), and the electrophoretic film 1200 may be electrically connected to the processor 51 to receive the driving signal. The connector 1700 may electrically connect the processor 51 and the electrophoretic film 1200. The driving signal output from the processor 51 may be transmitted to the electrophoretic film 1200 through the connector 1700.

The connector 1700 may be attached to the rear surface of the electrophoretic film 1200 facing the door body 110. In other words, the connector 1700 may be attached to the second electrode layer 1320. The connector 1700 may be disposed between the electrophoretic film 1200 and the protective plate 1500. The protective plate 1500 may cover at least a portion of the connector 1700.

For example, the connector 1700 may be attached to the electrophoretic film 1200 using a conductive adhesive, such as silver paste, but a method of attaching the connector 1700 to the electrophoretic film 1200 is not limited thereto.

The connector 1700 may include the first terminal 1710 connected to the first electrode layer 1310 and the second terminal 1720 connected to the second electrode layer 1320. The connector 1700 may be electrically connected to the first electrode layer 1310 through the first terminal 1710 and electrically connected to the second electrode layer 1320 through the second terminal 1720. The first terminal 1710 and the second terminal 1720 may be configured to provide opposite potentials to the electrophoretic film 1200.

The first electrode layer 1310 may include a first terminal connecting portion 1311 to which the first terminal 1710 is connected. The first terminal connecting portion 1311 may be provided on a rear surface of the first electrode layer 1310 facing the door body 110.

The second electrode layer 1320 may include a second terminal connecting portion to which the second terminal 1720 is connected. The second terminal connecting portion may be provided on the rear surface of the second electrode layer 1320 facing the door body 110.

For example, the first terminal 1710 and the second terminal 1720 may be disposed adjacent to the edge portion 1200a of the electrophoretic film 1200, respectively. The first terminal 1710 may be connected to one side of an edge of the first electrode layer 1310. The second terminal 1720 may be connected to one side of an edge of the second electrode layer 1320.

The connector 1700 is attached to the second electrode layer 1320, so the second terminal 1720 may be connected to the second electrode layer 1320 without bending the second terminal 1720, even if a separate structure is not provided. However, the first terminal 1710 is connected to the first electrode layer 1310, so a gap corresponding to the thicknesses of the electrophoretic layer 1400 and the second electrode layer 1320 may exist between a location where the connector 1700 is attached and a location where the first terminal 1710 is connected.

Accordingly, the electrophoretic layer 1400 and the second electrode layer 1320 may include stepped portions 1320d and 1400d, respectively, to allow the first terminal 1710 to be connected to the first terminal connecting portion 1311. At a position corresponding to the first terminal connecting portion 1311, the electrophoretic layer 1400 and the second electrode layer 1320 are formed to be stepped such that a portion of each edge is positioned inwardly of a portion of the edge of the first electrode layer 1310.

More specifically, the second electrode layer 1320 may include the stepped portion 1320d formed on the edge of the second electrode layer 1320. In addition, the electrophoretic layer 1400 may include the stepped portion 1400d formed on an edge of the electrophoretic layer 1400. The stepped portion 1320d of the second electrode layer and the stepped portion 1400d of the electrophoretic layer may be formed adjacent to the edge portion 1200a of the electrophoretic film 1200.

The stepped portion 1320d of the second electrode layer may be formed to be stepped inwardly from the edge of the first electrode layer 1310. The stepped portion 1320d of the second electrode layer may be formed to be stepped inwardly from the edge of the first terminal connecting portion 1311. The stepped portion 1320d of the second electrode layer may be formed by being concavely recessed from the edge portion 1200a of the electrophoretic film 1200 toward the inside of the edge. The stepped portion 1320d of the second electrode layer may be formed by being concavely recessed from the end surface 1200c of the edge direction of the electrophoretic film 1200 toward the inside of the edge. The stepped portion 1320d of the second electrode layer may be formed by being cut from the edge of the second electrode layer 1320 to the inside of the edge to allow the first terminal connecting portion 1311 to be exposed and to be connected to the first terminal 1710.

The stepped portion 1400d of the electrophoretic layer may be formed to be stepped inwardly of the edge from the edge of the first electrode layer 1310. The stepped portion 1400d of the electrophoretic layer may be formed to be stepped inwardly of the edge from the edge of the first terminal connecting portion 1311. The stepped portion 1400d of the electrophoretic layer may be formed by being concavely recessed from the edge portion 1200a of the electrophoretic film 1200 toward the inside of the edge. The stepped portion 1400d of the electrophoretic layer may be formed by being concavely recessed from the end surface 1200c of the edge direction of the electrophoretic film 1200 toward the inside of the edge. The stepped portion 1400d of the electrophoretic layer may be formed by being cut from the edge of the electrophoretic layer 1400 to the inside of the edge to allow the first terminal connecting portion 1311 to be exposed and to be connected to the first terminal 1710.

The stepped portion 1320d of the second electrode layer and the stepped portion 1400d of the electrophoretic layer may be located at positions corresponding to the first terminal connecting portion 1311, respectively. The stepped portion 1320d of the second electrode layer and the stepped portion 1400d of the electrophoretic layer may have sizes corresponding to each other.

The light blocking layer 1110 may cover the stepped portion 1320d, 1400d from the front (a front direction of the door panel). The light blocking layer 1110 may cover the first terminal 1710 and the second terminal 1720 from the front. As a result, the stepped portion 1320d, 1400d, the first terminal 1710, and the second terminal 1720 may be prevented from being visible from the front of the door 100, and the appearance quality of the product may be improved.

For example, the connector 1700 may be formed of a flexible printed circuit board (FPCB).

Due to the structure of the connector 1700 and the electrophoretic film 1200 to which the connector 1700 is connected as described above, the connector 1700 is attached to the pair of electrode layers 1310 and 1320 without bending the terminals 1710 and 1720. Accordingly, poor energization that may occur when the terminals 1710 and 1720 are bent or oxidation of a bent portion of the terminals 1710 and 1720 that may reduce the durability of the product, may be solved.

The connector 1700 may be electrically connected to the processor 51 through a socket 60 mounted on a PCB (not shown) mounted on the outside of the electrophoretic display panel 1000 or through a wire (not shown). Accordingly, the protective plate 1500 may include a connector opening 1510 formed to allow the connector 1700 to be connected to the socket 60 or the wire. The connector opening 1510 may be disposed between at least a portion of the connector 1700 and the door body 110 and may be formed to allow at least a portion of the connector 1700 to be exposed. More specifically, the connector opening 1510 may be formed such that at least a portion of one surface of the connector 1700 facing the door body 110 is exposed to the outside of the electrophoretic display panel 1000.

The connector opening 1510 may be located at a position adjacent to an edge of the protective plate 1500. More specifically, the connector opening 1510 may extend from the edge portion 1500a of the protective plate 1500 toward the inside of the edge of the protective plate 1500. The connector opening 1510 may be formed by being cut from the end surface 1500c of the edge direction of the protective plate 1500 toward the inside of the edge.

FIGS. 14 and 15 illustrate an embodiment in which the connector 1700 is attached to one side in the Z direction of the edge of the electrophoretic film 1200, but is not limited thereto. The connector 1700 may be attached to one side in the Y direction of the edge.

The configuration of the connector 1700 described above with reference to FIGS. 14 and 15 is only one example of a configuration for transferring a driving signal from a processor to an electrophoretic film in an electrophoretic display panel of a home appliance, and the disclosed embodiments are not limited thereto.

Figure 16:
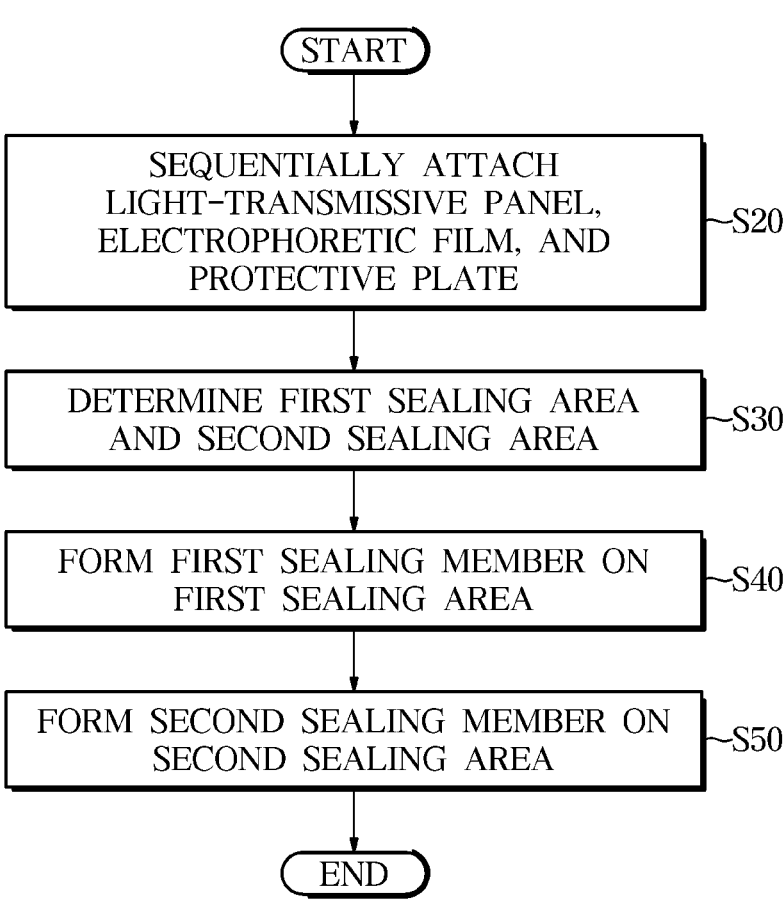
FIG. 16 is a flowchart illustrating a method of manufacturing the home appliance according to an embodiment of the disclosure.

FIG. 16 is a flowchart illustrating the method of manufacturing the home appliance according to an embodiment of the disclosure.

Referring to FIG. 16, the method of manufacturing an electrophoretic display panel provided in the home appliance will be described.

First, before the operations of the method of manufacturing the home appliance 1 shown in FIG. 16 are performed, the operations of preparing the light-transmissive panel 1100, the electrophoretic film 1200, and the protective plate 1500, which are components of the electrophoretic display panel 1000, respectively, may be preceded. At this time, an operation of cutting the light-transmissive panel 1100, the electrophoretic film 1200, and the protective plate 1500 to each designed size may be performed.

In the operation of preparing the light-transmissive panel 1100, an operation of forming the light blocking layer 1110 on the edge portion 1100a of the light-transmissive panel 1100 may be performed. For example, the light blocking layer 1110 may be formed by an operation of applying ink of a light blocking color to the rear surface 1100b of the edge portion 1100a of the light-transmissive panel 1100.

In the operation of preparing the electrophoretic film 1200, an operation of forming the stepped portions 1320d and 1400d at the edges of the second electrode layer 1320 and the electrophoretic layer 1400 may be performed.

In the operation of preparing the protective plate 1500, an operation of forming the connector opening 1510 in the edge portion 1500*a* of the protective plate 1500 may be performed.

Referring to FIG. 16, the method of manufacturing the home appliance 1 may include sequentially attaching the light-transmissive panel 1100, the electrophoretic film 1200, and the protective plate 1500 (S20). More specifically, the light-transmissive panel 1100 may be coupled to one surface of the electrophoretic film 1200 such that the edge of the light-transmissive panel 1100 is positioned outwardly from the edge of the electrophoretic film 1200. The light-transmissive panel 1100 and the electrophoretic film 1200 may be attached by the first adhesive layer ad1. In addition, the protective plate 1500 may be coupled to the other surface of the electrophoretic film 1200 (i.e., the rear surface of the electrophoretic film 1200 facing the door body 110) such that the edge of the protective plate 1500 is positioned inwardly from the edge of the electrophoretic film 1200. The protective plate 1500 and the electrophoretic film 1200 may be attached by the third adhesive layer ad3.

At this time, before the protective plate 1500 is attached to the rear surface of the electrophoretic film 1200, the connector 1700 may be attached to the rear surface of the electrophoretic film 1200. In addition, the connector 1700 may be electrically connected to the pair of electrode layers 1310 and 1320 of the electrophoretic film 1200 by connecting the first terminal 1710 to the first electrode layer 1310 of the pair of electrode layers 1310 and 1320 of the electrophoretic film 1200 and the second terminal 1720 to the second electrode layer 1320 of the pair of electrode layers 1310 and 1320 of the electrophoretic film 1200. After the connector 1700 is attached to the electrophoretic film 1200 and connected to the pair of electrode layers 1310 and 1320, an operation of attaching the protective plate 1500 to the electrophoretic film 1200 is performed. Then, an operation of connecting the connector 1700 to the processor 51 by connecting the socket 60 and the like to the connector 1700 may be performed.

When the combining of the light-transmissive panel 1100, the electrophoretic film 1200, and the protective plate 1500 (S20), is completed as described above, an operation of determining the first sealing area R1 and the second sealing area R2 may be performed (S30). More specifically, the first sealing area R1 may be determined by detecting a boundary between the light-transmissive panel 1100 and the electrophoretic film 1200. The second sealing area R2 may be determined by detecting a boundary between the electrophoretic film 1200 and the protective plate 1500.

Details of the method of determining the first sealing area R1 and the second sealing area R2 will be described later.

Continuously referring to FIG. 16, the method of manufacturing the home appliance 1 may include operations of sealing the end surface 1200*c* of the edge direction of the electrophoretic film 1200 and the end surface 1500*c* of the edge direction of the protective plate 1500 by forming the sealing member 1600 on the first sealing area R1 provided along the edge of the electrophoretic film 1200 and the sealing area R2 provided along the edge of the protective plate 1500 (S40 and S50).

More specifically, forming the second sealing member 1620 on the second sealing area R2 (S50) may be performed after forming the first sealing member 1610 on the first sealing area R1 (S40) is performed. In other words, the operation of forming the sealing member 1600 on the first sealing area R1 and the second sealing area R2 may include first forming the first sealing member 1610 for sealing the end surface 1200*c* of the edge direction of the electrophoretic film 1200 on the first sealing area R1 (S40), and then forming the second sealing member 1620 for sealing the end surface 1500*c* of the edge direction of the protective plate 1500 on the second sealing area R2 (S50).

However, differently from the above, in the case of the embodiment of FIG. 13, the operation of simultaneously forming the sealing member 1600-1 on the first sealing area R1 and the second sealing area R2 may be performed.

When operations (S20, S30, S40, and S50) are performed and the manufacture of the electrophoretic display panel 1000 is then complete, the electrophoretic display panel 1000 is mounted on the door 100 or the base of the main body 10 (e.g., the base 111 of the door body 110). For example, if the electrophoretic display panel 1000 is a part of the door 100 as the door panel 120, the electrophoretic display panel 1000 may be mounted on the door body 110.

Figure 17:
FIG. 17 is a block diagram schematically illustrating a configuration of an apparatus for manufacturing the electrophoretic display panel of the home appliance according to an embodiment of the disclosure.
Figure 17:
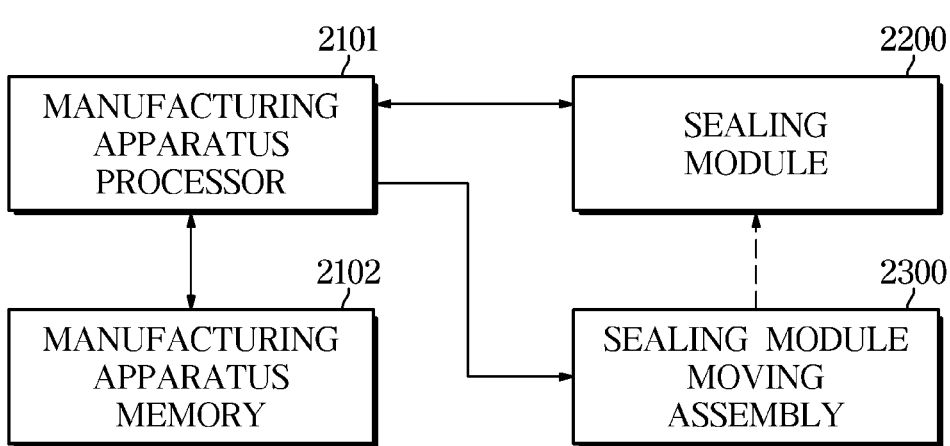

FIG. 17 is a block diagram schematically illustrating a configuration of a manufacturing apparatus for manufacturing the electrophoretic display panel of the home appliance according to an embodiment of the disclosure.

Referring to FIG. 17, one example of a manufacturing apparatus for manufacturing an electrophoretic display panel of a home appliance will be described in detail.

Referring to FIG. 17, a manufacturing apparatus 2000 may include a memory 2102 provided to store data on manufacturing operations, a processor 2101 of the manufacturing apparatus provided to perform the manufacturing operations based on the data on the manufacturing operations, a sealing module 2200 provided to seal the edge of the protective plate 1500, and a sealing module moving assembly 2300 provided to move the sealing module 2200.

The memory 2102 of the manufacturing apparatus may store programs and/or data required for the processor 2101 of the manufacturing apparatus to perform the manufacturing operations. The memory 2102 of the manufacturing apparatus and the processor 2101 of the manufacturing apparatus may be electrically connected to each other.

The processor 2101 of the manufacturing apparatus may control an operation of each component of the manufacturing apparatus 2000. For example, the processor 2101 of the manufacturing apparatus may be electrically connected to the sealing module 2200 and may control an operation of the sealing module 2200. Furthermore, for example, the processor 2101 of the manufacturing apparatus may be electrically connected to the sealing module moving assembly 2300 and may control an operation of the sealing module moving assembly 2300.

The sealing module 2200 may be configured to perform operations of determining the sealing areas R1 and R2, forming the sealing member 1600 on the sealing areas R1 and R2, and the like. The sealing module 2200 may detect the boundary between the electrophoretic film 1200 and the light-transmissive panel 1100 or the boundary between the electrophoretic film 1200 and the protective plate 1500 and transmit the detected data to the processor 2101 of the manufacturing apparatus. The sealing module 2200 may form the sealing member 1600 through operations, such as applying and curing a sealing liquid to the sealing areas R1 and R2 based on the control signal received from the processor 2101 of the manufacturing apparatus.

Figure 18:
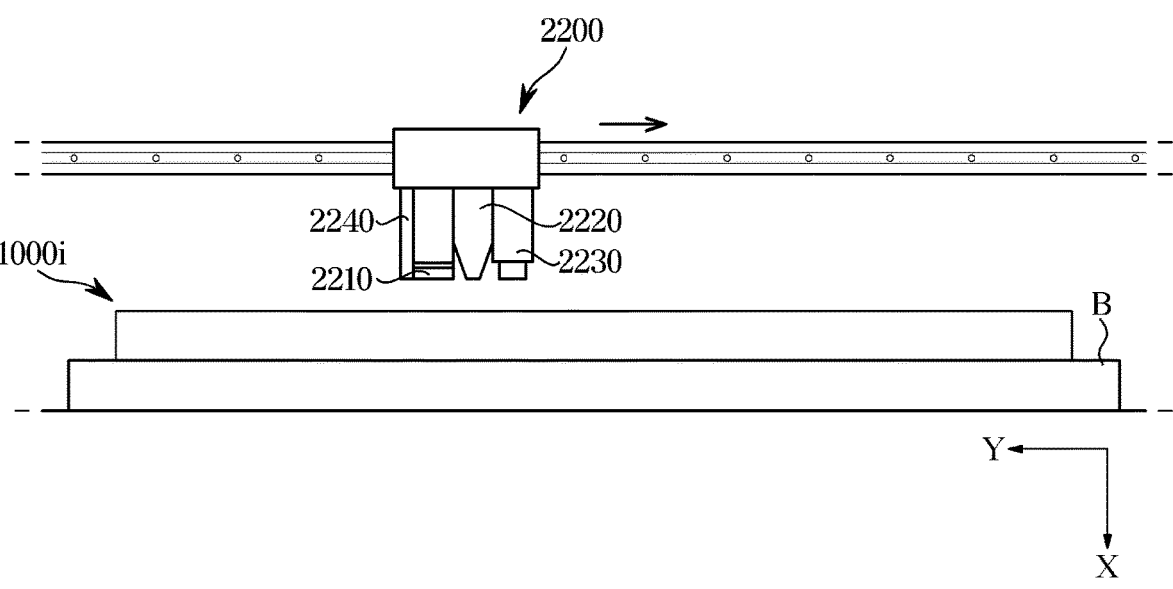
FIG. 18 is a view illustrating an example of a process of manufacturing the electrophoretic display panel according to the method of manufacturing the home appliance according to an embodiment of the disclosure.
Figure 19:
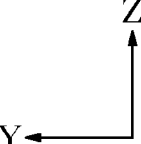
FIG. 19 is a view illustrating an example of a process of manufacturing the electrophoretic display panel according to the method of manufacturing the home appliance according to an embodiment of the disclosure.

FIG. 18 is a view illustrating an example of a process of manufacturing the electrophoretic display panel according to the method of manufacturing a home appliance according to an embodiment of the disclosure. FIG. 19 is a view illustrating an example of a process of manufacturing the electrophoretic display panel according to the method of manufacturing the home appliance according to an embodiment of the disclosure.

One example of a manufacturing apparatus for manufacturing an electrophoretic display panel for a home appliance will be described in detail with reference to FIGS. 18 and 19.

Referring to FIGS. 18 and 19, the electrophoretic display panel 1000 of the home appliance 1 may be manufactured by placing raw material for the electrophoretic display panel 1000 (hereinafter referred to as a panel material 1000i) on a bed B and then forming the sealing member 1600 on the panel material 1000i using the sealing module 2200.

The panel material 1000i may refer to a state after sequentially attaching the light-transmissive panel 1100, the electrophoretic film 1200, and the protective plate 1500, but before forming the sealing member 1600 on the edges of the electrophoretic film 1200 and the protective plate 1500.

The sealing module 2200 may include a camera module 2210 provided to determine the sealing areas R1 and R2. The camera module 2210 may be configured to detect the boundary between the light-transmissive panel 1100 and the electrophoretic film 1200 so as to determine the first sealing area R1. The camera module 2210 may be configured to detect the boundary between the electrophoretic film 1200 and the protective plate 1500 so as to determine the second sealing area R2.

More specifically, the camera module 2210 may capture a rear surface of the panel material 1000i using a light receiver (not shown) (e.g., lens) of the camera module 2210 and convert the light incident on the rear surface of the panel material 1000i captured by the light receiver into an image signal using an image sensor (not shown). In other words, the camera module 2210 may photograph the rear surface of the light-transmissive panel 1100, the electrophoretic film 1200, and the protective plate 1500, and generate an image signal based on the images. The camera module 2210 may transmit an image signal of the rear surface of the panel material 1000i to the processor 2101 of the manufacturing apparatus.

The sealing module 2200 may include a plasma jet 2220 for plasma treating the surfaces of the sealing areas R1 and R2 before forming the sealing member 1600 on the sealing areas R1 and R2 of the panel material 1000i. The plasma jet 2220 may be provided to spray plasma gas onto the sealing areas R1 and R2. The plasma jet 2220 may enable plasma treatment of the sealing areas R1 and R2 at atmospheric pressure at room temperature.

The sealing module 2200 may include a spray nozzle 2230 for spraying a sealing liquid, which is a material of the sealing member 1600, at the sealing areas R1 and R2 onto the panel material 1000i. In addition, the sealing module 2200 may include an ultraviolet (UV) lamp 2240 provided to irradiate the sealing liquid sprayed by the spray nozzle 2230 with ultraviolet (UV) light. The sealing liquid sprayed by the spray nozzle 2230 may include a material that is cured by UV light, such as UV-curable urethane acrylate paint, and the UV lamp 2240 may irradiate the sprayed sealing liquid with UV light. The sealing liquid may be cured by irradiation, resulting in forming the sealing member 1600.

The sealing module 2200 may move in the Y direction or the Z direction from a position above the panel material 1000i placed on the bed B. For example, the sealing module 2200 may photograph the rear surfaces of the light-transmissive panel 1100, the electrophoretic film 1200, and the protective plate 1500 using the camera module 2210 while moving in the Y direction or the Z direction. For example, the sealing module 2200 may spray plasma gas onto the surfaces of the sealing areas R1 and R2 using the plasma jet 2220 while moving in the Y direction or the Z direction, and perform surface treatment. For example, the sealing module 2200 may spray the sealing liquid onto the sealing areas R1 and R2 using the spray nozzle 2230 while moving in the Y direction or the Z direction. For example, the sealing module 2200 may irradiate the sealing liquid sprayed onto the sealing areas R1 and R2 with UV light using the UV lamp 2240 while moving in the Y direction or the Z direction to cure the sealing liquid, thereby forming the sealing member 1600.

The sealing module moving assembly 2300 provided to move the sealing module 2200 may include a support 2310 for movably supporting the sealing module 2200 in the Y (or Z) direction and a guide rail 2320 for movably guiding the support 2310 in the Z (or Y) direction. In addition, although not shown in the drawings, the manufacturing apparatus 2000 may further include a motor that provides power for the movement of the support 2310 in the Z (or Y) direction and the movement of the sealing module 2200 in the Y (or Z) direction, and a driving circuit for driving the motor.

The configuration of the manufacturing apparatus 2000 described above with reference to FIGS. 17 to 19 is only one example of a manufacturing apparatus for manufacturing an electrophoretic display panel for a home appliance, and a manufacturing apparatus for manufacturing an electrophoretic display panel of a household appliance is not limited thereto.

Figure 20:
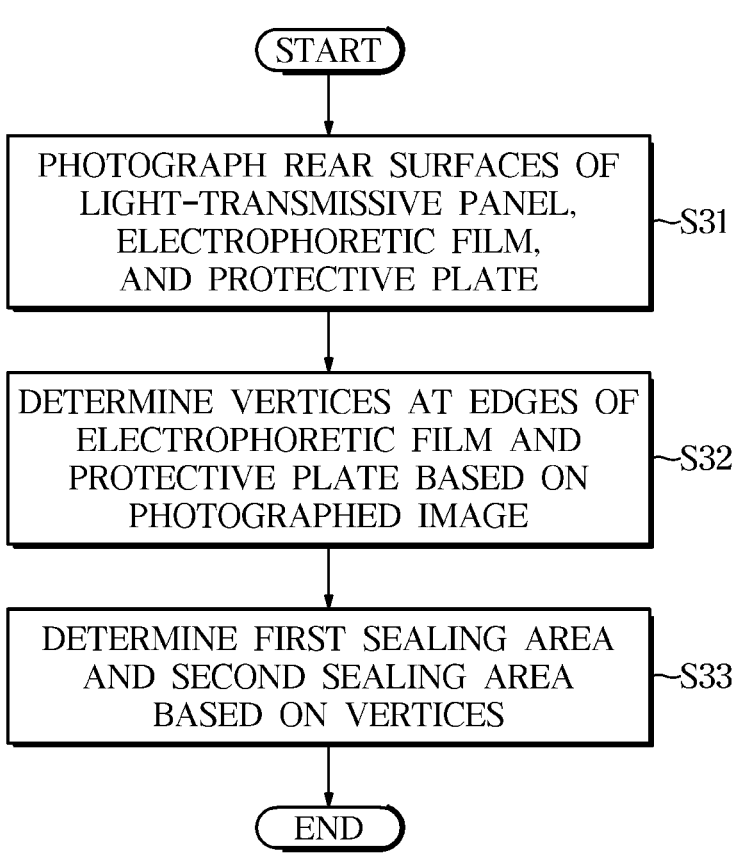
FIG. 20 is a flowchart illustrating an example of a method of determining a sealing area in the method of manufacturing the home appliance according to an embodiment of the disclosure.

FIG. 20 is a flowchart illustrating an example of a method of determining the sealing area in the method of manufacturing the home appliance according to an embodiment of the disclosure.

One example of the method of determining the sealing area in the method of manufacturing the home appliance will be described in detail with reference to FIG. 20.

Referring to FIG. 20, the method of manufacturing the home appliance 1 may include determining the first sealing area R1 by detecting the boundary between the light-transmissive panel 1100 and the electrophoretic film 1200, and determining the second sealing area R2 by detecting the boundary between the electrophoretic film 1200 and the protective plate 1500, using the camera module 2210 (S30).

More specifically, the operation of determining the first sealing area R1 and the second sealing area R2 (S30), may include photographing the rear surfaces of the light-transmissive panel 1100, the electrophoretic film 1200, and the protective plate 1500 using the camera module 2210 (S31). An image signal photographed by the camera module 2210 may be stored in the memory 2102 of the manufacturing apparatus.

The operation of determining the first sealing area R1 and the second sealing area R2 (S30) may be performed while the sealing module 2200 is moved by the sealing module moving assembly 2300.

In the operation of determining the first sealing area R1 and the second sealing area R2 (S30), the processor 2101 of the manufacturing apparatus may determine the sealing areas R1 and R2 by processing the images photographed by the camera module 2210.

More specifically, the operation of determining the first sealing area R1 and the second sealing area R2 (S30), may include determining, based on the photographed image, vertices at the edges of the electrophoretic film 1200 and the protective plate 1500 (S32). The processor 2101 of the manufacturing apparatus may determine vertices at the edge of the electrophoretic film 1200 and vertices at the edge of the protective plate 1500 based on the image photographed by the camera module 2210.

Thereafter, the operation of determining the first sealing area R1 and the second sealing area R2 (S30), may include determining the first sealing area R1 and the second sealing area R2 based on the vertices determined (S33) in the operation (S32).

For example, the processor 2101 of the manufacturing apparatus may determine the first sealing area R1 of the rectangle by determining at least three vertices among vertices at the edge of the electrophoretic film 1200. In this case, the first sealing area R1 is formed along four sides of the rectangle, and each side may have a predetermined thickness. The predetermined thickness of each side of the first sealing area R1 may be set to a suitable thickness required to seal the edge of the electrophoretic film 1200. The predetermined thickness of each side of the first sealing area R1 may be experimentally or empirically determined. A numerical value corresponding to the predetermined thickness of each side of the first sealing area R1 may be stored in the memory 2102 of the manufacturing apparatus, or data on an amount or time of spraying of the sealing liquid of the first sealing member 1610 that is set to allow each side of the first sealing region R1 to have the predetermined thickness may be stored in the memory 2102 of the manufacturing apparatus.

Furthermore, for example, the processor 2101 of the manufacturing apparatus may determine the second sealing area R2 of the rectangular by determining at least three vertices among vertices at the edge of the protective plate 1500. In this case, the second sealing area R2 is formed along four sides of the rectangle, and each side may have a predetermined thickness. The predetermined thickness of each side of the second sealing area R2 may be set to a suitable thickness required to seal the edge of the protective plate 1500. The predetermined thickness of each side of the second sealing area R2 may be experimentally or empirically determined. A numerical value corresponding to the predetermined thickness of each side of the second sealing area R2 may be stored in the memory 2102 of the manufacturing apparatus, or data on an amount or time of spraying of the sealing liquid of the second sealing member 1620 that is set to allow each side of the second sealing region R2 to have the predetermined thickness may be stored in the memory 2102 of the manufacturing apparatus.

The method of determining the first sealing area R1 and the second sealing area R2 described above with reference to FIG. 20 is only an example of some operations included in the method of manufacturing a home appliance. However, a method of manufacturing a home appliance is not limited thereto.

Figure 21:
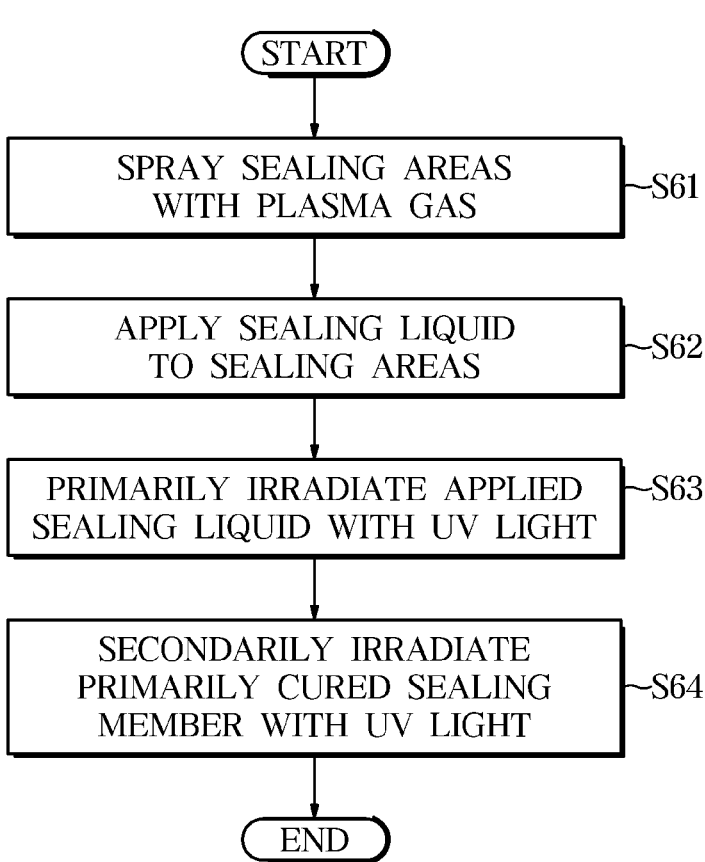
FIG. 21 is a flowchart illustrating an example of forming a sealing member in the sealing area in the method of manufacturing the home appliance according to an embodiment of the disclosure.

FIG. 21 is a flowchart illustrating an example of forming the sealing member in the sealing areas in the method of manufacturing the home appliance according to an embodiment of the disclosure.

One example of the method of forming the sealing member in the sealing areas of the method of manufacturing the home appliance will be described in detail with reference to FIG. 21.

Referring to FIG. 21, the method of manufacturing the home appliance 1 may include surface treating by spraying the sealing areas R1 and R2 with plasma gas before forming the sealing member 1600 on the sealing areas R1 and R2 (S61). The operation of surface treating by spraying the plasma gas onto the sealing areas R1 and R2 (S61) may be performed by the plasma jet 2220. The operation of surface treating by spraying the plasma gas onto the sealing areas R1 and R2 (S61) may be performed as a plasma treatment process at atmospheric pressure at room temperature.

The spraying of the plasma gas onto the sealing areas R1 and R2 (S61) may be performed while the sealing module 2200 is moved by the sealing module moving assembly 2300. The plasma jet 2220 may spray plasma gas onto the sealing areas R1 and R2 while moving along the sealing areas R1 and R2 determined by the processor 2101 of the manufacturing apparatus.

When such a plasma treatment process is performed, an effect of surface cleaning of the sealing areas R1 and R2 and surface modification to impart hydrophilicity to the surface may be provided. As a result, adhesion between the sealing member 1600 and the sealing areas R1 and R2 may be increased, thereby improving the durability and life of the product.

Continuously referring to FIG. 21, the method of manufacturing the home appliance 1 may include applying the sealing liquid to the sealing areas R1 and R2 (S62), and irradiating the applied sealing liquid with UV light (S63 and S64). In other words, in the manufacturing method of the home appliance 1, the operations of forming the sealing member 1600 on the first sealing area R1 and the second sealing area R2 (S40 and S50) may include applying the sealing liquid along each of the first sealing area R1 and the second sealing area R2 (S62), and curing the applied sealing liquid by irradiating the applied sealing liquid with UV light (S63 and S64).

The applying of the sealing liquid to the sealing areas R1 and R2 (S62) may be performed by the spray nozzle 2230. The applying of the sealing liquid to the sealing areas R1 and R2 (S62) may be performed while the sealing module 2200 is moved by the sealing module moving assembly 2300. The spray nozzle 2230 may spray the sealing liquid onto the sealing areas R1 and R2 while moving along the sealing areas R1 and R2 determined by the processor 2101 of the manufacturing apparatus.

The irradiating of the applied sealing liquid with UV light (S63 and S64) may be performed by the UV lamp 2240. The irradiating of the applied sealing liquid with UV light (S63 and S64) may be performed while the sealing module 2200 is moved by the sealing module moving assembly 2300. The UV lamp 2240 may irradiate the applied sealing liquid with UV light while moving along the sealing areas R1 and R2 determined by the processor 2101 of the manufacturing apparatus. The sealing liquid applied to the sealing areas R1 and R2 may be cured and fixed to the sealing areas R1 and R2 when irradiated with UV light, thereby forming the sealing member 1600.

The irradiating of the applied sealing liquid with UV light by the UV lamp 2240 will be described in more detail. The UV lamp 2240 may primarily irradiate the sealing liquid applied to the sealing areas R1 and R2 with UV light, so as to cure the sealing liquid (S63) (a primary curing process). The primary curing process may be performed almost simultaneously with the applying of the sealing liquid through the spray nozzle 2230. More specifically, in the first curing process, as the sealing module 2200 moves along the sealing areas R1 and R2, in a direction of movement of the sealing module 2200, the spray nozzle 2230 moves ahead to spray the sealing liquid, and the UV lamp 2240, which moves behind the spray nozzle 2230, may irradiate the sealing liquid with UV light to cure the sealing liquid.

After the primary curing process is completed, to more firmly cure the sealing member 1600, the UV lamp 2240 may secondarily irradiate the primarily cured sealing member 1600 with UV light to cure the sealing member 1600 (S64) (a secondary curing process). When the secondary curing process is completed, the sealing member 1600 may be finally formed.

However, the disclosed embodiments are not limited thereto, and the curing of the sealing liquid by the irradiation of the UV light may not be performed by dividing the above-described primary curing process and secondary curing process.

The operations of the manufacturing method shown in FIG. 21 may be performed in the order of first performing the surface treatment by spraying plasma gas onto the first sealing area R1 and the second sealing area R2, respectively, followed by applying the sealing liquid onto the sealing areas R1 and R2 and irradiating the applied sealing liquid with UV light. Alternatively, the operations of the manufacturing method shown in FIG. 21 may be performed in the order of first forming the first sealing member 1610 by performing the surface treatment by spraying plasma gas onto the first sealing area R1, applying the sealing liquid onto the first sealing areas R1, and irradiating the applied sealing liquid with primary and secondary UV light, followed by forming the second sealing member 1620 by performing the surface treatment by spraying plasma gas onto the second sealing area R2, applying the sealing liquid onto the second sealing areas R2, and irradiating the applied sealing liquid with primary and secondary UV light. Alternatively, the operations of the manufacturing method shown in FIG. 21 may be performed in the order of first performing the surface treatment by spraying plasma gas onto the first sealing area R1 and the second sealing area R2, respectively, followed by first applying the sealing liquid onto the first sealing areas R1 and irradiating the applied sealing liquid with primary UV light, then applying the sealing liquid onto the second sealing areas R2 and irradiating the applied sealing liquid with primary UV light, finally irradiating the primary cured the first sealing member 1610 and the second sealing member 1620 with secondary UV light. Alternatively, the operations of the manufacturing method shown in FIG. 21 may be performed in the order of first primary curing the first sealing member 1610 by performing the surface treatment by spraying plasma gas onto the first sealing area R1, applying the sealing liquid onto the first sealing areas R1, and irradiating the applied sealing liquid with primary UV light, then primary curing the second sealing member 1620 by performing the surface treatment by spraying plasma gas onto the second sealing area R2, applying the sealing liquid onto the second sealing areas R2, and irradiating the applied sealing liquid with primary UV light, finally secondary curing each of the first and second sealing members 1610 and 1620 by irradiating the applied sealing liquid with secondary UV light.

In addition, the operations of the manufacturing method shown in FIG. 21 may include various operations, and may be performed in various combinations of order.

The method of forming the sealing member 1600 on the sealing areas R1 and R2 described above with reference to FIG. 21 is only an example of some operations included in a method of manufacturing a home appliance, and a method of manufacturing a home appliance is not limited thereto.

Figure 22:
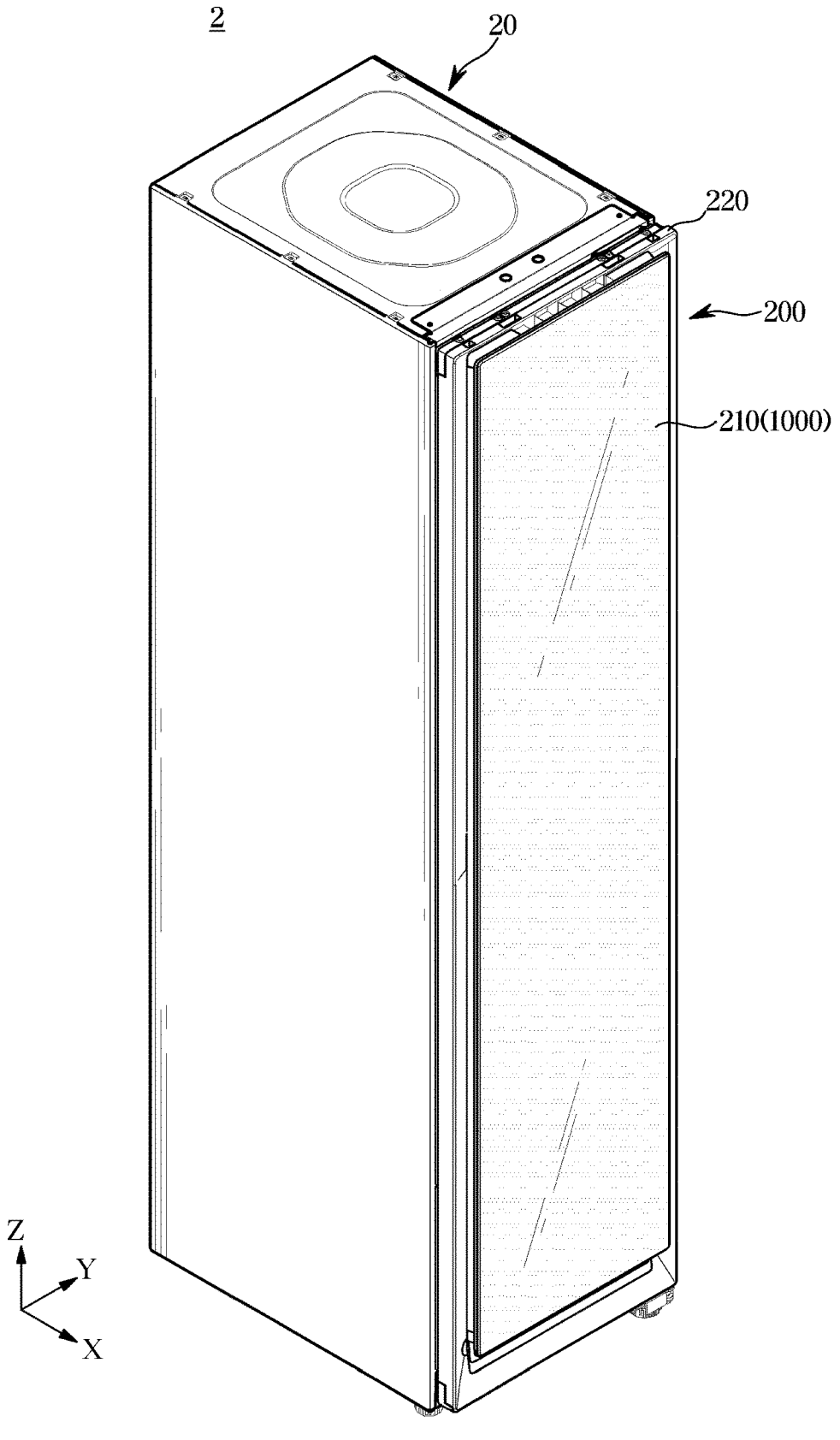
FIG. 22 is a perspective view illustrating a clothes care device that is a type of home appliance according to an embodiment of the present disclosure.

FIG. 22 is a perspective view illustrating a clothes care appliance that is a type of home appliance according to an embodiment of the disclosure.

Referring to FIG. 22, a clothes care appliance 2, which is a type of home appliance, may include a main body 20 forming an exterior and a door 200 rotatably coupled to the main body 20. The clothes care appliance 2 may include a clothes management room provided inside the main body 20 to receive clothes, a clothes support member (not shown) provided inside the clothes management room to hold clothes, and a machine room (not shown) equipped with a heat exchanger (not shown) provided to dehumidify or heat air inside the clothes management room.

The door 200 may open and close the clothes management room provided inside the main body 20. The door 200 may include a door panel 210 and a door body 220. The door panel 210 may be coupled to the door body 220.

As shown in FIG. 22, the door panel 210 may be disposed in front of the door body 220. The door panel 210 may be coupled to a front surface of the door body 220. The door panel 210 may form a front exterior of the door 200.

Here, the direction of each component of the door 200 is defined based on when the door 200 is in a position to close the clothes management room. For example, "a front of the door body 220" means a front of the clothes care appliance 2 in the X direction when the door 200 is in a position to close the clothes management room. Also, for example, "a front side of the door 200" means one side of the door 200 that is visible to the user when the door 200 is in a position to close the clothes management room.

The door body 220 may include a base and a coupling portion protruding from the base, similar to the door body 110 of the refrigerator 1 described in FIG. 1 to FIG. 21.

For example, the door panel 210 may be formed to have a substantially flat plate shape. Correspondingly, the front surface of the door body 220 to which the door panel 210 is coupled may have a substantially flat plate shape.

The door panel 210 may be coupled to the door body 220 by various known methods.

The door panel 210 may include the electrophoretic display panel 1000. The door panel 210 including the electrophoretic display panel 1000 may display different designs or colors based on a user input. Alternatively, the door panel 210 including the electrophoretic display panel 1000 may display different designs or colors based on an operating condition of the clothes care appliance 2.

The electrophoretic display panel 1000, the method of manufacturing the electrophoretic display panel 1000, and the method of controlling the electrophoretic display panel 1000 are the same as those described with reference to FIG. 1 to FIG. 21, and thus detailed descriptions thereof will be omitted.

Figure 23:
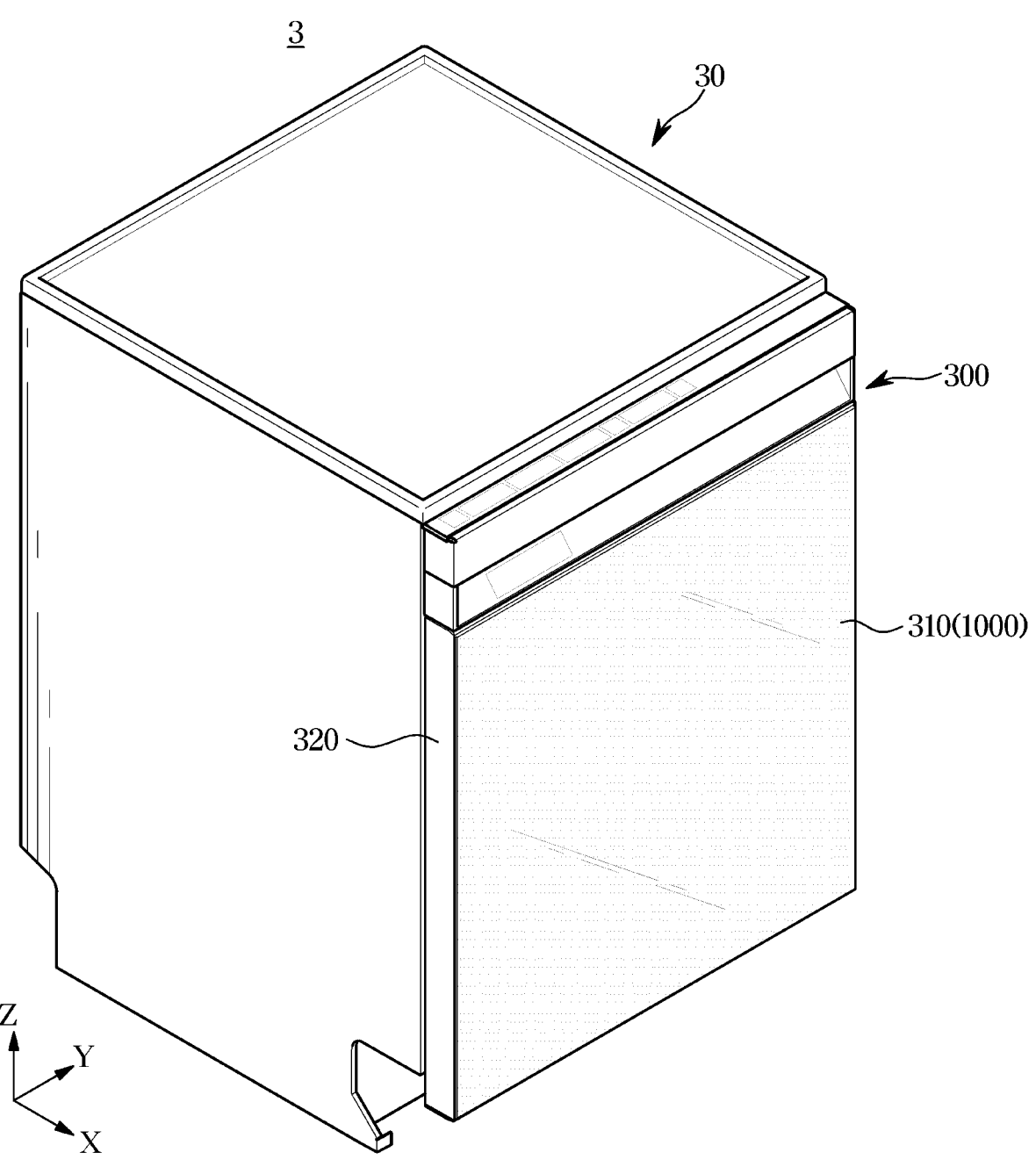
FIG. 23 is a perspective view illustrating a dishwasher that is a type of home appliance according to an embodiment of the disclosure.

FIG. 23 is a perspective view illustrating a dishwasher that is a type of home appliance according to an embodiment of the disclosure.

Referring to FIG. 23, a dishwasher 3, which is a type of home appliance, may include a main body 30 forming an exterior and a door 300 rotatably coupled to the main body 30.

A washing room (not shown) for receiving dishes may be provided inside the main body 30. The dishwasher 3 may include various parts, such as a plurality of nozzles for washing dishes received in the washing room, a driving device for driving the plurality of nozzles, and a controller for controlling the driving device.

The door 300 may open and close the washing room provided inside the main body 30. The door 300 may include a door panel 310 and a door body 320. The door panel 310 may be coupled to the door body 320.

As shown in FIG. 23, the door panel 310 may be disposed in front of the door body 320. The door panel 310 may be coupled to a front surface of the door body 320. The door panel 310 may form a front exterior of the door 300.

Here, the direction of each component of the door 300 is defined based on when the door 300 is in a position to close the washing room. For example, "a front of the door body 320" means a front of the dishwasher 3 in the X direction when the door 300 is in a position to close the washing room. Also, for example, "a front side of the door 300" means one side of the door 300 that is visible to the user when the door 300 is in a position to close the washing room.

The door body 320 may include a base and a coupling portion protruding from the base, similar to the door body 110 of the refrigerator 1 described in FIG. 1 to FIG. 21.

For example, the door panel 310 may be formed to have a substantially flat plate shape. Correspondingly, the front surface of the door body 320 to which the door panel 310 is coupled may have a substantially flat plate shape.

The door panel 310 may be coupled to the door body 320 by various known methods.

The door panel 310 may include the electrophoretic display panel 1000. The door panel 310 including the electrophoretic display panel 1000 may display different designs or colors based on a user input. Alternatively, the door panel 310 including the electrophoretic display panel 1000 may display different designs or colors based on an operating condition of the dishwasher 3.

The electrophoretic display panel 1000, the method of manufacturing the electrophoretic display panel 1000, and the method of controlling the electrophoretic display panel 1000 are the same as those described with reference to FIG. 1 to FIG. 21, and thus detailed descriptions thereof will be omitted.

Figure 24:
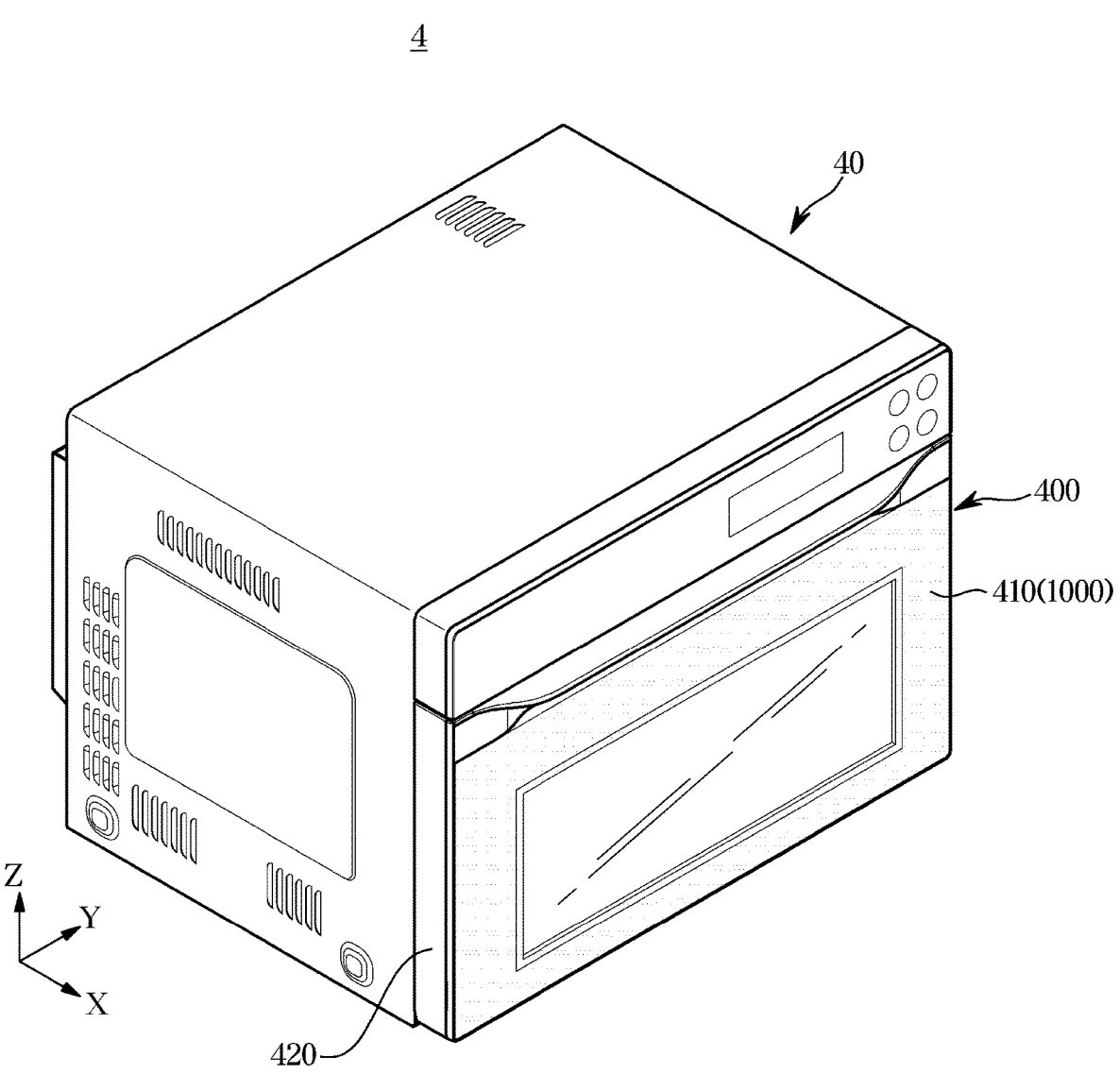
FIG. 24 is a perspective view illustrating a cooking appliance that is a type of home appliance according to an embodiment of the disclosure.

FIG. 24 is a perspective view illustrating a cooking appliance that is a type of home appliance according to an embodiment of the disclosure.

Referring to FIG. 24, a cooking appliance 4, which is a type of home appliance, may include a main body 40 forming an exterior and a door 400 rotatably coupled to the main body 40.

A cooking room (not shown) for receiving ingredients may be provided inside the main body 40. The cooking appliance 4 includes various parts, such as a heater, a heating wire, a fan, and a controller for heating and cooking the ingredients received in the cooking room.

The door 400 may open and close the cooking room provided inside the main body 40. The door 400 may include a door panel 410 and a door body 420. The door panel 410 may be coupled to the door body 420.

As shown in FIG. 24, the door panel 410 may be disposed in front of the door body 420. The door panel 410 may be coupled to a front surface of the door body 420. The door panel 410 may form a front exterior of the door 400.

Here, the direction of each component of the door 400 is defined based on when the door 400 is in a position to close the cooking room. For example, "a front of the door body 420" means a front of the cooking appliance 4 in the X direction when the door 400 is in a position to close the cooking room. Also, for example, "a front side of the door 400" means one side of the door 400 that is visible to the user when the door 400 is in a position to close the cooking room.

The door body 420 may include a base and a coupling portion protruding from the base, similar to the door body 110 of the refrigerator 1 described in FIG. 1 to FIG. 21.

For example, the door panel 410 may be formed to have a substantially flat plate shape. Correspondingly, the front surface of the door body 420 to which the door panel 410 is coupled may have a substantially flat plate shape.

The door panel 410 may be coupled to the door body 420 by various known methods.

The door panel 410 may include the electrophoretic display panel 1000. The door panel 410 including the electrophoretic display panel 1000 may display different designs or colors based on a user input. Alternatively, the door panel 410 including the electrophoretic display panel 1000 may display different designs or colors based on an operating condition of the cooking appliance 4.

In an example, the cooking appliance 4 is an oven, but an induction heating appliance, which heats a cooking vessel placed on a plate using magnetic induction, may also be included in the cooking appliance 4. When the cooking appliance 4 is implemented by the induction heating appliance, the electrophoretic display panel 1000 may be adapted to a control panel or plate on which a user interface is provided.

The electrophoretic display panel 1000, the method of manufacturing the electrophoretic display panel 1000, and the method of controlling the electrophoretic display panel 1000 are the same as those described with reference to FIG. 1 to FIG. 21, and thus detailed descriptions thereof will be omitted.

Figure 25:
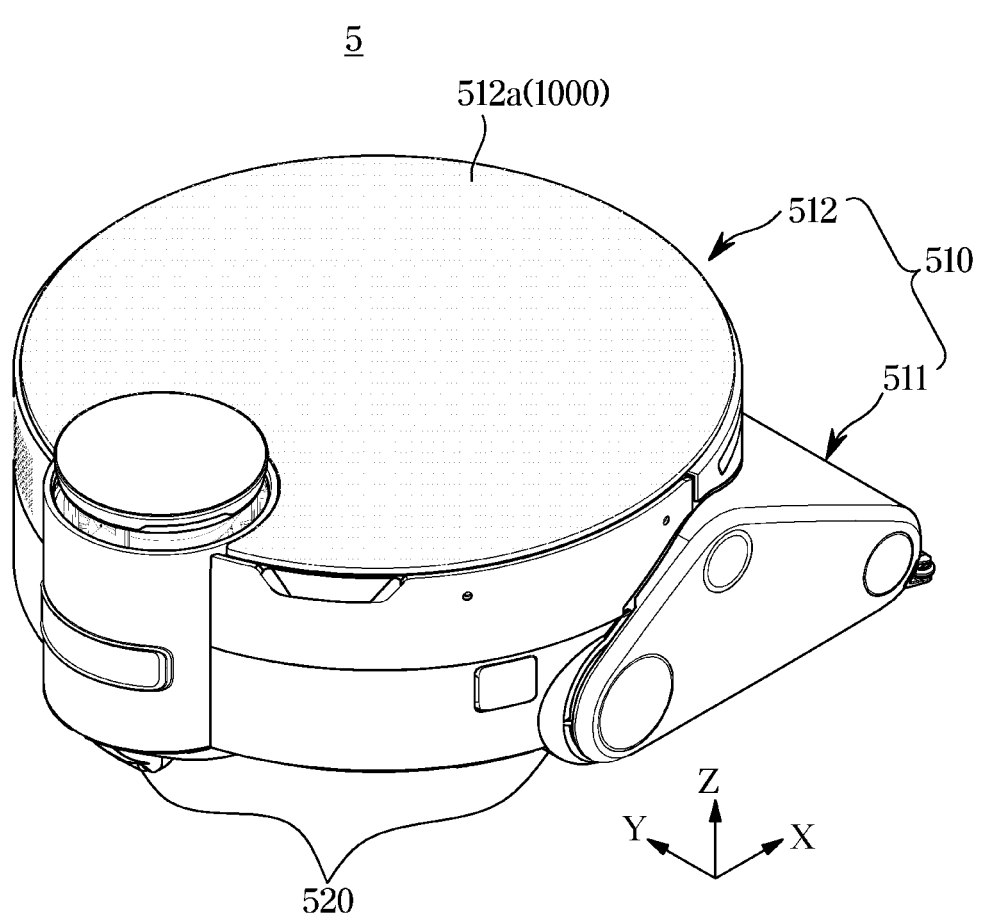
FIG. 25 is a perspective view illustrating a robot cleaner that is a type of home appliance according to an embodiment of the present disclosure.

FIG. 25 is a perspective view illustrating a robot cleaner that is a type of home appliance according to an embodiment of the disclosure.

Referring to FIG. 25, a home appliance may include a robot cleaner 5.

The robot cleaner 5 is a device that removes dust and the like accumulated on a floor while driving in a cleaning area without user manipulation. The robot cleaner 5 may clean the cleaning area without omission by controlling a driving device and efficiently remove dust and the like by controlling the cleaning device.

More specifically, the robot cleaner 5 may include a cleaner body 510 and a drive unit 520 provided to travel in the cleaning area.

The cleaner body 510 forms an exterior of the robot cleaner 5 and may accommodate various parts of the robot cleaner 5. For example, the cleaner body 510 may include a brush (not shown) for intaking foreign substances on a surface to be cleaned, a suction motor (not shown) for generating suction force, a filter (not shown), a dust collecting container (not shown), a battery (not shown), and the like.

The drive unit 520 may be coupled to the cleaner body 510, and include at least one wheel to travel in a cleaning area. The wheel of the drive unit 520 may be rotatably provided by a drive motor (not shown). The drive motor may be controlled by a processor of the robot cleaner 5.

The cleaner body 510 may include a first case 511 provided to which the drive unit 520 is coupled and to intake foreign substances on a surface to be cleaned by generating a suction force, and a second case 512 provided to cover an upper portion of the first case 511.

The brush, motor, filter, dust collecting container, battery, and the like of the robot cleaner 5 described above may be accommodated in the first case 511.

The second case 512 may form an upper surface of the cleaner body 510. As shown in FIG. 25, the second case 512 may have a substantially flat outer surface. However, the shape of the second case 512 is not limited thereto, and for example, the second case 512 may include a curved shape on at least a portion of an outer surface thereof.

Although FIG. 25 shows that the first case 511 and the second case 512 are separated from each other, it is not limited thereto. Alternatively, the first case 511 and the second case 512 may be integrally formed.

For example, the second case 512 of the robot cleaner 5 may include a case body and an upper panel 512*a* mounted on the case body. The upper panel 512*a* may form at least a portion of the upper surface of the robot cleaner 5. The case body may support the upper panel 512*a* from the lower side. The upper panel 512*a* may be coupled to the case body in various known ways.

The case body may include a base and a coupling portion protruding from the base, similar to the door body 110 of the refrigerator 1 described in FIG. 1 to FIG. 21. The upper panel 512*a* may be coupled to the coupling portion. The base may face a lower surface of the upper panel 512*a*.

For example, the upper panel 512*a* may be formed to have a substantially flat plate shape.

The upper panel 512*a* may include the electrophoretic display panel 1000. The upper panel 512*a* including the electrophoretic display panel 1000 may display different designs or colors based on a user input. Alternatively, the upper panel 512*a* including the electrophoretic display panel 1000 may display different designs or colors based on an operating condition of the robot cleaner 5.

Each layer of the electrophoretic display panel 1000 adapted to the upper panel 512*a* of the robot cleaner 5 may be arranged in the Z direction, which is a vertical direction of the robot cleaner 5. A relationship in which each layer of the electrophoretic display panel 1000 adapted to the upper panel 512*a* of the robot cleaner 5 is arranged in the Z direction is the same as a relationship in which each layer of the electrophoretic display panel 1000 adapted to the door panel 120 of the refrigerator 1 described in FIG. 1 to FIG. 21 is arranged in the X direction. For example, the electrophoretic display panel 1000 adapted to the upper panel 512*a* of the robot cleaner 5 may include the plate, the first electrode, the electrophoretic layer, the second electrode, and the protective plate which are placed in the order from top to bottom in the Z direction. The sealing member of the electrophoretic display panel 1000 may be disposed along its edge.

Unlike shown in FIG. 25, the electrophoretic display panel 1000 may be employed on an outer circumferential surface of the second case 512 or on a panel of an outer surface of the first case 511.

The electrophoretic display panel 1000, the method of manufacturing the electrophoretic display panel 1000, and the method of controlling the electrophoretic display panel 1000 are the same as those described with reference to FIG. 1 to FIG. 21, and thus detailed descriptions thereof will be omitted.

Home appliances 1, 2, 3, and 4 may include the main body 10, 20, 30, and 40, and the doors 100, 200, 300, and 400 provided to open and close the main body. The doors 100, 200, 300, and 400 may include the door body 110, 220, 320, and 420 and the door panel 1000 provided on one side of the door body. The door panel 1000 may include the light-transmissive panel 1100 disposed on one side of the door body and provided to transmit light, the electrophoretic film 1200 disposed between the light-transmissive panel and the door body, and the protective plate 1500 disposed between the electrophoretic film and the door body to protect the electrophoretic film, and the sealing members 1600 and 1600-1 arranged along the edge portion 1100*a* of the light-transmissive panel extending outwardly from the edge of the electrophoretic film 1200*a* and the edge of the protective plate 1500*a* and provided to cover the edge of the electrophoretic film and the edge of the protective plate. By including the electrophoretic display panel 1000, the exterior design of the home appliance may be changed without replacing the exterior panel. In addition, the home appliance may reduce the power consumption required in the process of changing and maintaining the color of the exterior panel by using the electrophoretic display panel 1000. In addition, it is possible to prevent the electrophoretic display panel 1000 from being damaged and to improve the durability or life of the product.

The sealing members 1600 and 1600-1 may cover the rear surface 1100*b* of the edge portion of the light-transmissive panel facing the door body and the end surface 1200*c* of the edge direction of the electrophoretic film. It is possible to effectively prevent the inflow of moisture or foreign substances between each layer of the electrophoretic display panel or on the cut surfaces, thereby improving the durability or life of the product.

The edge 1200*a* of the electrophoretic film may extend outwardly from the edge portion 1500*a* of the protective plate. The sealing members 1600 and 1600-1 may cover the rear surface 1200*b* of the edge direction of the electrophoretic film facing the door body and the end surface 1500*c* of the edge direction of the protective plate. It is possible to effectively prevent the inflow of moisture or foreign substances between each layer of the electrophoretic display panel or on the cut surfaces, thereby improving the durability or life of the product.

The sealing member may include the first sealing member 1610 provided to cover the end surface 1200*c* of the edge direction of the electrophoretic film and the edge portion 1200*b* of the rear surface of the electrophoretic film facing the door body, and the second sealing member 1620 provided to cover the end surface 1500*c* of the edge direction of the protective plate and the edge portion 1500*b* of the rear surface of the protective plate facing the door body. It is possible to effectively prevent the inflow of moisture or foreign substances between each layer of the electrophoretic display panel or on the cut surfaces, thereby improving the durability or life of the product. In addition, the accuracy of the sealing may be improved the use of the first sealing member 1610 and the second sealing member 1620.

The second sealing member 1620 may be coupled to the first sealing member 1610, and be disposed between at least a portion of the first sealing member 1610 and the door body 110, 220, 320, and 420.

The home appliances 1, 2, 3, and 4 may further include the processor 51 provided to output the driving signal of the electrophoretic film 1200. The electrophoretic film 1200 may include the first electrode layer 1310 electrically connected to the processor and adjacent to the light-transmissive panel, and the second electrode layer 1320 disposed opposite to the first electrode layer and adjacent to the protective plate. The door panel 1000 may further include the connector 1700 electrically connecting the processor and the electrophoretic film, the connector 1700 including the first terminal 1710 connected to the first electrode layer and the second terminal 1720 connected to the second electrode layer. The connector 1700 may be attached to the second electrode layer 1320.

The protective plate 1500 may include the connector opening 1510 provided between at least a portion of the connector and the door body and formed to expose the at least a portion of the connector.

The connector opening 1500 may extend from the edge portion 1500*a* of the protective plate toward the inside of the edge of the protective plate.

The electrophoretic film 1200 may further include the electrophoretic layer 1400 including the color cells accommodating charged particles having colors and provided between the first electrode layer and the second electrode layer. The first electrode layer 1310 may include the first terminal connecting portion 1311 provided on the rear surface of the first electrode layer facing the door body to allow the first terminal to be connected. The electrophoretic layer 1400 and the second electrode layer 1320 may include the stepped portions 1400d and 1320d formed to be stepped inwardly from the edge of the first terminal connecting portion to allow the first terminal to be connected to the first terminal connecting portion. The home appliance may include the improved connector 1700 and the improved connection structure between the connector 1700 and the electrode layers 1310 and 1320 to prevent short circuits, and may improve the durability or life of the product by preventing the connector 1700 from being damaged by oxidation or the like.

The door panel 1000 may further include the light blocking layer 1110 provided to block the propagation of light and cover the rear surface 1100b of the edge portion of the light-transmissive panel facing the door body. The light blocking layer 1110 may improve the appearance quality of the product.

The light blocking layer 1110 may be disposed between the light-transmissive panel 1100 and the sealing member 1600.

The method of manufacturing a home appliance may include coupling the light-transmissive panel to one surface of the electrophoretic film such that the edge of the light-transmissive panel is positioned outwardly from the edge of the electrophoretic film (S20), coupling the protective plate to the other surface of the electrophoretic film such that the edge of the protective plate is positioned inwardly from the edge of the electrophoretic film (S20), and sealing the end surface of the edge direction of the electrophoretic film and the end surface of the edge direction of the protective plate by forming the sealing member on the first sealing area provided along the edge of the electrophoretic film and the second sealing area provided along the edge of the protective plate (S40 and S50). By including the electrophoretic display panel 1000 the exterior design of the home appliance may be changed without replacing the exterior panel. In addition, the home appliance may reduce the power consumption required in the process of changing and maintaining the color of the exterior panel by using the electrophoretic display panel 1000. In addition, the electrophoretic display panel 1000 may be prevented from being damaged, and a home appliance capable of improving lifespan or durability may be manufactured. In addition, it is possible to effectively prevent the inflow of moisture or foreign substances between each layer of the electrophoretic display panel or on the cut surfaces, and thus a home appliance capable of improving lifespan or durability may be manufactured. In addition, the method of manufacturing a home appliance may improve the accuracy of the sealing using the first sealing member 1610 and the second sealing member 1620.

The forming of the sealing member on the first sealing area and the second sealing area may include forming the first sealing member on the first sealing area so as to seal the end surface of the edge direction of the electrophoretic film (S40), and then forming the second sealing member on the second sealing area so as to seal the end surface of the edge direction of the protective plate (S50).

The method of manufacturing the home appliance may further include determining the first sealing area by detecting the boundary between the light-transmissive panel and the electrophoretic film (S30), and determining the second sealing area by detecting the boundary between the electrophoretic film and the protective plate (S30). It is possible to improve the accuracy of sealing, and increase the life or durability of the product.

The determining of the first sealing area and the second sealing area (S30) may include photographing the rear surfaces of the light-transmissive panel 1100, the electrophoretic film 1200, and the protective plate 1500 (S31), determining vertices at the edge of the electrophoretic film based on the photographed image (S32), determining the first sealing area based on the vertices at the edge of the electrophoretic film (S33), determining vertices at the edge of the protective plate based on the photographed image (S32), and determining the second sealing area based on the vertices at the edge of the protective plate (S33). The accuracy of sealing may be improved by accurately determining the sealing area, and the life or durability of the product may be improved.

The method of manufacturing the home appliance may include surface treating by spraying the first and second sealing areas with plasma gas before forming the sealing member on the first and second sealing areas (S61). It is possible to improve adhesion between the sealing member and the sealing areas, and to increase the life or durability of the product.

The method of manufacturing the home appliance may further include, before attaching the protective plate to the other surface of the electrophoretic film, attaching the connector electrically connected to the processor outputting the driving signal of the electrophoretic film to the other surface of the electrophoretic film, and electrically connecting the connector to the pair of electrode layers provided on the electrophoretic film by connecting the first terminal of the connector to one of the pair of electrode layers of the electrophoretic film, and connecting the second terminal of the connector to the other of the pair of electrode layers. It is possible to prevent short circuiting of current in the connector and increase the life or durability of the product.

The method of manufacturing the home appliance may further include forming the light blocking layer by applying ink of a light blocking color along the edge portion of the rear surface of the light-transmissive panel. The appearance quality of the product may be improved.

The forming of the sealing member on the first sealing area and the second sealing area (S40 and S50) may include applying the sealing liquid along each of the first sealing area and the second sealing area (S62), and curing the applied sealing liquid by irradiating the applied sealing liquid with UV light (S63 and S64).

Home appliances 1, 2, 3, 4, and 5 may include the electrophoretic display (EPD) panel 1000 forming an exterior of the home appliance, and the bases 111, 220, 320, 420, and 512 on which the EPD panel is mounted. The EPD panel 1000 may include the light-transmissive panel 1100 disposed on one side of the base and provided to transmit light, the electrophoretic film 1200 disposed between the light-transmissive panel and the base, the protective plate 1500 disposed between the electrophoretic film and the base and provided to protect the electrophoretic film, and the sealing member 1600. The electrophoretic film 1200 may include the pair of electrode layers 1310 and 1320, and the electrophoretic layer 1400 including the color cell 1410 flowably accommodating the first charged particles 1430 having the first color and the second charged particles 1440 having the second color different from the first color and a charge different from that of the first charged particles 1430, and disposed between the pair of electrode layers. The sealing member 1600 may cover the edge portion 1100*a* on the rear surface 1100*b* of the light-transmissive panel facing the base, the cut surface 1200*c* of the edge direction of the electrophoretic film, the edge portion 1200*a* of the rear surface 1200*b* of the electrophoretic film, and the cut surface 1500*c* of the edge direction of the protective plate. By including the electrophoretic display panel 1000 the exterior design of the home appliance may be changed without replacing the exterior panel. In addition, the home appliance may reduce the power consumption required in the process of changing and maintaining the color of the exterior panel by using the electrophoretic display panel 1000. In addition, it is possible to prevent the electrophoretic display panel 1000 from being damaged and to improve the durability or life of the product.

The exterior design of the home appliance, including the electrophoretic display panel, may be changed without replacing the exterior panel.

In the home appliance, the charged particles having different colors in the color cell may have the bistable state, and thus the power consumption required in a process of maintaining after changing the color mode may be reduced.

The home appliance may include the protective plate provided at a position where the electrophoretic display panel is assembled, thereby preventing damage to the electrophoretic display panel and improving the life or durability of the product.

The home appliance may include the sealing member covering the edge of the electrophoretic film and the edge of the protective plate, thereby preventing the electrophoretic display panel from being damaged and increasing the life or durability of the product.

In the home appliance, the first sealing member and the second sealing member may each be formed to improve the accuracy of sealing and to increase the life or durability of the product.

In the home appliance, the appearance quality of the product may be improved by forming the light blocking layer on the edge portion of the light-transmissive panel.

In the home appliance, by improving the structure of the connector, it is possible to prevent short circuiting of current and to increase the life or durability of the product.

The method of manufacturing the home appliance may improve the accuracy of sealing by determining the first sealing area and the second sealing area, respectively, and forming the sealing member in each sealing area, thereby improving the accuracy of sealing and increasing the life or durability of the product.

The method of manufacturing the home appliance may improve the accuracy of sealing by determining the sealing area using the camera module, thereby increasing the life or durability of the product.

In the method of manufacturing the home appliance, surface treatment is performed by spraying the sealing area with plasma gas before forming the sealing member, thereby improving the adhesion between the sealing member and the sealing area, thereby increasing the life or durability of the product.

The disclosed embodiments may be implemented in the form of a recording medium storing instructions executable by a computer. Instructions may be stored in the form of program codes, and when executed by a processor, may create program modules to perform operations of the disclosed embodiments. The recording medium may be implemented as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Also, the computer-readable recording medium may be provided in the form of a non-transitory storage medium. Here "non-transitory storage medium" means that the storage medium is a tangible device and does not contain a signal (for example, electromagnetic wave), and this term does not distinguish the case in which data is semi-permanently stored in the storage medium, from the case in which data is temporarily stored. For example, a non-temporary transitory storage medium may include a buffer in which data is temporarily stored.

The method may be provided by being included in a computer program product. Computer program products may be traded between sellers and buyers as commodities. Computer program products may be distributed in the form of a storage medium (for example, compact disc read only memory (CD-ROM)), readable by a device. Alternatively, computer program products may be distributed (for example, downloaded or uploaded) online through an application store (for example, Play Store™) or directly distributed between two user devices (for example, smart phones). In the case of online distribution, at least a portion of the computer program product (for example, downloadable app) may be temporarily stored or created temporarily in a storage medium readable by a device, such as the manufacturer's server, the application store's server, or the relay server's memory.

While the disclosed embodiments have been particularly described with reference to exemplary embodiments, it should be understood by those of skilled in the art that various changes in form and details may be made without departing from the spirit and scope of the disclosed embodiments.

The invention claimed is:

1. A home appliance, comprising:
   a main body; and
   a door configured to open and close the main body, the door including a door body and a door panel disposed on one side of the door body;
   wherein the door panel comprises:
       a light-transmissive panel disposed on the one side of the door body, the light-transmissive panel being configured to allow light to pass through;
       an electrophoretic film disposed between the light-transmissive panel and the door body;
       a protective plate disposed between the electrophoretic film and the door body, the protective plate being configured to protect the electrophoretic film; and
       a sealing member disposed along an edge portion of the light-transmissive panel extending outwardly from an edge of the electrophoretic film and an edge of the protective plate, the sealing member being configured to cover the edge of the electrophoretic film and the edge of the protective plate.

2. The home appliance of claim 1, wherein the sealing member is configured to cover a rear surface of the edge portion of the light-transmissive panel facing the door body, and an end surface of the electrophoretic film, the end surface of the electrophoretic film facing outward from the edge of the electrophoretic film in a direction different from a direction in which the rear surface of the edge portion of the light-transmissive panel faces.

3. The home appliance of claim 1, wherein the edge of the electrophoretic film extends outwards from the edge of the protective plate, and wherein the sealing member is configured to cover a rear surface of the edge of the electrophoretic film facing the door body and an end surface of the protective plate, the end surface of the protective plate facing outward from the edge of the protective plate in a direction different from a direction in which the rear surface of the edge of the electrophoretic film faces.

4. The home appliance of claim 1, wherein the sealing member comprises:

a first sealing member configured to cover an end surface of the electrophoretic film and a rear surface of the edge of the electrophoretic film facing the door body, the end surface of the electrophoretic film facing outward from the edge of the electrophoretic film in a direction different from a direction in which the rear surface of the edge of the electrophoretic film faces, and a second sealing member configured to cover an end surface of the protective plate a rear surface of the edge of the protective plate facing the door body, the end surface of the protective plate facing outward from the edge of the protective plate in a direction different from a direction in which the rear surface of the edge of the protective plate faces.

5. The home appliance of claim 4, wherein the second sealing member is coupled to the first sealing member, the second sealing member being disposed between at least a portion of the first sealing member and the door body.

6. The home appliance of claim 1, further comprising at least one processor configured to output a driving signal of the electrophoretic film, wherein the electrophoretic film comprises a first electrode layer electrically connected to the at least one processor and adjacent to the light-transmissive panel, and a second electrode layer disposed opposite to the first electrode layer and adjacent to the protective plate, wherein the door panel further comprises a connector electrically connecting the at least one processor and the electrophoretic film, the connector comprising a first terminal connected to the first electrode layer and a second terminal connected to the second electrode layer, and wherein the connector is attached to the second electrode layer.

7. The home appliance of claim 6, wherein the protective plate comprises a connector opening disposed between at least a portion of the connector and the door body, the connector opening being configured to expose the at least the portion of the connector.

8. The home appliance of claim 7, wherein the connector opening extends from the edge of the protective plate toward an inside of the edge of the protective plate.

9. The home appliance of claim 6, wherein the electrophoretic film further comprises an electrophoretic layer comprising a color cell configured to accommodate charged particles having colors, the electrophoretic layer being disposed between the first electrode layer and the second electrode layer, and wherein the first electrode layer comprises a first terminal connecting portion provided on a rear surface of the first electrode layer facing the door body to connect to the first terminal, wherein each of the electrophoretic layer and the second electrode layer includes a stepped portion that steps inwardly from an edge of the first terminal connecting portion to allow the first terminal to connect to the first terminal connecting portion.

10. The home appliance of claim 1, wherein the door panel further comprises a light blocking layer configured to block propagation of light and to cover a rear surface of the edge portion of the light-transmissive panel facing the door body.

11. The home appliance of claim 10, wherein the light blocking layer is disposed between the light-transmissive panel and the sealing member.

12. A method of manufacturing a home appliance, the method comprising:

coupling a light-transmissive panel to one surface of an electrophoretic film such that an edge of the light-transmissive panel is positioned outwardly from an edge of the electrophoretic film, coupling a protective plate to an other surface of the electrophoretic film such that an edge of the protective plate is positioned inwardly from the edge of the electrophoretic film, and sealing an end surface of the electrophoretic film and an end surface of the protective plate by forming a sealing member on a first sealing area disposed along the edge of the electrophoretic film and a second sealing area disposed along the edge of the protective plate, the end surface of the electrophoretic film facing outward from the edge of the electrophoretic film in a direction different from a direction in which the other surface of the electrophoretic film faces, and the end surface of the protective plate facing outward from the edge of the protective plate in a direction different from the direction in which the other surface of the electrophoretic film faces.

13. The method of claim 12, wherein the forming the sealing member on the first sealing area and the second sealing area comprises:

forming a first sealing member on the first sealing area so as to seal the end surface of the electrophoretic film, and after forming the first sealing member, forming a second sealing member on the second sealing area so as to seal the end surface of the protective plate.

14. The method of claim 12, further comprising:

determining the first sealing area by detecting a boundary between the light-transmissive panel and the electrophoretic film, and determining the second sealing area by detecting a boundary between the electrophoretic film and the protective plate.

15. The method of claim 14, wherein the determining the first sealing area and the determining the second sealing area comprises:

photographing rear surfaces of the light-transmissive panel, the electrophoretic film, and the protective plate;

determining vertices at the edge of the electrophoretic film based on the photographed image;

determining the first sealing area based on the vertices at the edge of the electrophoretic film;

determining vertices at the edge of the protective plate based on the photographed image, and determining the second sealing area based on the vertices at the edge of the protective plate.

16. A home appliance, comprising:

an electrophoretic display (EPD) panel forming an exterior of the home appliance; and a base on which the EPD panel is mounted;

wherein the EPD panel comprises:

a light-transmissive panel disposed on one side of the base, the light transmissive panel being configured to transmit light, an electrophoretic film disposed between the light-transmissive panel and the base, a protective plate disposed between the electrophoretic film and the base, the protective plate being configured to protect the electrophoretic film, and a sealing member;

wherein the electrophoretic film comprises:

a pair of electrode layers, and an electrophoretic layer comprising a color cell configured to flowably accommodate first charged particles having a first color, and second charged particles having a second color, the second color being different than the first color, the second charged particles having a charge different than that of the first charged particles, the electrophoretic layer being disposed between the pair of electrode layers; and wherein the sealing member covers (i) an edge portion on a rear surface of the light-transmissive panel facing the base, (ii) a cut surface of the electrophoretic film, (iii) an edge portion of a rear surface of the electrophoretic film, and (iv) a cut surface of the protective plate, the cut surface of the electrophoretic film facing outward from an edge of the electrophoretic film in a direction different from a direction in which the rear surface of the light-transmissive panel faces, and the cut surface of the protective plate facing outward from an edge of the protective plate in a direction different from a direction in which the rear surface of the electrophoretic film.

17. The home appliance of claim 16, wherein the sealing member comprises:

a first sealing member configured to cover the cut surface of the electrophoretic film, the edge portion of the rear surface of the light-transmissive panel, and the edge portion of the rear surface of the electrophoretic film; and a second sealing member configured to cover the cut surface of the protective plate.

18. The home appliance of claim 17, wherein the second sealing member is coupled to the first sealing member, the second sealing member being disposed between at least a portion of the first sealing member and the base.

19. The home appliance of claim 16, wherein the door panel further comprises a light blocking layer configured to block propagation of light and to cover the edge portion on the rear surface of the light-transmissive panel facing the base.

20. The home appliance of claim 19, wherein the light blocking layer is disposed between the light-transmissive panel and the sealing member.

* * * * *